(12) United States Patent
Zhang et al.

(10) Patent No.: US 10,499,429 B2
(45) Date of Patent: Dec. 3, 2019

(54) USING CONTROL PACKET TRANSMISSIONS TO COORDINATE DATA TRANSMISSIONS AT LOWERED POWER

(71) Applicant: Huawei Technologies Co., Ltd., Shenzhen (CN)

(72) Inventors: Lili Zhang, Beijing (CN); Zhiming Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/577,533

(22) PCT Filed: May 27, 2016

(86) PCT No.: PCT/CN2016/083745
§ 371 (c)(1),
(2) Date: Nov. 28, 2017

(87) PCT Pub. No.: WO2016/192595
PCT Pub. Date: Dec. 8, 2016

(65) Prior Publication Data
US 2018/0152967 A1 May 31, 2018

(30) Foreign Application Priority Data
May 29, 2015 (CN) .......................... 2015 1 0288738

(51) Int. Cl.
*H04W 4/00* (2018.01)
*H04W 74/08* (2009.01)
(Continued)

(52) U.S. Cl.
CPC ........... *H04W 74/0816* (2013.01); *H04L 1/00* (2013.01); *H04W 52/286* (2013.01);
(Continued)

(58) Field of Classification Search
CPC ................................................. H04W 74/0816
See application file for complete search history.

(56) References Cited

U.S. PATENT DOCUMENTS

2002/0191573 A1* 12/2002 Whitehill .............. H04L 1/0002
370/338
2007/0037600 A1 2/2007 Fukuda
(Continued)

FOREIGN PATENT DOCUMENTS

CN 101567707 A 10/2009
CN 102025707 A 4/2011
(Continued)

OTHER PUBLICATIONS

3rd Generation Partnership Project; Technical Specification Group Radio Access Network; Feasibility study for Further Advancements for E-UTRA (LTE-Advanced) (Release 12), 3GPP TR 36.912 V12.0.0, pp. 1-62, 3rd Generation Partnership Project, Valbonne, France (Sep. 2014).

*Primary Examiner* — Gerald A Smarth
(74) *Attorney, Agent, or Firm* — Leydig, Voit & Mayer, Ltd.

(57) ABSTRACT

A sending node sends an RTS control packet carrying an identifier of a receiving node, so that the receiving node determines a power update value according to an initial transmit power of the RTS control packet and sends a CTS control packet by using the initial transmit power, where the CTS control packet carries an identifier of the sending node and the power update value, a first part of adjacent nodes other than the sending node, if determining that the first part of adjacent nodes are located beyond coverage of an updated power of the receiving node and the sending node, determine a first limited power and perform control packet transmission according to the first limited power; and receiving, by
(Continued)

the sending node, the CTS control packet, and sending a data packet by using the updated power.

17 Claims, 9 Drawing Sheets

(51) Int. Cl.
    *H04L 1/00*     (2006.01)
    *H04W 52/34*     (2009.01)
    *H04W 52/28*     (2009.01)
    *H04W 52/48*     (2009.01)
    *H04W 52/50*     (2009.01)
    *H04W 84/12*     (2009.01)
    *H04W 52/24*     (2009.01)

(52) U.S. Cl.
    CPC ......... *H04W 52/34* (2013.01); *H04W 52/343* (2013.01); *H04W 52/48* (2013.01); *H04W 52/50* (2013.01); *H04W 52/242* (2013.01); *H04W 52/244* (2013.01); *H04W 84/12* (2013.01)

(56) References Cited

U.S. PATENT DOCUMENTS

| | | | |
|---|---|---|---|
| 2007/0223403 A1* | 9/2007 | Furuskar | H04W 52/24 370/278 |
| 2008/0102852 A1 | 5/2008 | Du et al. | |
| 2014/0247774 A1* | 9/2014 | Zhou | H04W 16/10 370/329 |
| 2016/0081100 A1 | 3/2016 | Du et al. | |
| 2016/0174165 A1* | 6/2016 | Ikenaga | H04W 52/283 455/522 |
| 2016/0174167 A1* | 6/2016 | Fujita | H04W 52/04 |

FOREIGN PATENT DOCUMENTS

| | | |
|---|---|---|
| CN | 102595623 A | 7/2012 |
| CN | 102685777 A | 9/2012 |
| CN | 104184702 A | 12/2014 |
| WO | 2013067693 A1 | 5/2013 |

\* cited by examiner

A sending node sends an RTS control packet carrying an identifier of a receiving node, so that after the receiving node receives the RTS control packet, the receiving node determines an updated power value according to an initial transmit power of the RTS control packet and sends a CTS control packet by using the initial transmit power, where the CTS control packet carries an identifier of the sending node and the updated power value; a first part of adjacent nodes other than the sending node, after receiving the CTS control packet, if determining that the first part of adjacent nodes are located beyond coverage of an updated power of the receiving node and the sending node, determine a first limited power and perform control packet transmission according to the first limited power; and the updated power is a power that is obtained by updating the initial transmit power by using the updated power value, the updated power is lower than the initial transmit power, and the receiving node and the sending node are located beyond coverage of the first limited power of the first part of adjacent nodes 〜201

The sending node receives the CTS control packet, and sends a data packet by using the updated power, where the updated power is further used by the receiving node to send an ACK signal by using the updated power after the receiving node completely receives the data packet sent by the sending node 〜202

FIG. 2

A sending node sends a request to send RTS control packet carrying an identifier of a receiving node, so that after the receiving node receives the RTS control packet, the receiving node determines an updated power value according to an initial transmit power of the RTS control packet and sends a CTS control packet by using the initial transmit power, where the CTS control packet carries an identifier of the sending node and the updated power value — 301

A first part of adjacent nodes other than the sending node, after receiving the CTS control packet, if determining that the first part of adjacent nodes are located beyond coverage of an updated power of the receiving node and the sending node, determine a first limited power and perform control packet transmission according to the first limited power, where the updated power is a power that is obtained by updating the initial transmit power by using the updated power value, the updated power is lower than the initial transmit power, and the receiving node and the sending node are located beyond coverage of the first limited power of the first part of adjacent nodes — 302

The sending node receives the CTS control packet, and sends an RTS update control packet by using the initial transmit power, where the RTS update control packet carries the updated power value — 303

A second part of adjacent nodes that receive the RTS update control packet but do not receive the CTS control packet, when determining that the second part of adjacent nodes are located beyond the coverage of the updated power of the sending node, determine a second limited power and perform control packet transmission according to the second limited power, where the sending node is located beyond coverage of the second limited power of the second part of adjacent nodes — 304

The sending node sends a data packet to the sending node by using the updated power, where the updated power is further used by the receiving node to send an ACK signal by using the updated power after the receiving node completely receives the data packet sent by the sending node — 305

FIG. 3

When an adjacent node receives a CTS control packet that carries an identifier of a sending node and an updated power value and is sent by a receiving node, the adjacent node determines whether the adjacent node is located beyond coverage of an updated power of the receiving node and the sending node, where the CTS control packet is sent by the receiving node by using an initial transmit power after the receiving node receives an RTS control packet that carries an identifier of the receiving node and is sent by the sending node, and determines the updated power value according to the initial transmit power of the RTS control packet; and the updated power value is used by the sending node to update the initial transmit power by using the updated power value to obtain the updated power after the sending node receives the CTS control packet, so that a data packet is sent by using the updated power, the updated power is lower than the initial transmit power, and the updated power is further used by the receiving node to send an ACK signal by using the updated power after the receiving node completely receives the data packet sent by the sending node

601

If the adjacent node is located beyond the coverage of the updated power of the receiving node and the sending node, the adjacent node determines a first limited power, and performs control packet transmission according to the first limited power, where the receiving node and the sending node are located beyond coverage of the first limited power of the adjacent node

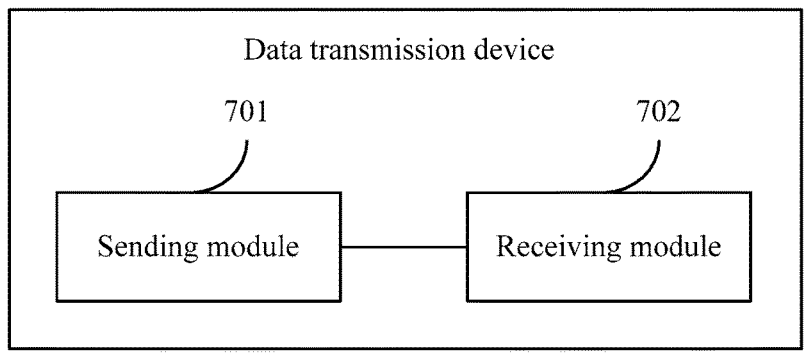

FIG. 7

USING CONTROL PACKET TRANSMISSIONS TO COORDINATE DATA TRANSMISSIONS AT LOWERED POWER

CROSS-REFERENCE TO RELATED APPLICATIONS

This application is a national stage application of International Application No. PCT/CN2016/083745, filed on May 27, 2016, which claims priority to Chinese Patent Application No. 201510288738.7, filed on May 29, 2015. Both of the aforementioned applications are hereby incorporated by reference in their entireties.

TECHNICAL FIELD

The present invention relates to the field of communications technologies, and in particular, to a data transmission method, device, and system.

BACKGROUND

The 802.11 standard is a wireless local area network standard developed by the IEEE (Institute of Electrical and Electronics Engineers, Institute of Electrical and Electronics Engineers) 802.11 working group. An access mechanism in the 802.11 standard is a distributed coordination function (Distributed Coordination Function, DCF). An operating mechanism of the 802.11 DCF is as follows:

When a sending node (transmitter) needs to send data, the sending node sends an RTS (Request to Send, request to send) control packet. The RTS control packet includes an identifier of a receiving node. When the receiving node (receiver) receives the RTS control packet, the receiving node sends a CTS (Clear to Send, clear to send) control packet. The CTS control packet includes an identifier of the sending node. When receiving the RTS control packet and/or the CTS control packet, all other adjacent nodes (other nodes) different from the sending node and the receiving node stop data transmission to ensure data (data) transmission between the sending node and the receiving node. The adjacent nodes start to transmit new data only after receiving an ACK (acknowledgement) signal sent by the receiving node.

However, during practice, it is found that, in the 802.11 DCF access mechanism, all the other adjacent nodes different from the sending node and the receiving node stop data transmission when receiving the RTS control packet or the CTS control packet. Although this prevents the other adjacent nodes different from the sending node and the receiving node from interfering with the data transmission between the sending node and the receiving node, spectrum resource utilization is reduced.

SUMMARY

Embodiments of the present invention disclose a data transmission method, device, and system to improve spectrum resource utilization.

According to a first aspect, a data transmission method is provided and includes:

sending, by a sending node, a request to send RTS control packet carrying an identifier of a receiving node, so that after the receiving node receives the RTS control packet, the receiving node determines a power update value according to an initial transmit power of the RTS control packet and sends a clear to send CTS control packet by using the initial transmit power, where the CTS control packet carries an identifier of the sending node and the power update value; a first part of adjacent nodes other than the sending node among nodes that receive the CTS control packet, if determining that the first part of adjacent nodes are located beyond coverage of an updated power of the receiving node and the sending node, determine a first limited power and perform control packet transmission according to the first limited power; and the updated power is a power that is obtained by updating the initial transmit power by using the power update value, the updated power is lower than the initial transmit power, and the receiving node and the sending node are located beyond coverage of the first limited power of the first part of adjacent nodes; and receiving, by the sending node, the CTS control packet, and sending a data packet by using the updated power, where the updated power is further used by the receiving node to send an ACK signal by using the updated power after the receiving node completely receives the data packet sent by the sending node.

With reference to the first aspect, in a first possible implementation of the first aspect, after the receiving, by the sending node, the CTS control packet, and before the sending a data packet by using the updated power, the method further includes:

sending, by the sending node, an RTS update control packet by using the initial transmit power, where the RTS update control packet carries the power update value; a second part of adjacent nodes that receive the RTS update control packet but do not receive the CTS control packet, when determining that the second part of adjacent nodes are located beyond the coverage of the updated power of the sending node, determine a second limited power and perform control packet transmission according to the second limited power; and the sending node is located beyond coverage of the second limited power of the second part of adjacent nodes.

With reference to the first aspect, in a second possible implementation of the first aspect, a third part of adjacent nodes that receive the RTS control packet but do not receive the CTS control packet and the data packet determine a third limited power and perform control packet transmission according to the third limited power; and the sending node is located beyond coverage of the third limited power of the third part of adjacent nodes.

With reference to the first aspect, in a third possible implementation of the first aspect, that a first part of adjacent nodes determine that the first part of adjacent nodes are located beyond coverage of an updated power of the receiving node and the sending node is implemented in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal-to-interference ratio threshold of the first part of adjacent nodes, determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and a receive power of the received CTS control packet, and when a difference between the updated power and the first path loss is less than a receive power threshold of the first part of adjacent nodes, or when a ratio of a difference between the updated power and the first path loss to a sum of current interference and noise is less than a signal-to-interference ratio threshold of the first part of adjacent nodes, determine that the first part of adjacent nodes are located beyond the coverage of the updated power of the receiving node and the sending node.

With reference to the first aspect, in a fourth possible implementation of the first aspect, the first part of adjacent nodes determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the first part of adjacent nodes according to the first limited power is determined according to a network allocation vector NAV duration carried in the RTS control packet and an NAV duration carried in the CTS control packet; or when the first part of adjacent nodes do not receive the RTS control packet, the first part of adjacent nodes determine a first path loss between the first part of adjacent nodes and the receiving node according to the initial transmit power and a receive power of the received CTS control packet, and determine a power satisfying that a difference between the power and the first path loss is less than a receive power threshold of the receiving node, as the first limited power, or determine a power satisfying that a ratio of the power minus the first path loss to a sum of current interference and noise is less than a signal-to-interference ratio threshold of the receiving node, as the first limited power, where a duration of the control packet transmission performed by the first part of adjacent nodes according to the first limited power is determined according to an NAV duration carried in the CTS control packet.

With reference to the fourth possible implementation of the first aspect, in a fifth possible implementation of the first aspect, the CTS control packet further carries receiver sensitivity of the receiving node, so that the first part of adjacent nodes determine the receive power threshold or the signal-to-interference ratio threshold of the receiving node according to the receiver sensitivity of the receiving node.

With reference to the second possible implementation of the first aspect, in a sixth possible implementation of the first aspect, the second part of adjacent nodes determine the second limited power in the following manner:

the second part of adjacent nodes determine a third path loss between the second part of adjacent nodes and the sending node according to the initial transmit power and a receive power of the received RTS update control packet; and the second part of adjacent nodes determine a power satisfying that a difference between the power and the third path loss is less than a receive power threshold of the sending node, as the second limited power, or determine a power satisfying that a ratio of the power minus the third path loss to a sum of current interference and noise is less than a signal-to-interference ratio threshold of the sending node, as the second limited power, where a duration of the control packet transmission performed by the second part of adjacent nodes according to the second limited power is determined according to an NAV duration carried in the RTS update control packet.

With reference to the sixth possible implementation of the first aspect, in a seventh possible implementation of the first aspect, the RTS update control packet further carries receiver sensitivity of the sending node, so that the second part of adjacent nodes determine the receive power threshold or the signal-to-interference ratio threshold of the sending node according to the receiver sensitivity of the sending node.

With reference to any one of the first aspect, and the first possible implementation to the seventh possible implementation of the first aspect, in an eighth possible implementation of the first aspect, the initial transmit power is a prescribed default transmit power, or an actually used transmit power carried in the RTS control packet or the CTS control packet.

According to a second aspect, another data transmission method is provided and includes:

receiving, by a receiving node, a request to send RTS control packet that carries an identifier of the receiving node and is sent by a sending node, and determining a power update value according to an initial transmit power of the RTS control packet; and sending, by the receiving node, a clear to send CTS control packet by using the initial transmit power, where the CTS control packet carries an identifier of the sending node and the power update value; when receiving the CTS control packet, the sending node determines an updated power according to the power update value and sends a data packet by using the updated power; a first part of adjacent nodes other than the sending node among nodes that receive the CTS control packet, when determining that the first part of adjacent nodes are located beyond coverage of the updated power of the receiving node and the sending node, determine a first limited power and perform control packet transmission according to the first limited power; and the updated power is a power that is obtained by updating the initial transmit power by using the power update value, the updated power is lower than the initial transmit power, the updated power is further used by the receiving node to send an ACK signal by using the updated power after the receiving node completely receives the data packet sent by the sending node, and the receiving node and the sending node are located beyond coverage of the first limited power of the first part of adjacent nodes.

With reference to the second aspect, in a first possible implementation of the second aspect, the RTS control packet further carries a modulation and coding scheme MCS level and a quality of service QoS level that are expected by the sending node; and the determining, by the receiving node, a power update value according to an initial transmit power of the RTS control packet includes:

determining, by the receiving node according to the initial transmit power, the MCS level, and the QoS level, a power ratio allowed to be reduced, where the power ratio allowed to be reduced is inversely proportional to the MCS level and the QoS level respectively.

With reference to the second aspect, in a second possible implementation of the second aspect, the determining, by the receiving node, a power update value according to an initial transmit power of the RTS control packet includes:

determining, by the receiving node according to the initial transmit power, an MCS level expected by the receiving node, and receiver sensitivity, a power ratio allowed to be reduced, where the power ratio allowed to be reduced is inversely proportional to the MCS level and directly proportional to the receiver sensitivity; where the CTS control packet further carries the MCS level, so that the sending node sends the data packet by using the MCS level.

With reference to the second aspect, in a third possible implementation of the second aspect, the determining, by the receiving node, a power update value according to an initial transmit power of the RTS control packet includes:

performing, by the receiving node, a calculus operation using a distance as a variable on a product of a size of a non-overlapping area of the coverage of the updated power and coverage of the initial transmit power, a node density of the non-overlapping area, and a service arrival rate of the non-overlapping area by using a radius of the coverage of the updated power as a lower limit and a radius of the coverage of the initial transmit power as an upper limit respectively, to obtain potential interference;

determining, by the receiving node, a path loss between the receiving node and the sending node according to the initial transmit power and a receive power of the received RTS control packet; and determining, by the receiving node, the power update value according to a condition that a difference between the updated power and the path loss, divided by a sum of the potential interference, current interference, and current noise, is greater than or equal to a signal-to-interference ratio threshold of the receiving node.

With reference to the second aspect, in a fourth possible implementation of the second aspect, that a first part of adjacent nodes determine that the first part of adjacent nodes are located beyond coverage of the updated power of the receiving node and the sending node is implemented in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal-to-interference ratio threshold of the first part of adjacent nodes, determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and a receive power of the received CTS control packet, and when a difference between the updated power and the first path loss is less than a receive power threshold of the first part of adjacent nodes, determine that the first part of adjacent nodes are located beyond the coverage of the updated power of the receiving node and the sending node.

With reference to the second aspect, in a fifth possible implementation of the second aspect, the first part of adjacent nodes determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the first part of adjacent nodes according to the first limited power is determined according to a network allocation vector NAV duration carried in the RTS control packet and an NAV duration carried in the CTS control packet; or when the first part of adjacent nodes do not receive the RTS control packet, the first part of adjacent nodes determine a first path loss between the first part of adjacent nodes and the receiving node according to the initial transmit power and a receive power of the received CTS control packet, and determine a power satisfying that a difference between the power and the first path loss is less than a receive power threshold of the receiving node, as the first limited power, or determine a power satisfying that a ratio of the power minus the first path loss to a sum of current interference and noise is less than a signal-to-interference ratio threshold of the receiving node, as the first limited power, where a duration of the control packet transmission performed by the first part of adjacent nodes according to the first limited power is determined according to an NAV duration carried in the CTS control packet.

With reference to the fifth possible implementation of the second aspect, in a sixth possible implementation of the second aspect, the CTS control packet further carries receiver sensitivity of the receiving node, so that the first part of adjacent nodes determine the receive power threshold or the signal-to-interference ratio threshold of the receiving node according to the receiver sensitivity of the receiving node.

With reference to any one of the second aspect, and the first possible implementation to the sixth possible implementation of the second aspect, in a seventh possible implementation of the second aspect, the initial transmit power is a prescribed default transmit power, or an actually used transmit power carried in the RTS control packet or the CTS control packet.

According to a third aspect, another data transmission method is provided and includes:

when an adjacent node receives a clear to send CTS control packet that carries an identifier of a sending node and a power update value and is sent by a receiving node, determining, by the adjacent node, whether the adjacent node is located beyond coverage of an updated power of the receiving node and the sending node, where the CTS control packet is sent by the receiving node by using an initial transmit power after the receiving node receives a request to send RTS control packet that carries an identifier of the receiving node and is sent by the sending node, and determines the power update value according to the initial transmit power of the RTS control packet; and the power update value is used by the sending node to update the initial transmit power by using the power update value to obtain the updated power after the sending node receives the CTS control packet, so that a data packet is sent by using the updated power, the updated power is lower than the initial transmit power, and the updated power is further used by the receiving node to send an ACK signal by using the updated power after the receiving node completely receives the data packet sent by the sending node; and if the adjacent node determines that the adjacent node is located beyond the coverage of the updated power of the receiving node and the sending node, determining, by the adjacent node, a first limited power, and performing control packet transmission according to the first limited power, where the receiving node and the sending node are located beyond coverage of the first limited power of the adjacent node.

With reference to the third aspect, in a first possible implementation of the third aspect, the method further includes:

when the adjacent node receives an RTS update control packet that carries the power update value and is sent by the sending node, but does not receive the CTS control packet, determining, by the adjacent node, whether the adjacent node is located beyond the coverage of the updated power of the sending node, and if yes, determining, by the adjacent node, a second limited power, and performing control packet transmission according to the second limited power, where the RTS update control packet is sent by the sending node by using the initial transmit power after the CTS control packet is received and before the data packet is sent by using the updated power, and the sending node is located beyond coverage of the second limited power of the adjacent node.

With reference to the third aspect, in a second possible implementation of the third aspect, the method further includes:

when the adjacent node receives the RTS control packet, but does not receive the CTS control packet and the data packet, determining a third limited power, and performing control packet transmission according to the third limited power, where the sending node is located beyond coverage of the third limited power of the adjacent node.

With reference to the third aspect, in a third possible implementation of the third aspect, that the adjacent node determines that the adjacent node is located beyond the coverage of the updated power of the receiving node and the sending node includes:

if the adjacent node receives the RTS control packet, the adjacent node separately determines a first path loss between the adjacent node and the receiving node and a second path loss between the adjacent node and the sending node according to the initial transmit power, a receive power of the received CTS control packet, and a receive power of the received RTS control packet, and when a difference between the updated power and the first path loss and a difference between the updated power and the second path loss are both less than a receive power threshold of the adjacent node, or when a ratio of a difference between the updated power and the first path loss to a sum of current noise and interference and a ratio of a difference between the updated power and the second path loss to the sum of current noise and interference are both less than a signal-to-interference ratio threshold of the adjacent node, determines that the adjacent node is located beyond the coverage of the updated power of the receiving node and the sending node; or if the adjacent node does not receive the RTS control packet, the adjacent node determines a first path loss between the adjacent node and the receiving node according to the initial transmit power and a receive power of the received CTS control packet, and when a difference between the updated power and the first path loss is less than a receive power threshold of the adjacent node, or when a ratio of a difference between the updated power and the first path loss to a sum of current interference and noise is less than a signal-to-interference ratio threshold of the adjacent node, determines that the adjacent node is located beyond the coverage of the updated power of the receiving node and the sending node.

With reference to the third aspect, in a fourth possible implementation of the third aspect, the determining, by the adjacent node, a first limited power includes:

if the adjacent node receives the RTS control packet, separately determining, by the adjacent node, a first path loss between the adjacent node and the receiving node and a second path loss between the adjacent node and the sending node according to the initial transmit power, a receive power of the received CTS control packet, and a receive power of the received RTS control packet, and determining a power satisfying that a difference between the power and the first path loss is less than a receive power threshold of the receiving node and that a difference between the power and the second path loss is less than a receive power threshold of the sending node, as the first limited power, or determining a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the adjacent node according to the first limited power is determined according to a network allocation vector NAV duration carried in the RTS control packet and an NAV duration carried in the CTS control packet; or if the adjacent node does not receive the RTS control packet, determining, by the adjacent node, a first path loss between the adjacent node and the receiving node according to the initial transmit power and a receive power of the received CTS control packet, and determining a power satisfying that a difference between the power and the first path loss is less than a receive power threshold of the receiving node, as the first limited power, or determining a power satisfying that a ratio of the power minus the first path loss to a sum of current interference and noise is less than a signal-to-interference ratio threshold of the receiving node, as the first limited power, where a duration of the control packet transmission performed by the adjacent node according to the first limited power is determined according to an NAV duration carried in the CTS control packet.

With reference to the fourth possible implementation of the third aspect, in a fifth possible implementation of the third aspect, the CTS control packet further carries receiver sensitivity of the receiving node, so that the adjacent node determines the receive power threshold or the signal-to-interference ratio threshold of the receiving node according to the receiver sensitivity of the receiving node.

With reference to the first possible implementation of the third aspect, in a sixth possible implementation of the third aspect, the determining, by the adjacent node, a second limited power includes:

determining, by the adjacent node, a third path loss between the adjacent node and the sending node according to the initial transmit power and a receive power of the received RTS update control packet; and determining, by the adjacent node, a power satisfying that a difference between the power and the third path loss is less than a receive power threshold of the sending node, as the second limited power, or determining a power satisfying that a ratio of the power minus the third path loss to a sum of current interference and noise is less than a signal-to-interference ratio threshold of the sending node, as the second limited power, where a duration of the control packet transmission performed by the adjacent node according to the second limited power is determined according to an NAV duration carried in the RTS update control packet.

With reference to the sixth possible implementation of the third aspect, in a seventh possible implementation of the third aspect, the RTS update control packet further carries receiver sensitivity of the sending node, so that the adjacent node determines the receive power threshold or the signal-to-interference ratio threshold of the sending node according to the receiver sensitivity of the sending node.

With reference to the third aspect, in an eighth possible implementation of the third aspect, the performing, by the adjacent node, control packet transmission according to the first limited power includes:

sending, by the adjacent node by using the first limited power, another RTS control packet carrying the first limited power and an identifier of a target node;

when the adjacent node receives another CTS control packet carrying another power update value and an identifier of the adjacent node, sending, by the adjacent node by using the first limited power, another RTS update control packet carrying the another power update value, so that other nodes different from the target node among nodes that receive the another RTS update control packet, after receiving the another RTS update control packet, if determining that the other nodes are located beyond coverage of an updated power of the adjacent node, determine a fourth limited power and perform control packet transmission according to the fourth limited power, where the another updated power is a power that is obtained by updating the first limited power by using the another power update value, the another updated power is lower than or equal to the first limited power, and the adjacent node is located beyond coverage of the fourth limited power of the other nodes different from the target node among the nodes that receive the another RTS update control packet; and sending, by the adjacent node, a data packet by using the another updated power.

With reference to the eighth possible implementation of the third aspect, in a ninth possible implementation of the third aspect, after the target node receives the another RTS control packet, if the target node is located beyond coverage of the initial transmit power of the sending node and the receiving node and is located beyond coverage of the initial transmit power of another sending node and another receiving node in another transmission pair that is performing data transmission, the target node sends, by using the initial transmit power, the another CTS control packet carrying the identifier of the adjacent node and the another power update value, so that other nodes different from the adjacent node among nodes that receive the another CTS control packet, after receiving the another CTS control packet, if determining that the other nodes are located beyond coverage of the another updated power of the target node and the adjacent node, determine a fifth limited power and perform control packet transmission according to the fifth limited power, where the target node is located beyond coverage of the fifth limited power of the other nodes different from the adjacent node among the nodes that receive the another CTS control packet.

With reference to the eighth possible implementation of the third aspect, in a tenth possible implementation of the third aspect, after the target node receives the another RTS control packet, if the target node is located within coverage of the initial transmit power of the sending node and the receiving node and/or is located within coverage of the initial transmit power of another sending node and another receiving node in another transmission pair that is performing data transmission, the target node sends, by using a sixth limited power, the another CTS control packet carrying the identifier of the adjacent node and the another power update value, so that other nodes different from the adjacent node among nodes that receive the another CTS control packet, after receiving the another CTS control packet, if determining that the other nodes are located beyond coverage of the another updated power of the target node and the adjacent node, determine a seventh limited power and perform control packet transmission according to the seventh limited power, where the sending node, the receiving node, and the another sending node and the another receiving node in the another transmission pair that is performing data transmission are located beyond coverage of the sixth limited power of the target node, the target node is located beyond coverage of the seventh limited power of the other nodes different from the adjacent node among the nodes that receive the another CTS control packet, and the sixth limited power is higher than the another updated power.

With reference to the first possible implementation of the third aspect, in an eleventh possible implementation of the third aspect, the performing, by the adjacent node, control packet transmission according to the second limited power includes:

if the adjacent node determines that a remaining duration of a data packet sending phase of the sending node is greater than a preset time threshold, sending, by the adjacent node by using the initial transmit power, still another RTS control packet carrying the second limited power and an identifier of another target node;

when the adjacent node receives still another CTS control packet carrying still another power update value and an identifier of the adjacent node, sending, by the adjacent node by using the initial transmit power, still another RTS update control packet carrying the still another power update value, so that other nodes different from the another target node among nodes that receive the still another RTS update control packet, after receiving the still another RTS update control packet, if determining that the other nodes are located beyond coverage of still another updated power of the adjacent node, determine an eighth limited power and perform control packet transmission according to the eighth limited power, where the still another updated power is a power that is obtained by updating the second limited power by using the still another power update value, the still another updated power is lower than or equal to the second limited power, and the adjacent node is located beyond coverage of the eighth limited power of the other nodes different from the another target node among the nodes that receive the still another RTS update control packet; and sending, by the adjacent node, a data packet by using the still another updated power.

With reference to the eleventh possible implementation of the third aspect, in a twelfth possible implementation of the third aspect, after the another target node receives the still another RTS control packet, if the another target node is located beyond coverage of the initial transmit power of the sending node and the receiving node and is located beyond coverage of the initial transmit power of another sending node and another receiving node in another transmission pair that is performing data transmission, the target node sends, by using the initial transmit power, the another CTS control packet carrying the identifier of the adjacent node and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine a ninth limited power and perform control packet transmission according to the ninth limited power, where the another target node is located beyond coverage of the ninth limited power of the other nodes different from the adjacent node among the nodes that receive the still another CTS control packet.

With reference to the eleventh possible implementation of the third aspect, in a thirteenth possible implementation of the third aspect, after the another target node receives the still another RTS control packet, if the another target node is located within coverage of the initial transmit power of the sending node and the receiving node and/or is located within coverage of the initial transmit power of another sending node and another receiving node in another transmission pair that is performing data transmission, the target node sends, by using a tenth limited power, the still another CTS control packet carrying the identifier of the adjacent node and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine an eleventh limited power and perform control packet transmission by using the eleventh limited power, where the sending node and the receiving node and/or the another sending node and the another receiving node in the another transmission pair that is performing data transmission are located beyond coverage of the tenth limited power of the another target node, the another target node is located beyond coverage of the eleventh limited power of the other nodes different from the adjacent node among the nodes that receive the still another CTS control packet, and the tenth limited power is higher than the still another updated power.

With reference to any one of the third aspect, and the first possible implementation to the thirteenth possible implementation of the third aspect, in a fourteenth possible implementation of the third aspect, the initial transmit power is a prescribed default transmit power, or an actually used transmit power carried in the RTS control packet or the CTS control packet.

According to a fourth aspect, a data transmission device is provided, where the data transmission device is applied to a sending node in a data transmission system, and the data transmission device includes:

a sending module, configured to send a request to send RTS control packet carrying an identifier of a receiving node, so that after the receiving node receives the RTS control packet, the receiving node determines a power update value according to an initial transmit power of the RTS control packet and sends a clear to send CTS control packet by using the initial transmit power, where the CTS control packet carries an identifier of the sending node and the power update value; a first part of adjacent nodes other than the sending node, after receiving the CTS control packet, if determining that the first part of adjacent nodes are located beyond coverage of an updated power of the receiving node and the sending node, determine a first limited power and perform control packet transmission according to the first limited power; and the updated power is a power that is obtained by updating the initial transmit power by using the power update value, the updated power is lower than the initial transmit power, and the receiving node and the sending node are located beyond coverage of the first limited power of the first part of adjacent nodes; and a receiving module, configured to receive the CTS control packet; where the sending module is further configured to send a data packet by using the updated power, where the updated power is further used by the receiving node to send an ACK signal by using the updated power after the receiving node completely receives the data packet sent by the sending node.

With reference to the fourth aspect, in a first possible implementation of the fourth aspect, after the receiving module receives the CTS control packet, and before the data packet is sent by using the updated power, the sending module is further configured to send an RTS update control packet by using the initial transmit power, where the RTS update control packet carries the power update value; a second part of adjacent nodes that receive the RTS update control packet but do not receive the CTS control packet, when determining that the second part of adjacent nodes are located beyond the coverage of the updated power of the sending node, determine a second limited power and perform control packet transmission according to the second limited power; and the sending node is located beyond coverage of the second limited power of the second part of adjacent nodes.

With reference to the fourth aspect, in a second possible implementation of the fourth aspect, a third part of adjacent nodes that receive the RTS control packet but do not receive the CTS control packet and the data packet determine a third limited power and perform control packet transmission according to the third limited power; and the sending node is located beyond coverage of the third limited power of the third part of adjacent nodes.

With reference to the fourth aspect, in a third possible implementation of the fourth aspect, that a first part of adjacent nodes determine that the first part of adjacent nodes are located beyond coverage of an updated power of the receiving node and the sending node is implemented in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal-to-interference ratio threshold of the first part of adjacent nodes, determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and a receive power of the received CTS control packet, and when a difference between the updated power and the first path loss is less than a receive power threshold of the first part of adjacent nodes, or when a ratio of a difference between the updated power and the first path loss to a sum of current interference and noise is less than a signal-to-interference ratio threshold of the first part of adjacent nodes, determine that the first part of adjacent nodes are located beyond the coverage of the updated power of the receiving node and the sending node.

With reference to the fourth aspect, in a fourth possible implementation of the fourth aspect, the first part of adjacent nodes determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the first part of adjacent nodes according to the first limited power is determined according to a network allocation vector NAV duration carried in the RTS control packet and an NAV duration carried in the CTS control packet; or when the first part of adjacent nodes do not receive the RTS control packet, the first part of adjacent nodes determine a first path loss between the first part of adjacent nodes and the receiving node according to the initial transmit power and a receive power of the received CTS control packet, and determine a power satisfying that a difference between the power and the first path loss is less than a receive power threshold of the receiving node, as the first limited power, or determine a power satisfying that a ratio of the power minus the first path loss to a sum of current interference and noise is less than a signal-to-interference ratio threshold of the receiving node, as the first limited power, where a duration of the control packet transmission performed by the first part of adjacent nodes according to the first limited power is determined according to an NAV duration carried in the CTS control packet.

With reference to the fourth possible implementation of the fourth aspect, in a fifth possible implementation of the fourth aspect, the CTS control packet further carries receiver sensitivity of the receiving node, so that the first part of adjacent nodes determine the receive power threshold or the signal-to-interference ratio threshold of the receiving node according to the receiver sensitivity of the receiving node.

With reference to the first possible implementation of the fourth aspect, in a sixth possible implementation of the fourth aspect, the second part of adjacent nodes determine the second limited power in the following manner:

the second part of adjacent nodes determine a third path loss between the second part of adjacent nodes and the sending node according to the initial transmit power and a receive power of the received RTS update control packet; and the second part of adjacent nodes determine a power satisfying that a difference between the power and the third path loss is less than a receive power threshold of the sending node, as the second limited power, or determine a power satisfying that a ratio of the power minus the third path loss to a sum of current interference and noise is less than a signal-to-interference ratio threshold of the sending node, as the second limited power, where a duration of the control packet transmission performed by the second part of adjacent nodes according to the second limited power is determined according to an NAV duration carried in the RTS update control packet.

With reference to the sixth possible implementation of the fourth aspect, in a seventh possible implementation of the fourth aspect, the RTS update control packet further carries receiver sensitivity of the sending node, so that the second part of adjacent nodes determine the receive power threshold or the signal-to-interference ratio threshold of the sending node according to the receiver sensitivity of the sending node.

With reference to any one of the fourth aspect, and the first possible implementation of the fourth aspect to the seventh possible implementation of the fourth aspect, in an eighth possible implementation of the fourth aspect, the initial transmit power is a prescribed default transmit power, or an actually used transmit power carried in the RTS control packet or the CTS control packet.

According to a fifth aspect, another data transmission device is provided, where the data transmission device is applied to a receiving node in a data transmission system, and the data transmission device includes:

a receiving module, configured to receive a request to send RTS control packet that carries an identifier of the receiving node and is sent by a sending node;

a determining module, configured to determine a power update value according to an initial transmit power of the RTS control packet; and a sending module, configured to send a clear to send CTS control packet by using the initial transmit power, where the CTS control packet carries an identifier of the sending node and the power update value; when receiving the CTS control packet, the sending node determines an updated power according to the power update value and sends a data packet by using the updated power; a first part of adjacent nodes other than the sending node among nodes that receive the CTS control packet, when determining that the first part of adjacent nodes are located beyond coverage of the updated power of the receiving node and the sending node, determine a first limited power and perform control packet transmission according to the first limited power; and the updated power is a power that is obtained by updating the initial transmit power by using the power update value, the updated power is lower than the initial transmit power, the updated power is further used by the receiving node to send an ACK signal by using the updated power after the receiving node completely receives the data packet sent by the sending node, and the receiving node and the sending node are located beyond coverage of the first limited power of the first part of adjacent nodes.

With reference to the fifth aspect, in a first possible implementation of the fifth aspect, the RTS control packet further carries a modulation and coding scheme MCS level and a quality of service QoS level that are expected by the sending node; and the determining module is specifically configured to determine, according to the initial transmit power, the MCS level, and the QoS level, a power ratio allowed to be reduced, where the power ratio allowed to be reduced is inversely proportional to the MCS level and the QoS level respectively.

With reference to the fifth aspect, in a second possible implementation of the fifth aspect, the determining module is specifically configured to determine, according to the initial transmit power, an MCS level expected by the receiving node, and receiver sensitivity, a power ratio allowed to be reduced, where the power ratio allowed to be reduced is inversely proportional to the MCS level and directly proportional to the receiver sensitivity; where the CTS control packet further carries the MCS level, so that the sending node sends the data packet by using the MCS level.

With reference to the fifth aspect, in a third possible implementation of the fifth aspect, the determining module is specifically configured to: perform a calculus operation using a distance as a variable on a product of a size of a non-overlapping area of the coverage of the updated power and coverage of the initial transmit power, a node density of the non-overlapping area, and a service arrival rate of the non-overlapping area by using a radius of the coverage of the updated power as a lower limit and a radius of the coverage of the initial transmit power as an upper limit respectively, to obtain potential interference; determine a path loss between the receiving node and the sending node according to the initial transmit power and a receive power of the received RTS control packet; and determine the power update value according to a condition that a difference between the updated power and the path loss, divided by a sum of the potential interference, current interference, and current noise, is greater than or equal to a signal-to-interference ratio threshold of the receiving node.

With reference to the fifth aspect, in a fourth possible implementation of the fifth aspect, that a first part of adjacent nodes determine that the first part of adjacent nodes are located beyond coverage of the updated power of the receiving node and the sending node is implemented in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal-to-interference ratio threshold of the first part of adjacent nodes, determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and a receive power of the received CTS control packet, and when a difference between the updated power and the first path loss is less than a receive power threshold of the first part of adjacent nodes, or when a ratio of a difference between the updated power and the first path loss to a sum of current interference and noise is less than a signal-to-interference ratio threshold of the first part of adjacent nodes, determine that the first part of adjacent nodes are located beyond the coverage of the updated power of the receiving node and the sending node.

With reference to the fifth aspect, in a fifth possible implementation of the fifth aspect, the first part of adjacent nodes determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the first part of adjacent nodes according to the first limited power is determined according to a network allocation vector NAV duration carried in the RTS control packet and an NAV duration carried in the CTS control packet; or when the first part of adjacent nodes do not receive the RTS control packet, the first part of adjacent nodes determine a first path loss between the first part of adjacent nodes and the receiving node according to the initial transmit power and a receive power of the received CTS control packet, and determine a power satisfying that a difference between the power and the first path loss is less than a receive power threshold of the receiving node, as the first limited power, or determine a power satisfying that a ratio of the power minus the first path loss to a sum of current interference and noise is less than a signal-to-interference ratio threshold of the receiving node, as the first limited power, where a duration of the control packet transmission performed by the first part of adjacent nodes according to the first limited power is determined according to an NAV duration carried in the CTS control packet.

With reference to the fifth possible implementation of the fifth aspect, in a sixth possible implementation of the fifth aspect, the CTS control packet further carries receiver sensitivity of the receiving node, so that the first part of adjacent nodes determine the receive power threshold or the signal-to-interference ratio threshold of the receiving node according to the receiver sensitivity of the receiving node.

With reference to any one of the fifth aspect, and the first possible implementation of the fifth aspect to the sixth possible implementation of the fifth aspect, in a seventh possible implementation of the fifth aspect, the initial transmit power is a prescribed default transmit power, or an actually used transmit power carried in the RTS control packet or the CTS control packet.

According to a sixth aspect, a data transmission device is provided, where the data transmission device is applied to an adjacent node in a data transmission system, and the data transmission device includes:

a determining module, configured to: when the adjacent node receives a clear to send CTS control packet that carries an identifier of a sending node and a power update value and is sent by a receiving node, determine whether the adjacent node is located beyond coverage of an updated power of the receiving node and the sending node, where the CTS control packet is sent by the receiving node by using an initial transmit power after the receiving node receives a request to send RTS control packet that carries an identifier of the receiving node and is sent by the sending node, and determines the power update value according to the initial transmit power of the RTS control packet; and the power update value is used by the sending node to update the initial transmit power by using the power update value to obtain the updated power after the sending node receives the CTS control packet, so that a data packet is sent by using the updated power, the updated power is lower than the initial transmit power, and the updated power is further used by the receiving node to send an ACK signal by using the updated power after the receiving node completely receives the data packet sent by the sending node; and when determining that the adjacent node is located beyond the coverage of the updated power of the receiving node and the sending node, determine a first limited power, where the receiving node and the sending node are located beyond coverage of the first limited power of the adjacent node; and a transmission module, configured to perform control packet transmission according to the first limited power.

With reference to the sixth aspect, in a first possible implementation of the sixth aspect, the determining module is further configured to: when the adjacent node receives an RTS update control packet that carries the power update value and is sent by the sending node, but does not receive the CTS control packet, determine whether the adjacent node is located beyond the coverage of the updated power of the sending node, where the RTS update control packet is sent by the sending node by using the initial transmit power after the CTS control packet is received and before the data packet is sent by using the updated power; and when determining that the adjacent node is located beyond the coverage of the updated power of the sending node, determine a second limited power, where the sending node is located beyond coverage of the second limited power of the adjacent node; and the transmission module is configured to perform control packet transmission according to the second limited power, where the sending node is located beyond the coverage of the second limited power of the adjacent node.

With reference to the sixth aspect, in a second possible implementation of the sixth aspect, the determining module is further configured to: when the adjacent node receives the RTS control packet, but does not receive the CTS control packet and the data packet, determine a third limited power, and enable the transmission module to perform control packet transmission according to the third limited power, where the sending node is located beyond coverage of the third limited power of the adjacent node; and the transmission module is configured to perform control packet transmission according to the third limited power.

With reference to the sixth aspect, in a third possible implementation of the sixth aspect, the determining module is specifically configured to determine, in the following manner, that the adjacent node is located beyond the coverage of the updated power of the receiving node and the sending node:

if the adjacent node receives the RTS control packet, separately determining a first path loss between the adjacent node and the receiving node and a second path loss between the adjacent node and the sending node according to the initial transmit power, a receive power of the received CTS control packet, and a receive power of the received RTS control packet, and when a difference between the updated power and the first path loss and a difference between the updated power and the second path loss are both less than a receive power threshold of the adjacent node, or when a ratio of a difference between the updated power and the first path loss to a sum of current noise and interference and a ratio of a difference between the updated power and the second path loss to the sum of current noise and interference are both less than a signal-to-interference ratio threshold of the adjacent node, determining that the adjacent node is located beyond the coverage of the updated power of the receiving node and the sending node; or if the adjacent node does not receive the RTS control packet, determining a first path loss between the adjacent node and the receiving node according to the initial transmit power and a receive power of the received CTS control packet, and when a difference between the updated power and the first path loss is less than a receive power threshold of the adjacent node, or when a ratio of a difference between the updated power and the first path loss to a sum of current interference and noise is less than a signal-to-interference ratio threshold of the adjacent node, determining that the adjacent node is located beyond the coverage of the updated power of the receiving node and the sending node.

With reference to the sixth aspect, in a fourth possible implementation of the sixth aspect, the determining module is specifically configured to determine the first limited power in the following manner:

if the adjacent node receives the RTS control packet, separately determining a first path loss between the adjacent node and the receiving node and a second path loss between the adjacent node and the sending node according to the initial transmit power, a receive power of the received CTS control packet, and a receive power of the received RTS control packet, and determining a power satisfying that a difference between the power and the first path loss is less than a receive power threshold of the receiving node and that a difference between the power and the second path loss is less than a receive power threshold of the sending node, as the first limited power, or determining a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the adjacent node according to the first limited power is determined according to a network allocation vector NAV duration carried in the RTS control packet and an NAV duration carried in the CTS control packet; or if the adjacent node does not receive the RTS control packet, determining a first path loss between the adjacent node and the receiving node according to the initial transmit power and a receive power of the received CTS control packet, and determining a power satisfying that a difference between the power and the first path loss is less than a receive power threshold of the receiving node, as the first limited power, or determining a power satisfying that a ratio of the power minus the first path loss to a sum of current interference and noise is less than a signal-to-interference ratio threshold of the receiving node, as the first limited power, where a duration of the control packet transmission performed by the adjacent node according to the first limited power is determined according to an NAV duration carried in the CTS control packet.

With reference to the fourth possible implementation of the sixth aspect, in a fifth possible implementation of the sixth aspect, the CTS control packet further carries receiver sensitivity of the receiving node, so that the adjacent node determines the receive power threshold or the signal-to-interference ratio threshold of the receiving node according to the receiver sensitivity of the receiving node.

With reference to the first possible implementation of the sixth aspect, in a sixth possible implementation of the sixth aspect, the determining module is specifically configured to determine the second limited power in the following manner:

determining a third path loss between the adjacent node and the sending node according to the initial transmit power and a receive power of the received RTS update control packet; and determining a power satisfying that a difference between the power and the third path loss is less than a receive power threshold of the sending node, as the second limited power, or determining a power satisfying that a ratio of the power minus the third path loss to a sum of current interference and noise is less than a signal-to-interference ratio threshold of the sending node, as the second limited power, where a duration of the control packet transmission performed by the adjacent node according to the second limited power is determined according to an NAV duration carried in the RTS control packet.

With reference to the sixth possible implementation of the sixth aspect, in a seventh possible implementation of the sixth aspect, the RTS update control packet further carries receiver sensitivity of the sending node, so that the adjacent node determines the receive power threshold or the signal-to-interference ratio threshold of the sending node according to the receiver sensitivity of the sending node.

With reference to the sixth aspect, in an eighth possible implementation of the sixth aspect, the transmission module is specifically configured to:

send, by using the first limited power, another RTS control packet carrying the first limited power and an identifier of a target node;

when receiving another CTS control packet carrying another power update value and an identifier of the adjacent node, send, by using the first limited power, another RTS update control packet carrying the another power update value, so that other nodes different from the target node among nodes that receive the another RTS update control packet, after receiving the another RTS update control packet, if determining that the other nodes are located beyond coverage of an updated power of the adjacent node, determine a fourth limited power and perform control packet transmission according to the fourth limited power, where the another updated power is a power that is obtained by updating the first limited power by using the another power update value, the another updated power is lower than or equal to the first limited power, and the adjacent node is located beyond coverage of the fourth limited power of the other nodes different from the target node among the nodes that receive the another RTS update control packet; and send, by the adjacent node, a data packet by using the another updated power.

With reference to the eighth possible implementation of the sixth aspect, in a ninth possible implementation of the sixth aspect, after the target node receives the another RTS control packet, if the target node is located beyond coverage of the initial transmit power of the sending node and the receiving node and is located beyond coverage of the initial transmit power of another sending node and another receiving node in another transmission pair that is performing data transmission, the target node sends, by using the initial transmit power, the another CTS control packet carrying the identifier of the adjacent node and the another power update value, so that other nodes different from the adjacent node among nodes that receive the another CTS control packet, after receiving the another CTS control packet, if determining that the other nodes are located beyond coverage of the another updated power of the adjacent node, determine a fifth limited power and perform control packet transmission according to the fifth limited power, where the target node is located beyond coverage of the fifth limited power of the other nodes different from the adjacent node among the nodes that receive the another CTS control packet, and the first limited power is higher than the another updated power.

With reference to the eighth possible implementation of the sixth aspect, in a tenth possible implementation of the sixth aspect, after the target node receives the another RTS control packet, if the target node is located within coverage of the initial transmit power of the sending node and the receiving node and/or is located within coverage of the initial transmit power of another sending node and another receiving node in another transmission pair that is performing data transmission, the target node sends, by using a sixth limited power, the another CTS control packet carrying the identifier of the adjacent node and the another power update value, so that other nodes different from the adjacent node among nodes that receive the another CTS control packet, after receiving the another CTS control packet, if determining that the other nodes are located beyond coverage of the another updated power of the target node and the adjacent node, determine a seventh limited power and perform control packet transmission according to the seventh limited power, where the sending node, the receiving node, and the another sending node and the another receiving node in the another transmission pair that is performing data transmission are located beyond coverage of the sixth limited power of the target node, the target node is located beyond coverage of the seventh limited power of the other nodes different from the adjacent node among the nodes that receive the another CTS control packet, and the sixth limited power is higher than the another updated power.

With reference to the first possible implementation of the sixth aspect, in an eleventh possible implementation of the sixth aspect, the transmission module is specifically configured to:

if the adjacent node determines that a remaining duration of a data packet sending phase of the sending node is greater than a preset time threshold, send, by using the initial transmit power, still another RTS control packet carrying the second limited power and another target node;

when receiving still another CTS control packet carrying still another power update value and an identifier of the adjacent node, send, by using the initial transmit power, still another RTS update control packet carrying the still another power update value, so that other nodes different from the another target node among nodes that receive the still another RTS update control packet, after receiving the still another RTS update control packet, if determining that the other nodes are located beyond coverage of still another updated power of the adjacent node, determine an eighth limited power and perform control packet transmission according to the eighth limited power, where the still another updated power is a power that is obtained by updating the second limited power by using the still another power update value, the still another updated power is lower than or equal to the second limited power, and the adjacent node is located beyond coverage of the eighth limited power of the other nodes different from the another target node among the nodes that receive the still another RTS update control packet; and send a data packet by using the still another updated power.

With reference to the eleventh possible implementation of the sixth aspect, in a twelfth possible implementation of the sixth aspect, after the another target node receives the still another RTS control packet, if the another target node is located beyond coverage of the initial transmit power of the sending node and the receiving node and is located beyond coverage of the initial transmit power of another sending node and another receiving node in another transmission pair that is performing data transmission, the target node sends, by using the initial transmit power, the another CTS control packet carrying the identifier of the adjacent node and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine a ninth limited power and perform control packet transmission according to the ninth limited power, where the another target node is located beyond coverage of the ninth limited power of the other nodes different from the adjacent node among the nodes that receive the still another CTS control packet, and the second limited power is higher than the still another updated power.

With reference to the eleventh possible implementation of the sixth aspect, in a thirteenth possible implementation of the sixth aspect, after the another target node receives the still another RTS control packet, if the another target node is located within coverage of the initial transmit power of the sending node and the receiving node and/or is located within coverage of the initial transmit power of another sending node and another receiving node in another transmission pair that is performing data transmission, the target node sends, by using a tenth limited power, the still another CTS control packet carrying the identifier of the adjacent node and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine an eleventh limited power and perform control packet transmission according to the eleventh limited power, where the sending node and the receiving node and/or the another sending node and the another receiving node in the another transmission pair that is performing data transmission are located beyond coverage of the tenth limited power of the another target node, the another target node is located beyond coverage of the eleventh limited power of the other nodes different from the adjacent node among the nodes that receive the still another CTS control packet, and the tenth limited power is higher than the still another updated power.

With reference to any one of the sixth aspect, and the first possible implementation of the sixth aspect to the thirteenth possible implementation of the sixth aspect, in a fourteenth possible implementation of the sixth aspect, the initial transmit power is a prescribed default transmit power, or an actually used transmit power carried in the RTS control packet and the CTS control packet.

According to a seventh aspect, a data transmission system is provided and includes more than two nodes, where a sending node is configured to send a request to send RTS control packet carrying an identifier of a receiving node;

the receiving node is configured to determine a power update value according to an initial transmit power of the RTS control packet, and send a clear to send CTS control packet by using the initial transmit power, where the CTS control packet carries an identifier of the sending node and the power update value;

an adjacent node is configured to: after receiving the CTS control packet, if determining that the adjacent node is located beyond coverage of an updated power of the receiving node and the sending node, determine a first limited power, and perform control packet transmission according to the first limited power, where the updated power is a power that is obtained by updating the initial transmit power by using the power update value, the updated power is lower than the initial transmit power, and the receiving node and the sending node are located beyond coverage of the first limited power of the first part of adjacent nodes;

the sending node is further configured to receive the CTS control packet, and send a data packet by using the updated power; and the receiving node is further configured to send an ACK signal by using the updated power after completely receiving the data packet sent by the sending node.

With reference to the seventh aspect, in a first possible implementation of the seventh aspect, the sending node includes the data transmission device according to any one of the fourth aspect, and the first possible implementation of the fourth aspect to the eighth possible implementation of the fourth aspect;

the receiving node includes the data transmission device according to any one of the fifth aspect, and the first possible implementation of the fifth aspect to the seventh possible implementation of the fifth aspect; and the adjacent node includes the data transmission device according to any one of the sixth aspect, and the first possible implementation of the sixth aspect to the fourteenth possible implementation of the sixth aspect.

Compared with the prior art, the embodiments of the present invention have the following beneficial effects:

In the embodiments of the present invention, after receiving an RTS control packet sent by a sending node, a receiving node may determine a power update value according to an initial transmit power of the RTS control packet, and send a CTS control packet carrying the power update value. Therefore, unlike the prior art in which an adjacent node needs to stop data transmission when receiving an RTS control packet or a CTS control packet, the sending node can perform, according to the power update value, data packet transmission by using an updated power lower than the initial transmit power, and an adjacent node receiving the CTS control packet but located beyond coverage of the updated power of the sending node and the receiving node can perform control packet transmission by using a limited power that does not cover the sending node and the receiving node. On the one hand, spectrum resource utilization is improved. On the other hand, optimized matching of transmit powers is implemented, and power consumption of the sending node and the receiving node is reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2 is a schematic flowchart of a data transmission method disclosed in an embodiment of the present invention;

FIG. 3 is a schematic flowchart of another data transmission method disclosed in an embodiment of the present invention;

FIG. 6 is a schematic flowchart of a data transmission method disclosed in an embodiment of the present invention;

FIG. 7 is a schematic structural diagram of a data transmission device disclosed in an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention disclose a data transmission method, device, and system to improve spectrum resource utilization. The embodiments are hereinafter described in detail separately.

Figure 1:
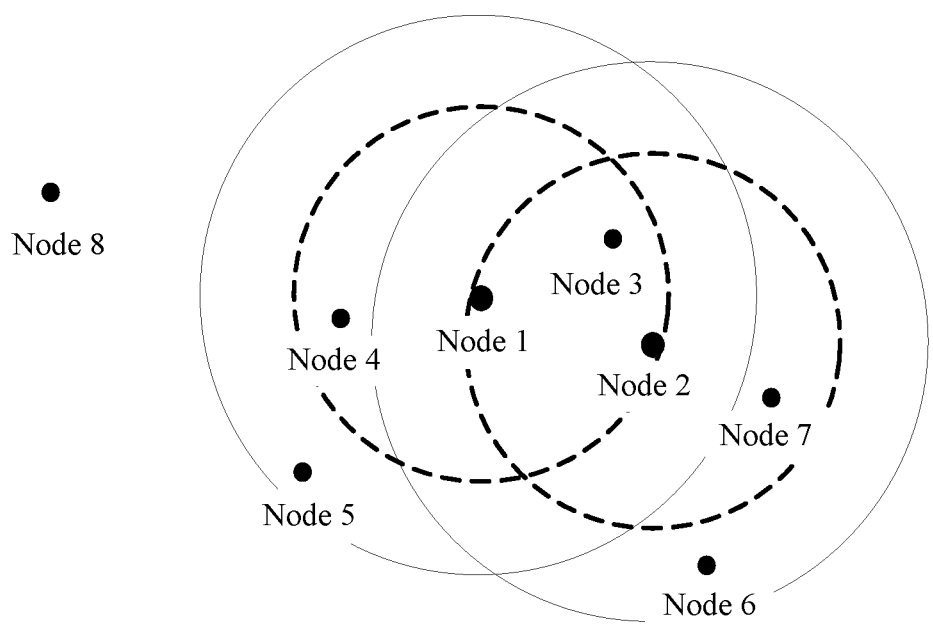
FIG. 1 is a schematic diagram of a network architecture disclosed in an embodiment of the present invention.

To help understand the embodiments of the present invention, the following first describes a network architecture of the embodiments of the present invention. Referring to FIG. 1, FIG. 1 is a schematic diagram of a network architecture disclosed in an embodiment of the present invention. As shown in FIG. 1, the network architecture in this embodiment of the present invention may include multiple nodes. Any one of the multiple nodes may be used as a sending node to communicate with any adjacent node within coverage of the sending node by using a direct link, and the any adjacent node is a receiving node in the communication. For example, a node 1 shown in FIG. 1, used as a sending node, may communicate, by using a direct link, with a node 2 used as a receiving node, and a node 4 may be used as a sending node to communicate, by using a direct link, with a node 5 used as a receiving node, and so on.

In this embodiment of the present invention, the foregoing node may be any terminal that can perform communication by using a direct link, for example, a station that can perform communication by using a direct link in a WIFI (WIreless-Fidelity, Wireless Fidelity) network, or a terminal device that can perform D2D (Device-to-Device, device-to-device) transmission in an LTE (Long Term Evolution, Long Term Evolution) network.

In the network architecture shown in FIG. 1, when the sending node wants to send data, the sending node may send, by using an initial transmit power, an RTS control packet carrying an identifier of the receiving node; after receiving the RTS control packet, to implement optimized matching of transmit powers and reduce power consumption of the sending node and the receiving node, the receiving node may determine a power update value according to the initial transmit power, and send a CTS control packet carrying the power update value and an identifier of the sending node, so that after the sending node receives the CTS control packet, the sending node determines an updated power according to the power update value and sends a data packet by using the updated power, where the updated power is lower than the initial transmit power.

In addition, in the network architecture shown in FIG. 1, for an adjacent node other than the sending node and the receiving node, when the adjacent node receives the CTS control packet sent by the receiving node, the adjacent node does not directly stop transmission, but may further determine whether the adjacent node is located within coverage of the updated power of the sending node and the receiving node, and when determining that the adjacent node is located beyond the coverage of the updated power of the sending node and the receiving node, that is, a data packet or an ACK signal sent by the sending node and the receiving node by using the updated power does not cause interference to the adjacent node, the adjacent node may perform control packet transmission by using a limited power, where the sending node and the receiving node are beyond coverage of the limited power of the adjacent node, that is, when the adjacent node performs control packet transmission by using the limited power, no interference is caused to data transmission between the sending node and the receiving node. In the network architecture shown in FIG. 1, a dashed line circle with the node 1 as a center may be used as coverage of an initial transmit power of the node 1, and a dashed line circle with the node 1 as a center may be used as coverage of an updated power of the node 1; a dashed line circle with the node 2 as a center may be used as coverage of an initial transmit power of the node 2, and a dashed line circle with the node 2 as a center may be used as coverage of an updated power of the node 2.

That the adjacent node performs control packet transmission by using the limited power includes: performing RTS control packet transmission by using the limited power (used as a sending node to send an RTS control packet when there is a request to send data) or CTS control packet transmission (used as a receiving node to send a CTS control packet when receiving an RTS control packet that carries an identifier of the adjacent node and is sent by another sending node).

It should be understood that, in this embodiment of the present invention, the sending node, the receiving node, and the adjacent node are relative, and do not particularly denote one or several fixed nodes. For example, when the node 1 needs to send data to the node 2, in the transmission pair of the node 1 and the node 2, the node 1 is a sending node, the node 2 is a receiving node, and correspondingly, nodes except the node 1 and the node 2 (for example, a node 3, the node 4, the node 5, a node 6, . . . ) are adjacent nodes; when the node 3 needs to send data to the node 4, in the transmission pair of the node 3 and the node 4, the node 3 is a sending node, the node 4 is a receiving node, and the node 1 and the node 2 are both adjacent nodes.

As can be seen, a sending node and a receiving node reduce coverage by reducing a transmit power, so that an adjacent node learns that transmission is performed between the sending node and a transmission node by using a relatively lower power, and therefore, simultaneously performs data transmission by using a same resource and a limited power as far as possible, to ensure that interference is acceptable. In this way, an objective of improving spatial multiplexing is achieved.

Based on the network architecture shown in FIG. 1, an embodiment of the present invention discloses a data transmission method. Referring to FIG. 2, FIG. 2 is a schematic flowchart of a data transmission method disclosed in an embodiment of the present invention. The method described in FIG. 2 is described from a perspective of a sending node. As shown in FIG. 2, the method may include the following steps.

Step 201: A sending node sends an RTS control packet carrying an identifier of a receiving node, so that after the receiving node receives the RTS control packet, the receiving node determines a power update value according to an initial transmit power of the RTS control packet and sends a CTS control packet by using the initial transmit power, where the CTS control packet carries an identifier of the sending node and the power update value; a first part of adjacent nodes other than the sending node, after receiving the CTS control packet, if determining that the first part of adjacent nodes are located beyond coverage of an updated power of the receiving node and the sending node, determine a first limited power and perform control packet transmission according to the first limited power; and the updated power is a power that is obtained by updating the initial transmit power by using the power update value, the updated power is lower than the initial transmit power, and the receiving node and the sending node are located beyond coverage of the first limited power of the first part of adjacent nodes.

Step 202: The sending node receives the CTS control packet, and sends a data packet by using the updated power, where the updated power is further used by the receiving node to send an ACK signal by using the updated power after the receiving node completely receives the data packet sent by the sending node.

In this embodiment of the present invention, when the sending node needs to send data, the sending node may first send the RTS control packet, where the RTS control packet may carry the identifier of the receiving node, so that a node that receives the RTS control packet determines, according to the identifier of the receiving node carried in the RTS control packet, whether the node is the receiving node.

After the receiving node receives the RTS control packet sent by the sending node, if the receiving node is not in a silent period, that is, the receiving node is not located within coverage of another transmission pair (another sending node and another receiving node) in a communication state, the receiving node may determine the power update value according to the initial transmit power of the RTS control packet sent by the sending node, and send the CTS control packet carrying the power update value and the identifier of the sending node.

In an optional implementation, in this embodiment of the present invention, the receiving node may determine the power update value according to the initial transmit power of the RTS control packet sent by the sending node, a path loss between the receiving node and the sending node, and a receive power threshold of the receiving node.

For example, after receiving the RTS control packet sent by the sending node, the receiving node may determine the path loss between the receiving node and the sending node according to the initial transmit power and a receive power of the received RTS control packet, and further determine the power update value according to the receive power threshold of the receiving node and the path loss and according to a principle that a difference between the transmit power of the sending node and the path loss is not less than the receive power threshold of the receiving node. The power update value may be a power ratio allowed to be reduced (such as x %, and correspondingly, the power that is obtained by updating the initial transmit power by using the power update value is ((1−x %)*Initial transmit power)), or may be the specific updated power (such as ((1−x %)*Initial transmit power)).

In another optional implementation, in this embodiment of the present invention, the RTS control packet sent by the sending node may further carry an MCS (Modulation and Coding Scheme, modulation and coding scheme) level and a QoS (Quality of Service, quality of service) level that are expected by the sending node.

Correspondingly, that the receiving node determines a power update value according to an initial transmit power of the RTS control packet may include:

the receiving node determines, according to the initial transmit power, the MCS level, and the QoS level, a power ratio allowed to be reduced, where the power ratio allowed to be reduced is inversely proportional to the MCS level and the QoS level respectively, that is, if the MCS level carried in the RTS control packet is higher, the power ratio allowed to be reduced that is determined by the receiving node is smaller, and if the QoS level carried in the RTS control packet is higher, the power ratio allowed to be reduced that is determined by the receiving node is smaller.

For example, given the same initial transmit power of the RTS control packet and the same QoS level carried in the RTS control packet, when a corresponding power ratio allowed to be reduced when the MCS level carried in the RTS control packet is 256QAM (Quadrature Amplitude Modulation, quadrature amplitude modulation) transmission is compared with a corresponding power ratio allowed to be reduced when the MCS level carried in the RTS control packet is QPSK (Quadrature Phase Shift Keying, quadrature phase shift keying) transmission, the power ratio allowed to be reduced in the former is smaller.

In still another optional implementation, in this embodiment of the present invention, that the receiving node determines a power update value according to an initial transmit power of the RTS control packet may include:

the receiving node determines, according to the initial transmit power, an MCS level expected by the receiving node, and receiver sensitivity, a power ratio allowed to be reduced, where the power ratio allowed to be reduced is inversely proportional to the MCS level and directly proportional to the receiver sensitivity.

For example, given the same initial transmit power of the RTS control packet and the same MCS level expected by the receiving node, when the receiver sensitivity of the receiving node is higher, the power ratio allowed to be reduced is larger.

In this optional implementation, the CTS control packet sent by the receiving node needs to carry the MCS level expected by the receiving node, in addition to the identifier of the sending node and the power update value, so that after the sending node receives the CTS control packet, when sending the data packet, the sending node sends the data packet by using the MCS level.

In yet another optional implementation, in this embodiment of the present invention, that the receiving node determines a power update value according to an initial transmit power of the RTS control packet may include:

the receiving node performs a calculus operation using a distance as a variable on a product of a size of a non-overlapping area of the coverage of the updated power and coverage of the initial transmit power, a node density of the non-overlapping area, and a service arrival rate of the non-overlapping area by using a radius of the coverage of the updated power as a lower limit and a radius of the coverage of the initial transmit power as an upper limit respectively, to obtain potential interference, where the updated power is the power that is obtained by updating the initial transmit power by using the power update value;

the receiving node determines a path loss between the receiving node and the sending node according to the initial transmit power and a receive power of the received RTS control packet; and the receiving node determines the power update value according to a condition that a difference between the updated power and the path loss, divided by a sum of the potential interference, current interference, and current noise, is greater than or equal to a signal-to-interference ratio threshold of the receiving node.

For example, in this optional implementation, the receiving node may determine a maximum path loss within the coverage of the initial transmit power of the receiving node according to the initial transmit power and a prescribed default receive power threshold, and determine the radius (Region2_outer) of the coverage of the initial transmit power of the receiving node according to a path loss formula; likewise, the receiving node may determine the radius (Region2_inner) of the coverage of the updated power.

Further, the receiving node may determine the potential interference Interference$_{potential}$ by using the following formula:

$$\text{Interference}_{potential} = \int_{Region2\_inner}^{Region2\_outer} \rho \cdot \lambda \cdot \pi r^2 dr,$$

where $\rho$ is the node density of the non-overlapping area of the coverage of the initial transmit power and the coverage of the updated power of the receiving node, $\lambda$ is the service arrival rate of the non-overlapping area, and r is a radius of coverage of the transmit power of the receiving node.

Further, the receiving node may determine, according to the following formula, the power ratio allowed to be reduced:

$$((1-x\%)*P_{t0}-PL)/(\text{Interference}_{potential}+I+N) \geq \text{SIN-R}_{\_threshold},$$ where x % is the power ratio allowed to be reduced, $P_{t0}$ is the initial transmit power, PL is the path loss between the sending node and the receiving node, I is the current interference, N is the current noise, and $\text{SINR}_{\_threshold}$ is the signal-to-interference ratio threshold of the receiving node.

It should be noted that, in this embodiment of the present invention, the power update value carried in the CTS control packet may be a power update value determined in any one of the foregoing optional implementations, or the CTS control packet may carry power update values respectively determined in two or more of the foregoing optional implementations. For example, the CTS control packet may carry the power update value determined in the foregoing first optional implementation and the power update value determined in the foregoing fourth optional implementation. After receiving the CTS control packet, the sending node may select a corresponding power update value according to an actual requirement (power saving first or interference reduction first) to update the initial transmit power, so as to obtain an updated power, and send the data packet by using the updated power. A specific implementation thereof is not described herein. In addition, when determining the power update value, the receiving node needs to ensure that the data packet sent by the sending node according to the updated power corresponding to the power update value can be received by the receiving node.

In this embodiment of the present invention, after determining the power update value, the receiving node may add the power update value to the CTS control packet, and send, by using the initial transmit power, the CTS control packet carrying the power update value, so that a node that receives the CTS control packet may determine the corresponding updated power according to the power update value carried in the CTS control packet. The updated power is lower than the initial transmit power.

In this embodiment of the present invention, after receiving the CTS control packet sent by the receiving node, the sending node may update the initial transmit power according to the power update value carried in the CTS control packet, to obtain the updated power, and send the data packet by using the updated power. Correspondingly, after completely receiving the data packet sent by the sending node, the receiving node may send the ACK signal by using the updated power.

In this embodiment of the present invention, after receiving the CTS control packet, the adjacent nodes (the first part of adjacent nodes) other than the sending node may determine, according to the initial transmit power and the power update value, whether the first part of adjacent nodes are located within the coverage of the updated power of the receiving node and the sending node, and when determining that the first part of adjacent nodes are located beyond the coverage of the updated power of the receiving node and the sending node, the first part of adjacent nodes may determine the first limited power, and perform control packet transmission according to the first limited power. The receiving node and the sending node are located beyond the coverage of the first limited power of the first part of adjacent nodes.

It should be noted that, in this embodiment of the present invention, when the adjacent nodes other than the sending node and the receiving node determine that the adjacent nodes are located within the coverage of the updated power of the sending node and/or the receiving node, the adjacent nodes still need to comply with an NAV (Network Allocation Vector, network allocation vector) operation in a conventional 802.11 DCF mechanism, and stop channel detection until the ACK signal sent by the receiving node is received. A specific implementation thereof is not described herein. In addition, a duration of the control packet transmission performed by the first part of adjacent nodes according to the first limited power may be determined according to an NAV duration carried in the CTS control packet and/or the RTS control packet, that is, within the NAV duration carried in the CTS control packet and/or the RTS control packet, the first part of adjacent nodes need to perform transmission according to the limited power (namely, the first limited power), that is, need to be limited by the first limited power. Afterward, the first part of adjacent nodes may not be limited by the limited power any longer. Related processing by a second (third) part of adjacent nodes mentioned hereinafter may also be obtained in the same way. This is not repeated subsequently in this embodiment of the present invention.

In an optional implementation, that a first part of adjacent nodes determine that the first part of adjacent nodes are located beyond coverage of an updated power of the receiving node and the sending node may be implemented in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal-to-interference ratio threshold of the first part of adjacent nodes, determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and a receive power of the received CTS control packet, and when a difference between the updated power and the first path loss is less than a receive power threshold of the first part of adjacent nodes, or when a ratio of a difference between the updated power and the first path loss to a sum of current interference and noise is less than a signal-to-interference ratio threshold of the first part of adjacent nodes, determine that the first part of adjacent nodes are located beyond the coverage of the updated power of the receiving node and the sending node.

For example, assuming that the initial transmit power is $P_{t0}$, and that the receive power of the CTS control packet received by the first part of adjacent nodes is $P_{r(CTS)}$, the first part of adjacent nodes may determine that the path loss (the first path loss) PL1 between the first part of adjacent nodes and the receiving node is:

$PL_1 = P_{t0} - P_{r(CTS)}$.

Further, assuming that the updated power is $(1-x\%)P_{t0}$, the first part of adjacent nodes may determine a receive power $P_{rx}$ of the first part of adjacent nodes when the receiving node uses the updated power as a transmit power:

$P_{rx} = (1-x\%)P_{t0} - PL_1$, where when $P_{rx}$ is lower than or equal to the receive power threshold of the first part of adjacent nodes, the first part of adjacent nodes may determine that the first part of adjacent nodes are located beyond the coverage of the updated power of the receiving node.

Alternatively, assuming that the current interference is I, and that the current noise is N, the first part of adjacent nodes may determine a receive signal-to-interference ratio $SINR_{rx}$ of the first part of adjacent nodes when the receiving node uses the updated power as a transmit power:

$SINR_{rx} = ((1-x\%)P_{t0} - PL_1)/(I+N)$, where when the $SINR_{rx}$ is less than or equal to the signal-to-interference ratio threshold of the first part of adjacent nodes, the first part of adjacent nodes may determine that the first part of adjacent nodes are located beyond the coverage of the updated power of the receiving node.

In this optional implementation, if the first part of adjacent nodes receive the RTS control packet, the first part of adjacent nodes may determine that the first part of adjacent nodes are located within the coverage of the initial transmit power of the sending node and the receiving node, and further, the first part of adjacent nodes may determine the corresponding updated power according to the power update value carried in the CTS control packet and the initial transmit power, and therefore, may determine whether the first part of adjacent nodes are located within the coverage of the updated power of the sending node and the adjacent nodes. If the first part of adjacent nodes do not receive the RTS control packet, the first part of adjacent nodes may consider that the first part of adjacent nodes are located beyond the coverage of the initial transmit power of the sending node, and further, the first part of adjacent nodes only need to determine whether the first part of adjacent nodes are located beyond the coverage of the updated power of the receiving node (because the updated power is lower than the initial transmit power, when the first part of adjacent nodes determine that the first part of adjacent nodes are located beyond the coverage of the initial transmit power of the sending node, the first part of adjacent nodes are certainly located beyond the coverage of the updated power of the sending node).

In an optional implementation, the first part of adjacent nodes may determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power; or when the first part of adjacent nodes do not receive the RTS control packet, the first part of adjacent nodes determine a first path loss between the first part of adjacent nodes and the receiving node according to the initial transmit power and a receive power of the received CTS control packet, and determine a power satisfying that a difference between the power and the first path loss is less than a receive power threshold of the receiving node, as the first limited power, or determine a power satisfying that a ratio of the power minus the first path loss to a sum of current interference and noise is less than a signal-to-interference ratio threshold of the receiving node, as the first limited power.

For example, assuming that the initial transmit power is $P_{t0}$, and that the receive power of the CTS control packet received by the first part of adjacent nodes is $P_{r(CTS)}$, the first part of adjacent nodes may determine the first path loss $PL_1$ according to the following formula:

$$PL_1 = P_{t0} - P_{r(CTS)}.$$

According to symmetry of the path loss, the first part of adjacent nodes may determine that a path loss from the first part of adjacent nodes to the receiving node is also $PL_1$.

Further, assuming that the receive power threshold of the receiving node is $P_{r\_threshold}$, the first part of adjacent nodes may determine the first limited power $P_{tx1}$ according to the following formula:

$$P_{tx1} - PL_1 \leq P_{r\_threshold}.$$

That is, the first part of adjacent nodes may determine a power satisfying that a receive power of the receiving node is lower than or equal to the receive power threshold of the receiving node, as the first limited power.

Alternatively, assuming that the signal-to-interference ratio threshold of the receiving node is $SINR_{r\_threshold}$, and that the current interference is I, and that the current noise is N, the first part of adjacent nodes may determine the first limited power $P_{tx1}$ according to the following formula:

$$(P_{tx1} - PL_1)/(I+N) \leq SINR_{r\_threshold}.$$

That is, the first part of adjacent nodes may determine a power satisfying that a receive signal-to-interference ratio of the receiving node is less than or equal to the signal-to-interference ratio threshold of the receiving node, as the first limited power.

It should be noted that, in this embodiment of the present invention, unless otherwise specified, the receive power threshold or signal-to-interference ratio threshold is a prescribed default receive power threshold or default signal-to-interference ratio threshold.

Further, in this embodiment of the present invention, the CTS control packet sent by the receiving node may carry receiver sensitivity of the receiving node, in addition to the identifier of the sending node and the power update value. Therefore, after receiving the CTS control packet sent by the receiving node, the first part of adjacent nodes may determine the receive power threshold or signal-to-interference ratio threshold of the receiving node according to the receiver sensitivity.

It should be understood that, in this embodiment of the present invention, the first part of adjacent nodes may include one or more adjacent nodes. Corresponding, when the first part of adjacent nodes include multiple adjacent nodes, each adjacent node in the first part of adjacent nodes needs to separately determine whether the adjacent node is located within the coverage of the updated power of the sending node and the receiving node. Likewise, when the first part of adjacent nodes determine that the first part of adjacent nodes are located beyond the coverage of the updated power of the receiving node and the sending node, the first part of adjacent nodes determine the first limited power, and perform control packet transmission according to the first limited power. If the first part of adjacent nodes located beyond the coverage of the updated power of the receiving node and the sending node include multiple adjacent nodes, the first limited power needs to be determined by each of the multiple adjacent nodes separately according to the manner described above. In addition, related descriptions about the second (or third) part of adjacent nodes and a second (or third) limited power mentioned hereinafter may also be obtained in the same way. This is not repeated subsequently in this embodiment of the present invention.

It should be noted that, in this embodiment of the present invention, the initial transmit power may be a prescribed default transmit power, or may be another power. When the initial transmit power is another power, the RTS control packet and the CTS control packet further need to carry a transmit power that is actually used by the sending node and the receiving node. This is not repeated subsequently in this embodiment of the present invention.

As can be seen, in the method procedure described in FIG. 2, after receiving an RTS control packet sent by a sending node, a receiving node may determine a power update value according to an initial transmit power of the RTS control packet, and send a CTS control packet carrying the power update value. Therefore, the sending node can perform, according to the power update value, data packet transmission by using an updated power lower than the initial transmit power, and an adjacent node receiving the CTS control packet but located beyond coverage of the updated power of the sending node and the receiving node can perform control packet transmission by using a limited power that does not cover the sending node and the receiving node. On the one hand, spectrum resource utilization is improved. On the other hand, optimized matching of transmit powers is implemented, and power consumption of the sending node and the receiving node is reduced.

Based on the network architecture shown in FIG. 1, an embodiment of the present invention further discloses another data transmission method. Referring to FIG. 3, FIG. 3 is a schematic flowchart of a data transmission method disclosed in an embodiment of the present invention. As shown in FIG. 3, the method may include the following steps.

Step 301: A sending node sends a request to send RTS control packet carrying an identifier of a receiving node, so that after the receiving node receives the RTS control packet, the receiving node determines a power update value according to an initial transmit power of the RTS control packet and sends a CTS control packet by using the initial transmit power, where the CTS control packet carries an identifier of the sending node and the power update value.

Step 302: A first part of adjacent nodes other than the sending node, after receiving the CTS control packet, if determining that the first part of adjacent nodes are located beyond coverage of an updated power of the receiving node and the sending node, determine a first limited power and perform control packet transmission according to the first limited power, where the updated power is a power that is obtained by updating the initial transmit power by using the power update value, the updated power is lower than the initial transmit power, and the receiving node and the sending node are located beyond coverage of the first limited power of the first part of adjacent nodes.

In this embodiment of the present invention, for specific implementations of step 301 and step 302, refer to related descriptions about step 201 in the method procedure described in FIG. 2. Details are not described again herein.

Step 303: The sending node receives the CTS control packet, and sends an RTS update control packet by using the initial transmit power, where the RTS update control packet carries the power update value.

In this embodiment of the present invention, after receiving the CTS control packet sent by the receiving node, the sending node may update the initial transmit power by using the power update value carried in the CTS control packet, so as to obtain the updated power, and send the RTS update control packet (RTS-updated control packet) by using the initial transmit power, where the RTS update control packet carries the power update value.

Step 304: A second part of adjacent nodes that receive the RTS update control packet but do not receive the CTS control packet, when determining that the second part of adjacent nodes are located beyond the coverage of the updated power of the sending node, determine a second limited power and perform control packet transmission according to the second limited power, where the sending node is located beyond coverage of the second limited power of the second part of adjacent nodes.

In this embodiment of the present invention, operations of the adjacent nodes that receive the CTS control packet (including adjacent nodes that receive the CTS control packet and the RTS control packet and adjacent nodes that receive the CTS control packet but do not receive the RTS control packet) are described in the foregoing step 301 and step 302.

For adjacent nodes that do not receive the CTS control packet but receive the RTS update control packet (the second part of adjacent nodes), the second part of adjacent nodes may determine, after receiving the RTS update control packet, the coverage of the updated power of the sending node according to the power update value carried in the RTS update control packet, and may further determine whether the second part of adjacent nodes are located within the coverage of the updated power of the sending node.

When the second part of adjacent nodes determine that the second part of adjacent nodes are located beyond the coverage of the updated power of the sending node, that is, no interference is caused to the second part of adjacent nodes when the sending node and the receiving node perform communication by using the updated power, the second part of adjacent nodes can perform transmission according to the limited power (the second limited power).

It should be noted that, in this embodiment of the present invention, before receiving the RTS update control packet, the second part of adjacent nodes may receive the RTS control packet sent by the sending node, or may not receive, due to reasons of the second part of adjacent nodes or external reasons, the RTS control packet sent by the sending node. For example, when the sending node sends the RTS control packet, the second part of adjacent nodes cannot receive the RTS control packet due to a reason such as a device fault or external information interference. However, it should be noted that, whether the second part of adjacent nodes receive the RTS control packet before receiving the RTS update control packet does not affect specific implementations of the technical solution provided by this embodiment of the present invention. Details are not described again herein.

In an optional implementation, the second part of adjacent nodes may determine the second limited power in the following manner:

the second part of adjacent nodes determine a path loss (a third path loss) between the second part of adjacent nodes and the sending node according to the initial transmit power and a receive power of the received RTS update control packet; and the second part of adjacent nodes determine a power satisfying that a difference between the power and the third path loss is less than a receive power threshold of the sending node, as the second limited power, or determine a power satisfying that a ratio of the power minus the third path loss to a sum of current interference and noise is less than a signal-to-interference ratio threshold of the sending node, as the second limited power.

For example, assuming that the initial transmit power is $P_{t0}$, and that the receive power of the RTS update control packet received by the second part of adjacent nodes is $P_{r(RTS\_updated)}$, the second part of adjacent nodes may determine the third path loss $PL_3$ according to the following formula:

$$PL_3 = P_{t0} - P_{r(RTS\_updated)}.$$

According to symmetry of the path loss, the second part of adjacent nodes may determine that a path loss from the second part of adjacent nodes to the sending node is also $PL_3$.

Further, assuming that the receive power threshold of the sending node is $P_{r\_threshold}$, the second part of adjacent nodes may determine the second limited power $P_{tx2}$ according to the following formula:

$$P_{tx2} - PL_3 < P_{r\_threshold}.$$

That is, the second part of adjacent nodes may determine a power satisfying that a receive power of the sending node is lower than the receive power threshold of the sending node, as the second limited power.

Alternatively, assuming that the signal-to-interference ratio threshold of the sending node is $SINR_{r\_threshold}$, and that the current interference is I, and that the current noise is N, the second part of adjacent nodes may determine the second limited power $P_{tx2}$ according to the following formula:

$$(P_{tx2} - PL_3)/(I+N) < SINR_{r\_threshold}.$$

That is, the second part of adjacent nodes may determine a power satisfying that a receive signal-to-interference ratio of the sending node is lower than the signal-to-interference ratio threshold of the sending node, as the second limited power.

It should be noted that, in this embodiment of the present invention, unless otherwise specified, the receive power threshold or signal-to-interference ratio threshold is a prescribed default receive power threshold or default signal-to-interference ratio threshold.

Further, in this embodiment of the present invention, the RTS update control packet sent by the sending node may carry receiver sensitivity of the sending node, in addition to the power update value. Therefore, after receiving the RTS update control packet sent by the sending node, the second part of adjacent nodes may determine the receive power threshold or signal-to-interference ratio threshold of the sending node according to the receiver sensitivity.

Step 305: The sending node sends a data packet to the sending node by using the updated power, where the updated power is further used by the receiving node to send an ACK signal by using the updated power after the receiving node completely receives the data packet sent by the sending node.

In this embodiment of the present invention, after the sending node sends the RTS update control packet by using the initial power, the sending node may send the data packet to the sending node by using the updated power. Correspondingly, after completely receiving the data packet sent by the sending node, the receiving node may further send the ACK signal by using the updated power. Because both the first part of adjacent nodes and the second part of adjacent nodes are located beyond the coverage of the updated power of the sending node and the receiving node, data transmission between the sending node and the receiving node does not cause interference to the first part of adjacent nodes and the second part of adjacent nodes. Likewise, data transmission of the first part of adjacent nodes and data transmission of the second part of adjacent nodes also do not cause interference to the sending node and the receiving node.

As can be seen, in the method procedure described in FIG. 3, after a sending node receives a CTS control packet that carries a power update value and is sent by a receiving node, and before the sending node sends a data packet to the sending node by using an updated power that is obtained by updating an initial transmit power by using the power update value, the sending node may further send, by using the initial transmit power, an RTS update control packet carrying the power update value. Therefore, an adjacent node (an adjacent node beyond coverage of the initial transmit power of the receiving node) that does not receive the CTS control packet, when receiving the RTS update control packet, and determining that the adjacent node is located beyond coverage of the updated power of the sending node, can perform control packet transmission by using a limited power that does not cover the sending node and the receiving node. This further improves spectrum resource utilization.

Figure 4:
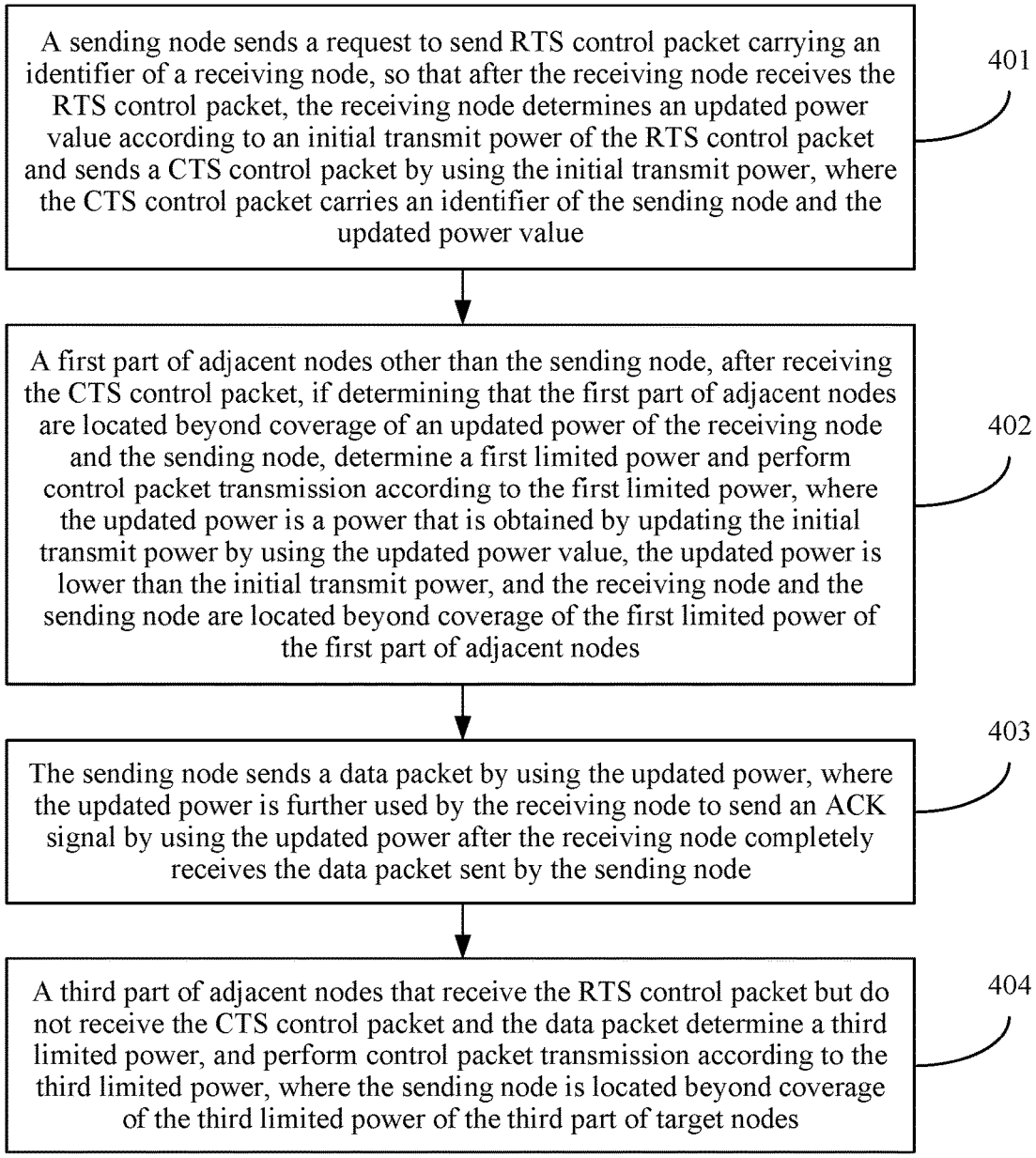
FIG. 4 is a schematic flowchart of another data transmission method disclosed in an embodiment of the present invention.

Based on the network architecture shown in FIG. 1, an embodiment of the present invention further discloses another data transmission method. Referring to FIG. 4, FIG. 4 is a schematic flowchart of another data transmission method disclosed in an embodiment of the present invention. As shown in FIG. 4, the method may include the following steps.

Step 401: A sending node sends a request to send RTS control packet carrying an identifier of a receiving node, so that after the receiving node receives the RTS control packet, the receiving node determines a power update value according to an initial transmit power of the RTS control packet and sends a CTS control packet by using the initial transmit power, where the CTS control packet carries an identifier of the sending node and the power update value.

Step 402: A first part of adjacent nodes other than the sending node, after receiving the CTS control packet, if determining that the first part of adjacent nodes are located beyond coverage of an updated power of the receiving node and the sending node, determine a first limited power and perform control packet transmission according to the first limited power, where the updated power is a power that is obtained by updating the initial transmit power by using the power update value, the updated power is lower than the initial transmit power, and the receiving node and the sending node are located beyond coverage of the first limited power of the first part of adjacent nodes.

Step 403: The sending node sends a data packet by using the updated power, where the updated power is further used by the receiving node to send an ACK signal by using the updated power after the receiving node completely receives the data packet sent by the sending node.

In this embodiment of the present invention, for specific implementations of step 401 to step 403, refer to related descriptions about step 201 in the method procedure described in FIG. 2. Details are not described again herein.

Step 404: A third part of adjacent nodes that receive the RTS control packet but do not receive the CTS control packet and the data packet determine a third limited power, and perform control packet transmission according to the third limited power, where the sending node is located beyond coverage of the third limited power of the third part of target nodes.

In this embodiment of the present invention, operations of the adjacent nodes that receive the CTS control packet (including adjacent nodes that receive the CTS control packet and the RTS control packet and adjacent nodes that receive the CTS control packet but do not receive the RTS control packet) are described in the foregoing step 401 and step 402.

For adjacent nodes that do not receive the CTS control packet, if the adjacent nodes receive the RTS control packet but do not receive the data packet sent by the sending node by using the updated power (this part of adjacent nodes are referred to as the third part of adjacent nodes), the third part of adjacent nodes determine that the third part of adjacent nodes are located within the coverage of the updated power of the sending node, and can perform control packet transmission according to the limited power. Therefore, the third part of adjacent nodes may determine the third limited power according to a principle of ensuring that the sending node is located beyond the coverage.

Because the third part of adjacent nodes do not receive the CTS control packet, the third part of adjacent nodes may consider that the third part of adjacent nodes are located beyond coverage of the initial transmit power of the receiving node. In addition, because the updated power is lower than the initial transmit power, the third part of adjacent nodes are also certainly located beyond the coverage of the updated power of the receiving node. Correspondingly, because the third part of adjacent nodes are located within coverage of the initial power of the sending node, but are located beyond the coverage of the initial power of the receiving node, it may be considered that when the sending node is located beyond the coverage of the third limited power of the third part of target nodes, the receiving node is also certainly located beyond the coverage of the third limited power of the third part of target nodes.

In an optional implementation, the third part of adjacent nodes may determine the third limited power in the following manner:

the third part of adjacent nodes determine a path loss (a fourth path loss) between the third part of adjacent nodes and the sending node according to a receive power of the received RTS control packet and the initial transmit power of the RTS control packet sent by the sending node; and the third part of adjacent nodes determine a power satisfying that a difference between the power and the fourth path loss is less than a receive power threshold of the sending node, as the third limited power, or determine a power satisfying that a ratio of the power minus the fourth path loss to a sum of current interference and noise is less than a signal-to-interference ratio threshold of the sending node, as the third limited power.

For example, assuming that the initial transmit power is $P_{t0}$, and that a receive power of the RTS update control packet received by the third part of adjacent nodes is $P_{r(RTS)}$, the third part of adjacent nodes may determine the fourth path loss $PL_4$ according to the following formula:

$$PL_4 = P_{t0} - P_{r(RTS)}.$$

According to symmetry of the path loss, the third part of adjacent nodes may determine that a path loss from the third part of adjacent nodes to the sending node is also $PL_4$.

Further, assuming that the receive power threshold of the sending node is $P_{r\_threshold}$, the third part of adjacent nodes may determine the third limited power $P_{tx3}$ according to the following formula:

$$P_{tx3} - PL_4 < P_{r\_threshold}.$$

That is, the third part of adjacent nodes may determine a power satisfying that a receive power of the sending node is lower than the receive power threshold of the sending node, as the third limited power.

Alternatively, assuming that the signal-to-interference ratio threshold of the sending node is $SINR_{r\_threshold}$, and that the current interference is I, and that the current noise is N, the third part of adjacent nodes may determine the third limited power $P_{tx3}$ according to the following formula:

$$(P_{tx3} - PL_4)/(I+N) < SINR_{r\_threshold}.$$

That is, the third part of adjacent nodes may determine a power satisfying that a receive signal-to-interference ratio of the sending node is lower than the signal-to-interference ratio threshold of the sending node, as the third limited power.

It should be noted that, in this embodiment of the present invention, unless otherwise specified, the receive power threshold or signal-to-interference ratio threshold is a prescribed default receive power threshold or default signal-to-interference ratio threshold.

As can be seen, in the method procedure described in FIG. 4, for adjacent nodes that receive an RTS control packet but do not receive a CTS control packet (namely, adjacent nodes that are located within coverage of an initial transmit power of a sending node and are located beyond coverage of the initial transmit power of a receiving node), when the adjacent nodes do not receive a data packet sent by the sending node, the adjacent nodes may determine that the adjacent nodes are located beyond coverage of an updated power of the sending node. Therefore, the adjacent nodes (a third part of adjacent nodes) can perform control packet transmission by using a limited power that does not cover the sending node. This further improves spectrum resource utilization.

Figure 5:
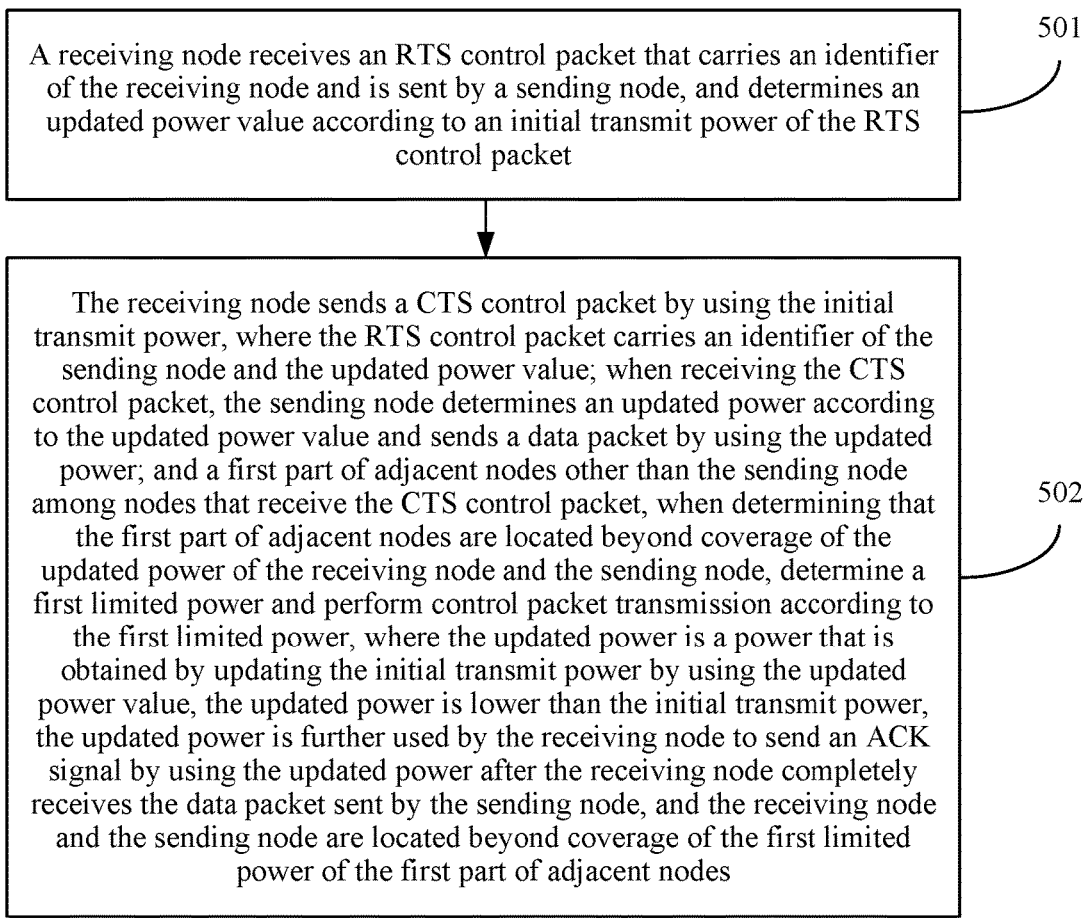
FIG. 5 is a schematic flowchart of a data transmission method disclosed in an embodiment of the present invention.

Based on the network architecture shown in FIG. 1, an embodiment of the present invention further discloses a data transmission method. Referring to FIG. 5, FIG. 5 is a schematic flowchart of a data transmission method disclosed in an embodiment of the present invention. The method described in FIG. 5 is described from a perspective of a sending node. As shown in FIG. 5, the method may include the following steps.

Step 501: A receiving node receives an RTS control packet that carries an identifier of the receiving node and is sent by a sending node, and determines a power update value according to an initial transmit power of the RTS control packet.

In this embodiment of the present invention, when the sending node needs to send data, the sending node may first send the RTS control packet, where the RTS control packet may carry the identifier of the receiving node, so that a node that receives the RTS control packet determines, according to the identifier of the receiving node carried in the RTS control packet, whether the node is the receiving node.

After the receiving node receives the RTS control packet sent by the sending node, if the receiving node is not in a silent period, that is, the receiving node is not located within coverage of another transmission pair (another sending node and another receiving node) in a communication state, the receiving node may determine the power update value according to the initial transmit power of the RTS control packet sent by the sending node, and send a CTS control packet carrying the power update value and an identifier of the sending node.

In this embodiment of the present invention, for a specific implementation of determining the power update value by the receiving node, refer to related descriptions in the method procedure shown in FIG. 2. Details are not described again herein.

Step 502: The receiving node sends a CTS control packet by using the initial transmit power, where the RTS control packet carries an identifier of the sending node and the power update value; when receiving the CTS control packet, the sending node determines an updated power according to the power update value and sends a data packet by using the updated power; and a first part of adjacent nodes other than the sending node among nodes that receive the CTS control packet, when determining that the first part of adjacent nodes are located beyond coverage of the updated power of the receiving node and the sending node, determine a first limited power and perform control packet transmission according to the first limited power, where the updated power is a power that is obtained by updating the initial transmit power by using the power update value, the updated power is lower than the initial transmit power, the updated power is further used by the receiving node to send an ACK signal by using the updated power after the receiving node completely receives the data packet sent by the sending node, and the receiving node and the sending node are located beyond coverage of the first limited power of the first part of adjacent nodes.

In this embodiment of the present invention, after determining the power update value, the receiving node may add the power update value to the CTS control packet, and send, by using the initial transmit power, the CTS control packet carrying the power update value, so that a node that receives the CTS control packet may determine the corresponding updated power according to the power update value carried in the CTS control packet. The updated power is lower than the initial transmit power.

In this embodiment of the present invention, after receiving the CTS control packet, the adjacent nodes (the first part of adjacent nodes) other than the sending node may determine, according to the initial transmit power and the power update value, whether the first part of adjacent nodes are located within the coverage of the updated power of the receiving node and the sending node, and when determining that the first part of adjacent nodes are located beyond the coverage of the updated power of the receiving node and the sending node, the first part of adjacent nodes may determine the first limited power, and perform control packet transmission according to the first limited power. The receiving node and the sending node are located beyond the coverage of the first limited power of the first part of adjacent nodes.

In this embodiment of the present invention, for a specific implementation in which the first part of adjacent nodes determine that the first part of adjacent nodes are located beyond the coverage of the updated power of the receiving node and the sending node, and a manner of determining the first limited power, refer to related descriptions in the method procedure shown in FIG. 2. Details are not described again herein.

In an optional implementation, after the sending node receives the CTS control packet sent by the receiving node and before the sending node sends the data packet by using the updated power, the sending node may further send, by using the initial transmit power, an RTS update control packet carrying the power update value, so that a second part of adjacent nodes that receive the RTS update control packet but do not receive the CTS control packet, when determining that the second part of adjacent nodes are located beyond the coverage of the updated power of the sending node, determine a second limited power and perform control packet transmission according to the second limited power, where the sending node is located beyond coverage of the second limited power of the second part of adjacent nodes. For a specific implementation thereof, refer to related descriptions in the foregoing step 303 and step 304. Details are not described again herein.

In another optional implementation, after the sending node sends the data packet by using the updated power, if adjacent nodes that receive the RTS control packet but do not receive the CTS control packet do not receive the data packet, the adjacent nodes (a third part of adjacent nodes) may determine that the adjacent nodes are located beyond the coverage of the updated power of the sending node. Therefore, the third part of adjacent nodes may determine a third limited power, and perform control packet transmission according to the third limited power, where the sending node is located beyond coverage of the third limited power of the third part of adjacent nodes. For a specific implementation thereof, refer to related descriptions in the foregoing step 403 and step 404. Details are not described again herein.

As can be seen, in the method procedure described in FIG. 5, after receiving an RTS control packet sent by a sending node, a receiving node may determine a power update value according to an initial transmit power of the RTS control packet, and send a CTS control packet carrying the power update value. Therefore, the sending node can perform, according to the power update value, data packet transmission by using an updated power lower than the initial transmit power, and an adjacent node receiving the CTS control packet but located beyond coverage of the updated power of the sending node and the receiving node can perform control packet transmission by using a limited power that does not cover the sending node and the receiving node. On the one hand, spectrum resource utilization is improved. On the other hand, optimized matching of transmit powers is implemented, and power consumption of the sending node and the receiving node is reduced.

Based on the network architecture shown in FIG. 1, an embodiment of the present invention further discloses a data transmission method. Referring to FIG. 6, FIG. 6 is a schematic flowchart of a data transmission method disclosed in an embodiment of the present invention. The method described in FIG. 6 is described from a perspective of an adjacent node. As shown in FIG. 6, the method may include the following steps.

Step 601: When an adjacent node receives a CTS control packet that carries an identifier of a sending node and a power update value and is sent by a receiving node, the adjacent node determines whether the adjacent node is located beyond coverage of an updated power of the receiving node and the sending node, where the CTS control packet is sent by the receiving node by using an initial transmit power after the receiving node receives an RTS control packet that carries an identifier of the receiving node and is sent by the sending node, and determines the power update value according to the initial transmit power of the RTS control packet; and the power update value is used by the sending node to update the initial transmit power by using the power update value to obtain the updated power after the sending node receives the CTS control packet, so that a data packet is sent by using the updated power, the updated power is lower than the initial transmit power, and the updated power is further used by the receiving node to send an ACK signal by using the updated power after the receiving node completely receives the data packet sent by the sending node.

In this embodiment of the present invention, when the sending node needs to send data, the sending node may first send the RTS control packet, where the RTS control packet may carry the identifier of the receiving node, so that a node that receives the RTS control packet determines, according to the identifier of the receiving node carried in the RTS control packet, whether the node is the receiving node.

After the receiving node receives the RTS control packet sent by the sending node, if the receiving node is not in a silent period, that is, the receiving node is not located within coverage of another transmission pair (another sending node and another receiving node) in a communication state, the receiving node may determine the power update value according to the initial transmit power of the RTS control packet sent by the sending node, and send the CTS control packet carrying the power update value and the identifier of the sending node.

Step 602: If the adjacent node is located beyond the coverage of the updated power of the receiving node and the sending node, the adjacent node determines a first limited power, and performs control packet transmission according to the first limited power, where the receiving node and the sending node are located beyond coverage of the first limited power of the adjacent node.

In this embodiment of the present invention, after receiving the CTS control packet, the adjacent node other than the sending node may determine, according to the initial transmit power and the power update value, whether the adjacent node is located within the coverage of the updated power of the receiving node and the sending node, and when determining that the adjacent node is located beyond the coverage of the updated power of the receiving node and the sending node, the adjacent node may determine the first limited power, and perform control packet transmission according to the first limited power. The receiving node and the sending node are located beyond the coverage of the first limited power of the adjacent node. In the scenario described in this embodiment of the present invention, the adjacent node plays the role of the first adjacent node described in the foregoing embodiment.

It should be noted that, in this embodiment of the present invention, when the adjacent node other than the sending node and the receiving node determines that the adjacent node is located within the coverage of the updated power of the sending node and/or the receiving node, the adjacent node still needs to comply with an NAV operation in a conventional 802.11 DCF mechanism, and stop channel detection until the ACK signal sent by the receiving node is received. A specific implementation thereof is not described herein.

In an optional implementation, that the adjacent node determines that the adjacent node is located beyond the coverage of the updated power of the receiving node and the sending node may include:

when the adjacent node receives the RTS control packet, the adjacent node separately determines a first path loss between the adjacent node and the receiving node and a second path loss between the adjacent node and the sending node according to the initial transmit power, a receive power of the received CTS control packet, and a receive power of the received RTS control packet, and when a difference between the updated power and the first path loss and a difference between the updated power and the second path loss are both less than a receive power threshold of the adjacent node, or when a ratio of a difference between the updated power and the first path loss to a sum of current noise and interference and a ratio of a difference between the updated power and the second path loss to the sum of current noise and interference are both less than a signal-to-interference ratio threshold of the adjacent node, determines that the adjacent node is located beyond the coverage of the updated power of the receiving node and the sending node; or when the adjacent node does not receive the RTS control packet, the adjacent node determines a first path loss between the adjacent node and the receiving node according to the initial transmit power and a receive power of the received CTS control packet, and when a difference between the updated power and the first path loss is less than a receive power threshold of the adjacent node, or when a ratio of a difference between the updated power and the first path loss to a sum of current interference and noise is less than a signal-to-interference ratio threshold of the adjacent node, determines that the adjacent node is located beyond the coverage of the updated power of the receiving node and the sending node.

For example, assuming that the initial transmit power is $P_{t0}$, and that the receive power of the CTS control packet received by the adjacent node is $P_{r(CTS)}$, the adjacent node may determine that the path loss (the first path loss) PL1 between the adjacent node and the receiving node is:

$$PL_1 = P_{t0} - P_{r(CTS)}.$$

Further, assuming that the updated power is $(1-x\%)P_{t0}$, the adjacent node may determine a receive power $P_{rx}$ of the adjacent node when the receiving node uses the updated power as a transmit power:

$$P_{rx} = (1-x\%)P_{t0} - PL_1, \text{ where}$$

when $P_{rx}$ is lower than or equal to the receive power threshold of the adjacent node, the adjacent node may determine that the adjacent node is located beyond the coverage of the updated power of the receiving node.

Alternatively, assuming that the current interference is I, and that the current noise is N, the adjacent node may determine a receive signal-to-interference ratio $SINR_{rx}$ of the adjacent node when the receiving node uses the updated power as a transmit power:

$$SINR_{rx} = ((1-x\%)P_{t0} - PL_1)/(I+N), \text{ where}$$

when the $SINR_{rx}$ is less than or equal to the signal-to-interference ratio threshold of the adjacent node, the adjacent node may determine that the adjacent node is located beyond the coverage of the updated power of the receiving node.

In this optional implementation, if the adjacent node receives the RTS control packet, the adjacent node may determine that the adjacent node is located within coverage of the initial transmit power of the sending node and the receiving node, and further, the adjacent node may determine the corresponding updated power according to the power update value carried in the CTS control packet and the initial transmit power, and therefore, may determine whether the adjacent node is located within the coverage of the updated power of the sending node and the adjacent node. If the adjacent node does not receive the RTS control packet, the adjacent node may consider that the adjacent node is located beyond the coverage of the initial transmit power of the sending node, and further, the adjacent node only needs to determine whether the adjacent node is located beyond the coverage of the updated power of the receiving node (because the updated power is lower than the initial transmit power, when the adjacent node determines that the adjacent node is located beyond the coverage of the initial transmit power of the sending node, the adjacent node is certainly located beyond the coverage of the updated power of the sending node).

In an optional implementation, that the adjacent node determines a first limited power may include:

when the adjacent node receives the RTS control packet, the adjacent node separately determines a first path loss between the adjacent node and the receiving node and a second path loss between the adjacent node and the sending node according to the initial transmit power, a receive power of the received CTS control packet, and a receive power of the received RTS control packet, and determines a power satisfying that a difference between the power and the first path loss is less than a receive power threshold of the receiving node and that a difference between the power and the second path loss is less than a receive power threshold of the sending node, as the first limited power, or determines a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power; or when the adjacent node does not receive the RTS control packet, the adjacent node determines a first path loss between the adjacent node and the receiving node according to the initial transmit power and a receive power of the received CTS control packet, and determines a power satisfying that a difference between the power and the first path loss is less than a receive power threshold of the receiving node, as the first limited power, or determines a power satisfying that a ratio of the power minus the first path loss to a sum of current interference and noise is less than a signal-to-interference ratio threshold of the receiving node, as the first limited power.

For example, assuming that the initial transmit power is $P_{t0}$, and that the receive power of the CTS control packet received by the adjacent node is $P_{r(CTS)}$, the adjacent node may determine the first path loss $PL_1$ according to the following formula:

$PL_1 = P_{t0} - P_{r(CTS)}.$

According to symmetry of the path loss, the second part of adjacent nodes may determine that a path loss from the adjacent node to the receiving node is also $PL_1$.

Further, assuming that the receive power threshold of the receiving node is $P_{r\_threshold}$, the adjacent node may determine the first limited power $P_{tx1}$ according to the following formula:

$P_{tx} - PL_1 \leq P_{r\_threshold}.$

That is, the adjacent node may determine a power satisfying that a receive power of the receiving node is lower than or equal to the receive power threshold of the receiving node, as the first limited power.

Alternatively, assuming that the signal-to-interference ratio threshold of the receiving node is $SINR_{r\_threshold}$, and that the current interference is I, and that the current noise is N, the adjacent node may determine the first limited power $P_{tx1}$ according to the following formula:

$(P_{tx1} - PL_1)/(I+N) \leq SINR_{r\_threshold}.$

That is, the adjacent node may determine a power satisfying that a receive signal-to-interference ratio of the receiving node is less than or equal to the signal-to-interference ratio threshold of the receiving node, as the first limited power.

It should be noted that, in this embodiment of the present invention, unless otherwise specified, the receive power threshold or signal-to-interference ratio threshold is a prescribed default receive power threshold or default signal-to-interference ratio threshold.

Further, in this embodiment of the present invention, the CTS control packet sent by the receiving node may carry receiver sensitivity of the receiving node, in addition to the identifier of the sending node and the power update value. Therefore, after receiving the CTS control packet sent by the receiving node, the adjacent node may determine the receive power threshold or signal-to-interference ratio threshold of the receiving node according to the receiver sensitivity.

In an optional implementation, in this embodiment of the present invention, that the adjacent node performs control packet transmission according to the first limited power may include:

the adjacent node sends, by using the first limited power, another RTS control packet carrying the first limited power and an identifier of a target node;

when the adjacent node receives another CTS control packet carrying another power update value and an identifier of the adjacent node, the adjacent node sends, by using the first limited power, another RTS update control packet carrying the another power update value, so that other nodes different from the target node among nodes that receive the another RTS update control packet, after receiving the another RTS update control packet, if determining that the other nodes are located beyond coverage of the adjacent node, determine a fourth limited power and perform control packet transmission according to the fourth limited power, where the another updated power is a power that is obtained by updating the first limited power by using the another power update value, the another updated power is lower than or equal to the first limited power, and the adjacent node is located beyond coverage of the fourth limited power of the other nodes different from the target node among the nodes that receive the another RTS update control packet; and the adjacent node sends a data packet by using the another updated power.

In this optional implementation, when the adjacent node determines that the adjacent node is located beyond the coverage of the updated power of the receiving node and the sending node, and after the adjacent node determines the first limited power, the adjacent node may send, by using the first limited power, an RTS control packet (namely, the another RTS control packet) to perform data transmission, where the RTS control packet carries the identifier of the target node (the target node in the data transmission with the adjacent node as a sending node, that is, a receiving node in the data transmission with the adjacent node as the sending node), and the first limited power. After receiving the another RTS control packet, the target node needs to determine whether the target node is located beyond coverage of the initial transmit power of the sending node and the receiving node and/or is located beyond coverage of the initial transmit power of another sending node and another receiving node in another transmission pair that is performing data transmission. If the target node is located beyond the coverage of the initial transmit power of the sending node and the receiving node (that is, neither the RTS control packet sent by the sending node by using the initial transmit power is received, nor the CTS control packet sent by the receiving node by using the initial transmit power is received), and is located beyond the coverage of the initial transmit power of the another sending node and the another receiving node in the another transmission pair that is performing data transmission (that is, neither an RTS control packet sent by the another sending node is received, nor a CTS control packet sent by the another receiving node is received), that is, the target node is not limited by an NAV of any nearby node, the target node may send the CTS control packet by using the initial transmit power. If the target node is located within the coverage of the initial transmit power of the sending node and the receiving node and/or is located within the coverage of the initial transmit power of the another sending node and the another receiving node in the another transmission pair that is performing data transmission, that is, the target node is limited by an NAV of one or more nearby nodes, the target node needs to send the CTS control packet by using a limited power.

After the target node receives the another RTS control packet, if the target node is located beyond the coverage of the initial transmit power of the sending node and the receiving node and is located beyond the coverage of the initial transmit power of the another sending node and the another receiving node in the another transmission pair that is performing data transmission, the target node may send, by using the initial transmit power, the another CTS control packet carrying the identifier of the adjacent node (the adjacent node that sends the another RTS control packet) and the another power update value, so that other nodes different from the adjacent node among nodes that receive the another CTS control packet, after receiving the another CTS control packet, if determining that the other nodes are located beyond coverage of the another updated power of the target node and the adjacent node, determine a fifth limited power and perform control packet transmission according to the fifth limited power, where the target node is located beyond coverage of the fifth limited power of the other nodes different from the adjacent node among the nodes that receive the another CTS control packet.

After the target node receives the another RTS control packet, if the target node is located within the coverage of the initial transmit power of the sending node and the receiving node and/or is located within the coverage of the initial transmit power of the another sending node and the another receiving node in the another transmission pair that is performing data transmission, the target node may send, by using a sixth limited power, the another CTS control packet carrying the identifier of the adjacent node (the adjacent node that sends the another RTS control packet) and the another power update value, so that other nodes different from the adjacent node among nodes that receive the another CTS control packet, after receiving the another CTS control packet, if determining that the other nodes are located beyond coverage of the another updated power of the target node and the adjacent node, determine a seventh limited power and perform control packet transmission according to the seventh limited power, where the sending node, the receiving node, and the another sending node and the another receiving node in the another transmission pair that is performing data transmission are located beyond coverage of the sixth limited power of the target node, the target node is located beyond coverage of the seventh limited power of the other nodes different from the adjacent node among the nodes that receive the another CTS control packet, and the sixth limited power is higher than the another updated power.

In an optional implementation, in this embodiment of the present invention, after the sending node receives the CTS control packet sent by the receiving node and before the sending node sends the data packet by using the updated power, the sending node may further send, by using the initial transmit power, an RTS update control packet carrying the power update value.

Correspondingly, when the adjacent node receives the RTS update control packet that carries the power update value and is sent by the sending node but does not receive the CTS control packet, the adjacent node determines whether the adjacent node is located beyond the coverage of the updated power of the sending node, where the RTS update control packet is sent by the sending node by using the initial transmit power after the CTS control packet is received and before the data packet is sent by using the updated power; if the adjacent node is located beyond the coverage of the updated power of the sending node, the adjacent node determines a second limited power and performs control packet transmission according to the second limited power; and the sending node is located beyond coverage of the second limited power of the second part of adjacent nodes. For a specific implementation thereof, refer to related descriptions in the foregoing step 304 and step 305. Details are not described again herein. In the scenario described in this embodiment of the present invention, the adjacent node plays the role of the second adjacent node described in the foregoing embodiment.

In this optional implementation, that the adjacent node performs control packet transmission according to the second limited power may include:

if the adjacent node determines that a remaining duration of a data packet sending phase of the sending node is greater than a preset time threshold, the adjacent node sends, by using the initial transmit power, still another RTS control packet carrying the second limited power and an identifier of another target node;

when the adjacent node receives still another CTS control packet carrying still another power update value and an identifier of the adjacent node, the adjacent node sends, by using the initial transmit power, still another RTS update control packet carrying the still another power update value, so that other nodes different from the another target node among nodes that receive the still another RTS update control packet, after receiving the still another RTS update control packet, if determining that the other nodes are located beyond coverage of an updated power of the adjacent node, determine an eighth limited power and perform control packet transmission according to the eighth limited power, where the still another updated power is a power that is obtained by updating the second limited power by using the still another power update value, the still another updated power is lower than or equal to the second limited power, and the adjacent node is located beyond coverage of the eighth limited power of the other nodes different from the another target node among the nodes that receive the still another RTS update control packet; and the adjacent node sends a data packet by using the still another updated power.

Specifically, when the adjacent node determines that the adjacent node is located beyond the coverage of the updated power of the sending node, and determines the second limited power, if the adjacent node determines that the sending node is currently in the data packet sending phase, and that the remaining duration of sending the data packet by the sending node is greater than the preset time threshold (that is, the sending node is currently sending the data packet by using the updated power, and the adjacent node may determine, according to an NAV duration carried in the received RTS control packet, whether the sending node is in the data packet sending phase and the remaining duration of the data packet sending phase of the sending node), that is, the sending node is not in a data receiving state, interference received by the sending node may not be considered in this case. Therefore, the adjacent node may send, by using the initial transmit power, an RTS control packet (namely, the still another RTS control packet) to perform data transmission, where the RTS control packet carries the identifier of the another target node and the second limited power. After receiving the still another RTS control packet, the another target node needs to determine whether the another target node is located beyond coverage of the initial transmit power of the sending node and the receiving node and/or is located beyond coverage of the initial transmit power of another sending node and another receiving node in another transmission pair that is performing data transmission. If the another target node is located beyond the coverage of the initial transmit power of the sending node and the receiving node (that is, neither the RTS control packet sent by the sending node by using the initial transmit power is received, nor the CTS control packet sent by the receiving node by using the initial transmit power is received), and is located beyond the coverage of the initial transmit power of the another sending node and the another receiving node in the another transmission pair that is performing data transmission (that is, neither an RTS control packet sent by the another sending node is received, nor a CTS control packet sent by the another receiving node is received), that is, the another target node is not limited by an NAV of any nearby node, the another target node may send the CTS control packet by using the initial transmit power. If the another target node is located within the coverage of the initial transmit power of the sending node and the receiving node and/or is located within the coverage of the initial transmit power of the another sending node and the another receiving node in the another transmission pair that is performing data transmission, that is, the another target node is limited by an NAV of one or more nearby nodes, the target node needs to send the CTS control packet by using a limited power.

After the another target node receives the still another RTS control packet, if the another target node is located beyond the coverage of the initial transmit power of the sending node and the receiving node and is located beyond the coverage of the initial transmit power of the another sending node and the another receiving node in the another transmission pair that is performing data transmission, the another target node sends, by using the initial transmit power, the another CTS control packet carrying the identifier of the adjacent node (the adjacent node that sends the still another RTS control packet) and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine a ninth limited power and perform control packet transmission according to the ninth limited power, where the another target node is located beyond coverage of the ninth limited power of the other nodes different from the adjacent node among the nodes that receive the still another CTS control packet.

After the another target node receives the still another RTS control packet, if the another target node is located within the coverage of the initial transmit power of the sending node and the receiving node and/or is located within the coverage of the initial transmit power of the another sending node and the another receiving node in the another transmission pair that is performing data transmission, the another target node sends, by using a tenth limited power, the still another CTS control packet carrying the identifier of the adjacent node (the adjacent node that sends the still another RTS control packet) and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine an eleventh limited power and perform control packet transmission by using the eleventh limited power, where the sending node and the receiving node and/or the another sending node and the another receiving node in the another transmission pair that is performing data transmission are located beyond coverage of the tenth limited power of the another target node, the another target node is located beyond coverage of the eleventh limited power of the other nodes different from the adjacent node among the nodes that receive the still another CTS control packet, and the tenth limited power is higher than the still another updated power.

The preset time threshold may be determined by the adjacent node according to a time required for exchanging the RTS control packet, the CTS control packet, or the RTS update control packet (that is, a time required for sending the still another RTS control packet, receiving the still another CTS control packet, and sending the still another RTS update control packet), that is, the preset time threshold is greater than or equal to the time required for exchanging the RTS control packet, the CTS control packet, or the RTS update control packet. If the adjacent node determines that the remaining duration of sending the data packet by the sending node is less than or equal to the preset time threshold, the adjacent node may stop transmission until the NAV duration carried in the RTS control packet sent by the sending node ends.

It should be noted that, in this embodiment of the present invention, for a specific implementation in which the foregoing node (including the target node, the another target node, or the like) determines a limited power (including the fourth limited power, the fifth limited power, or the like), and determines whether the node is located beyond coverage of a specific power (the initial transmit power, the updated power, or the like) of a node (including the sending node, the receiving node, or the like), refer to related descriptions in the procedure described in FIG. 2. Details are not described again herein.

In another optional implementation, after the sending node sends the data packet by using the updated power, if the adjacent node receiving the RTS control packet but not receiving the CTS control packet does not receive the data packet, the adjacent node may determine that the adjacent node is located beyond the coverage of the updated power of the sending node. Therefore, the adjacent node may determine a third limited power, and perform control packet transmission according to the third limited power, where the sending node is located beyond coverage of the third limited power of the adjacent node. For a specific implementation thereof, refer to related descriptions in the foregoing step 403 and step 404. Details are not described again herein. In the scenario described in this embodiment of the present invention, the adjacent node plays the role of the third adjacent node described in the foregoing embodiment.

Further, in this embodiment of the present invention, when an adjacent station is a newly woken station, because the adjacent station may not receive the RTS control packet from the sending node and/or the CTS control packet from the receiving node, to avoid interference caused by the adjacent station to a transmission pair in a communication state, when the adjacent station is newly woken, the adjacent station may stop transmission within a preset silent duration, or perform transmission by using a preset transmit power.

The preset silent duration may be set according to a specific application scenario. The preset transmit power may be a minimum transmit power allowed in a statistical sense.

As can be seen, in the method procedure described in FIG. 6, when an adjacent node receives a CTS control packet sent by a receiving node, and determines that the adjacent node is located beyond coverage of an updated power of a sending node and the receiving node, the adjacent node can perform control packet transmission by using a limited power that does not cover the sending node and the receiving node. This improves spectrum resource utilization.

Based on the network architecture shown in FIG. 1, an embodiment of the present invention further discloses a data transmission device. Referring to FIG. 7, FIG. 7 is a schematic structural diagram of a data transmission device disclosed in an embodiment of the present invention. The data transmission device may be applied to a sending node in a data transmission system. As shown in FIG. 7, the data transmission device may include:

a sending module 701, configured to send a request to send RTS control packet carrying an identifier of a receiving node, so that after the receiving node receives the RTS control packet, the receiving node determines a power update value according to an initial transmit power of the RTS control packet and sends a CTS control packet by using the initial transmit power, where the CTS control packet carries an identifier of the sending node and the power update value; a first part of adjacent nodes other than the sending node, after receiving the CTS control packet, if determining that the first part of adjacent nodes are located beyond coverage of an updated power of the receiving node and the sending node, determine a first limited power and perform control packet transmission according to the first limited power; and the updated power is a power that is obtained by updating the initial transmit power by using the power update value, the updated power is lower than the initial transmit power, and the receiving node and the sending node are located beyond coverage of the first limited power of the first part of adjacent nodes; and a receiving module 702, configured to receive the CTS control packet; where the sending module 701 is further configured to send a data packet by using the updated power, where the updated power is further used by the receiving node to send an ACK signal by using the updated power after the receiving node completely receives the data packet sent by the sending node.

In this embodiment of the present invention, when the sending node needs to send data, the sending node may first send the RTS control packet, where the RTS control packet may carry the identifier of the receiving node, so that a node that receives the RTS control packet determines, according to the identifier of the receiving node carried in the RTS control packet, whether the node is the receiving node.

After the receiving node receives the RTS control packet sent by the sending node, if the receiving node is not in a silent period, that is, the receiving node is not located within coverage of another transmission pair (another sending node and another receiving node) in a communication state, the receiving node may determine the power update value according to the initial transmit power of the RTS control packet sent by the sending node, and send the CTS control packet carrying the power update value and the identifier of the sending node.

In this embodiment of the present invention, after determining the power update value, the receiving node may add the power update value to the CTS control packet, and send, by using the initial transmit power, the CTS control packet carrying the power update value, so that a node that receives the CTS control packet may determine the corresponding updated power according to the power update value carried in the CTS control packet. The updated power is lower than the initial transmit power.

In this embodiment of the present invention, after receiving the CTS control packet sent by the receiving node, the sending node may update the initial transmit power according to the power update value carried in the CTS control packet, to obtain the updated power, and send the data packet by using the updated power. Correspondingly, after completely receiving the data packet sent by the sending node, the receiving node may send the ACK signal by using the updated power.

After receiving the CTS control packet, the adjacent nodes (the first part of adjacent nodes) other than the sending node may determine, according to the initial transmit power and the power update value, whether the first part of adjacent nodes are located within the coverage of the updated power of the receiving node and the sending node, and when determining that the first part of adjacent nodes are located beyond the coverage of the updated power of the receiving node and the sending node, the first part of adjacent nodes may determine the first limited power, and perform control packet transmission according to the first limited power. The receiving node and the sending node are located beyond the coverage of the first limited power of the first part of adjacent nodes.

In this embodiment of the present invention, for a specific implementation in which the first part of adjacent nodes determine that the first part of adjacent nodes are located beyond the coverage of the updated power of the receiving node and the sending node, and a manner of determining the first limited power, refer to related descriptions in the method procedure shown in FIG. 2. Details are not described again herein.

In an optional embodiment, after the receiving module 702 receives the CTS control packet, and before the data packet is sent by using the updated power, the sending module 701 may be further configured to send an RTS update control packet by using the initial transmit power, where the RTS update control packet carries the power update value; a second part of adjacent nodes that receive the RTS update control packet but do not receive the CTS control packet, when determining that the second part of adjacent nodes are located beyond the coverage of the updated power of the sending node, determine a second limited power and perform control packet transmission according to the second limited power; and the sending node is located beyond coverage of the second limited power of the second part of adjacent nodes.

In this embodiment of the present invention, after receiving the CTS control packet sent by the receiving node, the sending node may update the initial transmit power by using the power update value carried in the CTS control packet, so as to obtain the updated power, and send the RTS update control packet (RTS-updated control packet) by using the initial transmit power, where the RTS update control packet carries the power update value.

For adjacent nodes that do not receive the CTS control packet but receive the RTS update control packet (the second part of adjacent nodes), the second part of adjacent nodes may determine, after receiving the RTS update control packet, the coverage of the updated power of the sending node according to the power update value carried in the RTS update control packet, and may further determine whether the second part of adjacent nodes are located within the coverage of the updated power of the sending node.

When the second part of adjacent nodes determine that the second part of adjacent nodes are located beyond the coverage of the updated power of the sending node, that is, no interference is caused to the second part of adjacent nodes when the sending node and the receiving node perform communication by using the updated power, the second part of adjacent nodes can perform data transmission according to the limited power (the second limited power).

In this embodiment of the present invention, for a manner of determining the second limited power, refer to related descriptions in the procedure shown in FIG. 3. Details are not described again herein.

In another optional embodiment, a third part of adjacent nodes that receive the RTS control packet but do not receive the CTS control packet and the data packet determine a third limited power and perform control packet transmission according to the third limited power; and the sending node is located beyond coverage of the third limited power of the third part of adjacent nodes.

For example, assuming that the initial transmit power is $P_{t0}$, and that a receive power of the RTS update control packet received by the third part of adjacent nodes is $P_{r(RTS)}$, the third part of adjacent nodes may determine a fourth path loss $PL_4$ according to the following formula:

$$PL_4 = P_{t0} - P_{r(RTS)}.$$

According to symmetry of the path loss, the third part of adjacent nodes may determine that a path loss from the third part of adjacent nodes to the sending node is also $PL_4$.

Further, assuming that a receive power threshold of the sending node is $P_{r\_threshold}$, the third part of adjacent nodes may determine the third limited power $P_{tx3}$ according to the following formula:

$$P_{tx3} - PL_4 < P_{r\_threshold}.$$

That is, the third part of adjacent nodes may determine a power satisfying that a receive power of the sending node is lower than the receive power threshold of the sending node, as the third limited power.

Alternatively, assuming that a signal-to-interference ratio threshold of the sending node is $SINR_{r\_threshold}$, and that current interference is I, and that current noise is N, the third part of adjacent nodes may determine the third limited power $P_{tx3}$ according to the following formula:

$$(P_{tx3} - PL_4)/(I+N) < SINR_{r\_threshold}.$$

That is, the third part of adjacent nodes may determine a power satisfying that a receive signal-to-interference ratio of the sending node is lower than the signal-to-interference ratio threshold of the sending node, as the third limited power.

It should be noted that, in this embodiment of the present invention, unless otherwise specified, the receive power threshold or signal-to-interference ratio threshold is a prescribed default receive power threshold or default signal-to-interference ratio threshold.

In this embodiment of the present invention, the initial transmit power is a prescribed default transmit power, or an actually used transmit power carried in the RTS control packet or the CTS control packet.

Figure 8:
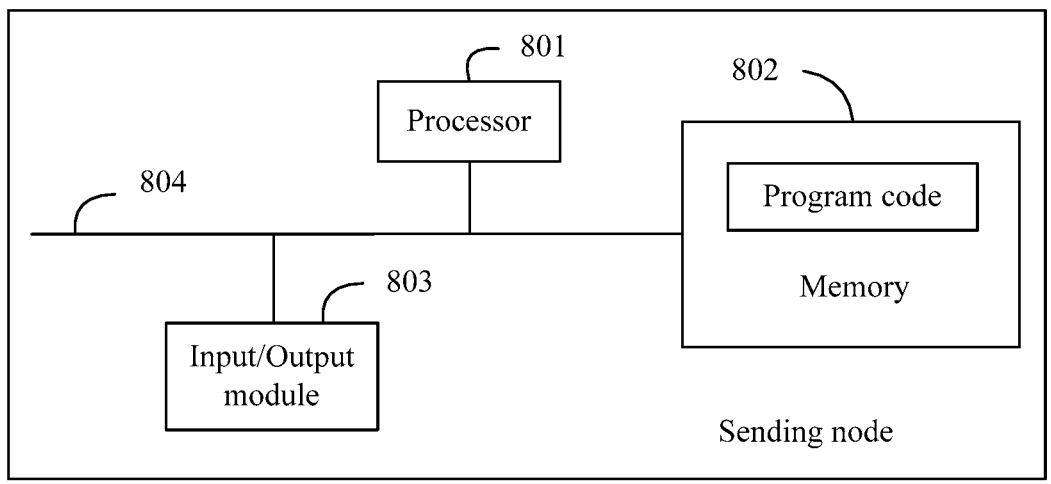
FIG. 8 is a schematic structural diagram of a sending node disclosed in an embodiment of the present invention.

Referring to FIG. 8, FIG. 8 is a schematic structural diagram of a sending node according to an embodiment of the present invention. The sending node shown in FIG. 8 may include a bus 804, and a processor 801, a memory 802, and an input/output module 803 that are interconnected by the bus. The memory 802 stores program code, and the processor 801 is configured to invoke the program code stored in the memory 802 to perform the following operations:

sending, by using the input/output module 803, a request to send RTS control packet carrying an identifier of a receiving node, so that after the receiving node receives the RTS control packet, the receiving node determines a power update value according to an initial transmit power of the RTS control packet and sends a CTS control packet by using the initial transmit power, where the CTS control packet carries an identifier of the sending node and the power update value; a first part of adjacent nodes other than the sending node, after receiving the CTS control packet, if determining that the first part of adjacent nodes are located beyond coverage of an updated power of the receiving node and the sending node, determine a first limited power and perform control packet transmission according to the first limited power; and the updated power is a power that is obtained by updating the initial transmit power by using the power update value, the updated power is lower than the initial transmit power, and the receiving node and the sending node are located beyond coverage of the first limited power of the first part of adjacent nodes; and receiving, by using the input/output module 803, the CTS control packet, and sending a data packet by using the updated power, where the updated power is further used by the receiving node to send an ACK signal by using the updated power after the receiving node completely receives the data packet sent by the sending node.

In an optional embodiment, after the processor 801 is configured to invoke the program code stored in the memory 802 to receive the CTS control packet by using the input/output module 803 and before the data packet is sent by using the updated power, the processor 801 may further perform the following operations:

sending an RTS update control packet by using the initial transmit power, where the RTS update control packet carries the power update value; a second part of adjacent nodes that receive the RTS update control packet but do not receive the CTS control packet, when determining that the second part of adjacent nodes are located beyond the coverage of the updated power of the sending node, determine a second limited power and perform control packet transmission according to the second limited power; and the sending node is located beyond coverage of the second limited power of the second part of adjacent nodes.

In an optional embodiment, a third part of adjacent nodes that receive the RTS control packet but do not receive the CTS control packet and the data packet determine a third limited power and perform transmission according to the third limited power; and the sending node is located beyond coverage of the third limited power of the third part of adjacent nodes.

In an optional embodiment, that a first part of adjacent nodes determine that the first part of adjacent nodes are located beyond coverage of an updated power of the receiving node and the sending node is implemented in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal-to-interference ratio threshold of the first part of adjacent nodes, determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and a receive power of the received CTS control packet, and when a difference between the updated power and the first path loss is less than a receive power threshold of the first part of adjacent nodes, or when a ratio of a difference between the updated power and the first path loss to a sum of current interference and noise is less than a signal-to-interference ratio threshold of the first part of adjacent nodes, determine that the first part of adjacent nodes are located beyond the coverage of the updated power of the receiving node and the sending node.

In an optional embodiment, the first part of adjacent nodes determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the first part of adjacent nodes according to the first limited power is determined according to an NAV duration carried in the RTS control packet and an NAV duration carried in the CTS control packet; or when the first part of adjacent nodes do not receive the RTS control packet, the first part of adjacent nodes determine a first path loss between the first part of adjacent nodes and the receiving node according to the initial transmit power and a receive power of the received CTS control packet, and determine a power satisfying that a difference between the power and the first path loss is less than a receive power threshold of the receiving node, as the first limited power, or determine a power satisfying that a ratio of the power minus the first path loss to a sum of current interference and noise is less than a signal-to-interference ratio threshold of the receiving node, as the first limited power, where a duration of the control packet transmission performed by the first part of adjacent nodes according to the first limited power is determined according to an NAV duration carried in the CTS control packet.

In an optional embodiment, the CTS control packet further carries receiver sensitivity of the receiving node, so that the first part of adjacent nodes determine the receive power threshold or the signal-to-interference ratio threshold of the receiving node according to the receiver sensitivity of the receiving node.

In an optional embodiment, the second part of adjacent nodes determine the second limited power in the following manner:

the second part of adjacent nodes determine a third path loss between the second part of adjacent nodes and the sending node according to the initial transmit power and a receive power of the received RTS update control packet; and the second part of adjacent nodes determine a power satisfying that a difference between the power and the third path loss is less than a receive power threshold of the sending node, as the second limited power, or determine a power satisfying that a ratio of the power minus the third path loss to a sum of current interference and noise is less than a signal-to-interference ratio threshold of the sending node, as the second limited power, where a duration of the control packet transmission performed by the second part of adjacent nodes according to the second limited power is determined according to an NAV duration carried in the RTS update control packet.

In an optional embodiment, the RTS update control packet further carries receiver sensitivity of the sending node, so that the second part of adjacent nodes determine the receive power threshold or the signal-to-interference ratio threshold of the sending node according to the receiver sensitivity of the sending node.

In an optional embodiment, the initial transmit power is a prescribed default transmit power, or an actually used transmit power carried in the RTS control packet or the CTS control packet.

Figure 9:
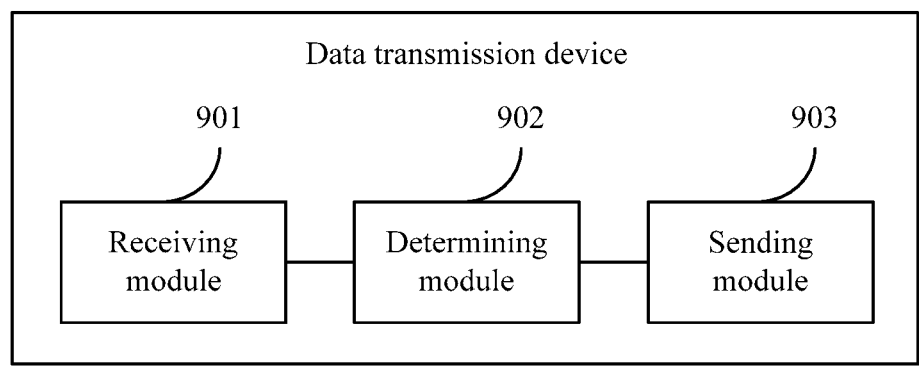
FIG. 9 is a schematic structural diagram of a data transmission device disclosed in an embodiment of the present invention.

Based on the network architecture shown in FIG. 1, an embodiment of the present invention discloses a data transmission device. Referring to FIG. 9, FIG. 9 is a schematic structural diagram of a data transmission device disclosed in an embodiment of the present invention. The data transmission device may be applied to a receiving node in a data transmission system. As shown in FIG. 9, the data transmission device may include:

a receiving module 901, configured to receive a request to send RTS control packet that carries an identifier of the receiving node and is sent by a sending node;

a determining module 902, configured to determine a power update value according to an initial transmit power of the RTS control packet; and a sending module 903, configured to send a CTS control packet by using the initial transmit power, where the RTS control packet carries an identifier of the sending node and the power update value; when receiving the CTS control packet, the sending node determines an updated power according to the power update value and sends a data packet by using the updated power; a first part of adjacent nodes other than the sending node among nodes that receive the CTS control packet, when determining that the first part of adjacent nodes are located beyond coverage of the updated power of the receiving node and the sending node, determine a first limited power and perform control packet transmission according to the first limited power; and the updated power is a power that is obtained by updating the initial transmit power by using the power update value, the updated power is lower than the initial transmit power, the updated power is further used by the receiving node to send an ACK signal by using the updated power after the receiving node completely receives the data packet sent by the sending node, and the receiving node and the sending node are located beyond coverage of the first limited power of the first part of adjacent nodes.

In this embodiment of the present invention, when the sending node needs to send data, the sending node may first send the RTS control packet, where the RTS control packet may carry the identifier of the receiving node, so that a node that receives the RTS control packet determines, according to the identifier of the receiving node carried in the RTS control packet, whether the node is the receiving node.

After the receiving node receives the RTS control packet sent by the sending node, if the receiving node is not in a silent period, that is, the receiving node is not located within coverage of another transmission pair (another sending node and another receiving node) in a communication state, the receiving node may determine the power update value according to the initial transmit power of the RTS control packet sent by the sending node, and send the CTS control packet carrying the power update value and the identifier of the sending node.

In this embodiment of the present invention, after determining the power update value, the receiving node may add the power update value to the CTS control packet, and send, by using the initial transmit power, the CTS control packet carrying the power update value, so that a node that receives the CTS control packet may determine the corresponding updated power according to the power update value carried in the CTS control packet. The updated power is lower than the initial transmit power.

After receiving the CTS control packet, the adjacent nodes (the first part of adjacent nodes) other than the sending node may determine, according to the initial transmit power and the power update value, whether the first part of adjacent nodes are located within the coverage of the updated power of the receiving node and the sending node, and when determining that the first part of adjacent nodes are located beyond the coverage of the updated power of the receiving node and the sending node, the first part of adjacent nodes may determine the first limited power, and perform control packet transmission according to the first limited power. The receiving node and the sending node are located beyond the coverage of the first limited power of the first part of adjacent nodes.

In an optional embodiment, the RTS control packet further carries a modulation and coding scheme MCS level and a quality of service QoS level that are expected by the sending node; and correspondingly, the determining module 902 may be specifically configured to determine, according to the initial transmit power, the MCS level, and the QoS level, a power ratio allowed to be reduced, where the power ratio allowed to be reduced is inversely proportional to the MCS level and the QoS level respectively.

For example, given the same initial transmit power of the RTS control packet and the same QoS level carried in the RTS control packet, when a corresponding power ratio allowed to be reduced when the MCS level carried in the RTS control packet is 256QAM transmission is compared with a corresponding power ratio allowed to be reduced when the MCS level carried in the RTS control packet is QPSK transmission, the power ratio allowed to be reduced in the former is smaller.

In another optional embodiment, the determining module 902 may be specifically configured to determine, according to the initial transmit power, an MCS level expected by the receiving node, and receiver sensitivity, a power ratio allowed to be reduced, where the power ratio allowed to be reduced is inversely proportional to the MCS level and directly proportional to the receiver sensitivity.

For example, given the same initial transmit power of the RTS control packet and the same MCS level expected by the receiving node, when the receiver sensitivity of the receiving node is higher, the power ratio allowed to be reduced is larger.

In this optional embodiment, the CTS control packet further carries the MCS level, so that the sending node sends the data packet by using the MCS level.

In still another optional embodiment, the determining module 902 may be specifically configured to: perform a calculus operation using a distance as a variable on a product of a size of a non-overlapping area of the coverage of the updated power and coverage of the initial transmit power, a node density of the non-overlapping area, and a service arrival rate of the non-overlapping area by using a radius of the coverage of the updated power as a lower limit and a radius of the coverage of the initial transmit power as an upper limit respectively, to obtain potential interference; determine a path loss between the receiving node and the sending node according to the initial transmit power and a receive power of the received RTS control packet; and determine the power update value according to a condition that a difference between the updated power and the path loss, divided by a sum of the potential interference, current interference, and current noise, is greater than or equal to a signal-to-interference ratio threshold of the receiving node.

For example, in this optional implementation, the receiving node may determine a maximum path loss within the coverage of the initial transmit power of the receiving node according to the initial transmit power and a prescribed default receive power threshold, and determine the radius (Region2_outer) of the coverage of the initial transmit power of the receiving node according to a path loss formula; likewise, the receiving node may determine the radius (Region2_inner) of the coverage of the updated power.

Further, the receiving node may determine the potential interference $\text{Interference}_{potential}$ by using the following formula:

$$\text{Interference}_{potential} = \int_{Region2\_inner}^{Region2\_outer} \rho \cdot \lambda \cdot \pi r^2 \, dr,$$

where $\rho$ is the node density of the non-overlapping area of the coverage of the initial transmit power and the coverage of the updated power of the receiving node, and $\lambda$ is the service arrival rate of the non-overlapping area.

Further, the receiving node may determine, according to the following formula, the power ratio allowed to be reduced:

$$((1-x\%)*P_{t0}-PL)/(\text{Interference}_{potential}+I+N) \geq \text{SINR}_{\_threshold},$$

where $x \%$ is the power ratio allowed to be reduced, $P_{t0}$ is the initial transmit power, PL is the path loss between the sending node and the receiving node, I is the current interference, N is the current noise, and $SINR_{threshold}$ is the signal-to-interference ratio threshold of the receiving node.

Optionally, that a first part of adjacent nodes determine that the first part of adjacent nodes are located beyond coverage of the updated power of the receiving node and the sending node is implemented in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal-to-interference ratio threshold of the first part of adjacent nodes, determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and a receive power of the received CTS control packet, and when a difference between the updated power and the first path loss is less than a receive power threshold of the first part of adjacent nodes, determine that the first part of adjacent nodes are located beyond the coverage of the updated power of the receiving node and the sending node.

Optionally, the first part of adjacent nodes determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the first part of adjacent nodes according to the first limited power is determined according to an NAV duration carried in the RTS control packet and an NAV duration carried in the CTS control packet; or when the first part of adjacent nodes do not receive the RTS control packet, the first part of adjacent nodes determine a first path loss between the first part of adjacent nodes and the receiving node according to the initial transmit power and a receive power of the received CTS control packet, and determine a power satisfying that a difference between the power and the first path loss is less than a receive power threshold of the receiving node, as the first limited power, or determine a power satisfying that a ratio of the power minus the first path loss to a sum of current interference and noise is less than a signal-to-interference ratio threshold of the receiving node, as the first limited power, where a duration of the control packet transmission performed by the first part of adjacent nodes according to the first limited power is determined according to an NAV duration carried in the CTS control packet.

Optionally, the CTS control packet further carries receiver sensitivity of the receiving node, so that the first part of adjacent nodes determine the receive power threshold or the signal-to-interference ratio threshold of the receiving node according to the receiver sensitivity of the receiving node.

In this embodiment of the present invention, the initial transmit power is a prescribed default transmit power, or an actually used transmit power carried in the RTS control packet or the CTS control packet.

Figure 10:
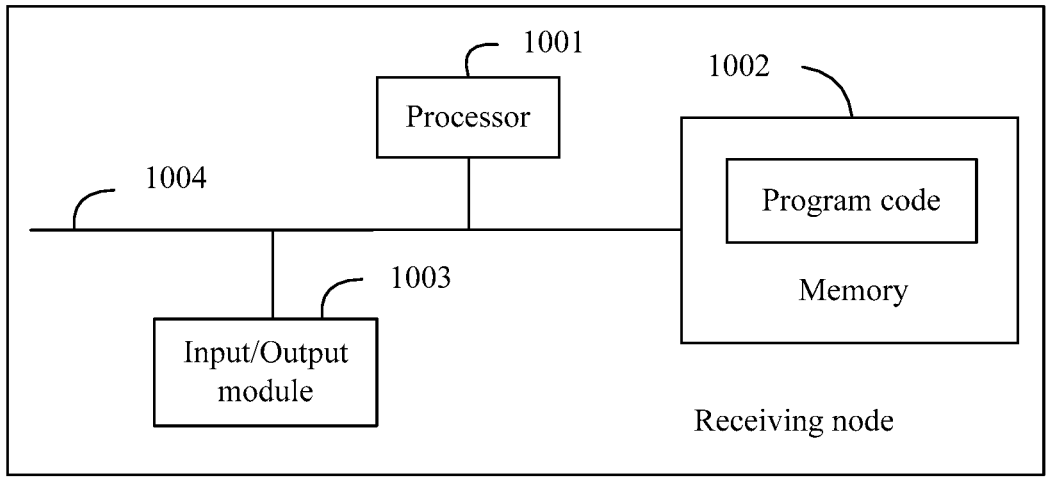
FIG. 10 is a schematic structural diagram of a receiving node disclosed in an embodiment of the present invention.

Referring to FIG. 10, FIG. 10 is a schematic structural diagram of a receiving node according to an embodiment of the present invention. The receiving node shown in FIG. 10 may include a bus 1004, and a processor 1001, a memory 1002, and an input/output module 1003 that are interconnected by the bus. The memory 1002 stores program code, and the processor 1001 is configured to invoke the program code stored in the memory 1002 to perform the following operations:

receiving, by using the input/output module 1003, a request to send RTS control packet that carries an identifier of the receiving node and is sent by a sending node, and determining a power update value according to an initial transmit power of the RTS control packet; and sending, by using the input/output module 1003, a CTS control packet by using the initial transmit power, where the RTS control packet carries an identifier of the sending node and the power update value; when receiving the CTS control packet, the sending node determines an updated power according to the power update value and sends a data packet by using the updated power; a first part of adjacent nodes other than the sending node among nodes that receive the CTS control packet, when determining that the first part of adjacent nodes are located beyond coverage of the updated power of the receiving node and the sending node, determine a first limited power and perform control packet transmission according to the first limited power; and the updated power is a power that is obtained by updating the initial transmit power by using the power update value, the updated power is lower than the initial transmit power, the updated power is further used by the receiving node to send an ACK signal by using the updated power after the receiving node completely receives the data packet sent by the sending node, and the receiving node and the sending node are located beyond coverage of the first limited power of the first part of adjacent nodes.

In an optional embodiment, the RTS control packet further carries a modulation and coding scheme MCS level and a quality of service QoS level that are expected by the sending node; and correspondingly, that the processor 1001 is configured to invoke the program code stored in the memory 1002 to determine a power update value according to an initial transmit power of the RTS control packet may specifically include:

determining, according to the initial transmit power, the MCS level, and the QoS level, a power ratio allowed to be reduced, where the power ratio allowed to be reduced is inversely proportional to the MCS level and the QoS level respectively.

In an optional embodiment, that the processor 1001 is configured to invoke the program code stored in the memory 1002 to determine a power update value according to an initial transmit power of the RTS control packet may specifically include:

determining, according to the initial transmit power, an MCS level expected by the receiving node, and receiver sensitivity, a power ratio allowed to be reduced, where the power ratio allowed to be reduced is inversely proportional to the MCS level and directly proportional to the receiver sensitivity; where the CTS control packet further carries the MCS level, so that the sending node sends the data packet by using the MCS level.

In an optional embodiment, that the processor 1001 is configured to invoke the program code stored in the memory 1002 to determine a power update value according to an initial transmit power of the RTS control packet may specifically include:

performing a calculus operation using a distance as a variable on a product of a size of a non-overlapping area of the coverage of the updated power and coverage of the initial transmit power, a node density of the non-overlapping area, and a service arrival rate of the non-overlapping area by using a radius of the coverage of the updated power as a lower limit and a radius of the coverage of the initial transmit power as an upper limit respectively, to obtain potential interference;

determining a path loss between the receiving node and the sending node according to the initial transmit power and a receive power of the received RTS control packet; and determining the power update value according to a condition that a difference between the updated power and the path loss, divided by a sum of the potential interference, current interference, and current noise, is greater than or equal to a signal-to-interference ratio threshold of the receiving node.

In an optional embodiment, that a first part of adjacent nodes determine that the first part of adjacent nodes are located beyond coverage of the updated power of the receiving node and the sending node is implemented in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal-to-interference ratio threshold of the first part of adjacent nodes, determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and a receive power of the received CTS control packet, and when a difference between the updated power and the first path loss is less than a receive power threshold of the first part of adjacent nodes, determine that the first part of adjacent nodes are located beyond the coverage of the updated power of the receiving node and the sending node.

In an optional embodiment, the first part of adjacent nodes determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, a receive power of the received CTS control packet, and a receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the first part of adjacent nodes according to the first limited power is determined according to an NAV duration carried in the RTS control packet and an NAV duration carried in the CTS control packet; or when the first part of adjacent nodes do not receive the RTS control packet, the first part of adjacent nodes determine a first path loss between the first part of adjacent nodes and the receiving node according to the initial transmit power and a receive power of the received CTS control packet, and determine a power satisfying that a difference between the power and the first path loss is less than a receive power threshold of the receiving node, as the first limited power, or determine a power satisfying that a ratio of the power minus the first path loss to a sum of current interference and noise is less than a signal-to-interference ratio threshold of the receiving node, as the first limited power, where a duration of the control packet transmission performed by the first part of adjacent nodes according to the first limited power is determined according to an NAV duration carried in the CTS control packet.

In an optional embodiment, the CTS control packet further carries receiver sensitivity of the receiving node, so that the first part of adjacent nodes determine the receive power threshold or the signal-to-interference ratio threshold of the receiving node according to the receiver sensitivity of the receiving node.

In an optional embodiment, the initial transmit power is a prescribed default transmit power, or an actually used transmit power carried in the RTS control packet or the CTS control packet.

Figure 11:
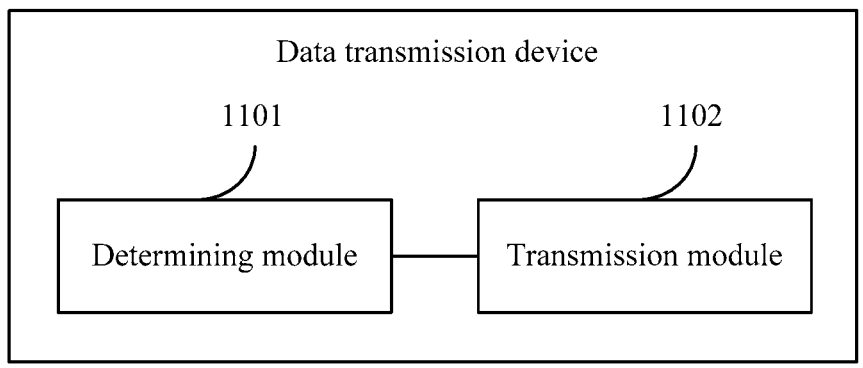
FIG. 11 is a schematic structural diagram of a data transmission device disclosed in an embodiment of the present invention.

Based on the network architecture shown in FIG. 1, an embodiment of the present invention further discloses a data transmission device. Referring to FIG. 11, FIG. 11 is a schematic structural diagram of a data transmission device disclosed in an embodiment of the present invention. The data transmission device may be applied to an adjacent node in a data transmission system. As shown in FIG. 11, the data transmission device may include:

a determining module 1101, configured to: when the adjacent node receives a clear to send CTS control packet that carries an identifier of a sending node and a power update value and is sent by a receiving node, determine whether the adjacent node is located beyond coverage of an updated power of the receiving node and the sending node, where the CTS control packet is sent by the receiving node by using an initial transmit power after the receiving node receives a request to send RTS control packet that carries an identifier of the receiving node and is sent by the sending node, and determines the power update value according to the initial transmit power of the RTS control packet; and the power update value is used by the sending node to update the initial transmit power by using the power update value to obtain the updated power after the sending node receives the CTS control packet, so that a data packet is sent by using the updated power, the updated power is lower than the initial transmit power, and the updated power is further used by the receiving node to send an ACK signal by using the updated power after the receiving node completely receives the data packet sent by the sending node; and when determining that the adjacent node is located beyond the coverage of the updated power of the receiving node and the sending node, determine a first limited power, where the receiving node and the sending node are located beyond coverage of the first limited power of the adjacent node; and a transmission module 1102, configured to perform control packet transmission according to the first limited power.

In this embodiment of the present invention, when the sending node needs to send data, the sending node may first send the RTS control packet, where the RTS control packet may carry the identifier of the receiving node, so that a node that receives the RTS control packet determines, according to the identifier of the receiving node carried in the RTS control packet, whether the node is the receiving node.

After the receiving node receives the RTS control packet sent by the sending node, if the receiving node is not in a silent period, that is, the receiving node is not located within coverage of another transmission pair (another sending node and another receiving node) in a communication state, the receiving node may determine the power update value according to the initial transmit power of the RTS control packet sent by the sending node, and send the CTS control packet carrying the power update value and the identifier of the sending node.

In this embodiment of the present invention, after determining the power update value, the receiving node may add the power update value to the CTS control packet, and send, by using the initial transmit power, the CTS control packet carrying the power update value, so that a node that receives the CTS control packet may determine the corresponding updated power according to the power update value carried in the CTS control packet. The updated power is lower than the initial transmit power.

After receiving the CTS control packet, adjacent nodes (a first part of adjacent nodes) other than the sending node may determine, according to the initial transmit power and the power update value, whether the first part of adjacent nodes are located within the coverage of the updated power of the receiving node and the sending node, and when determining that the first part of adjacent nodes are located beyond the coverage of the updated power of the receiving node and the sending node, the first part of adjacent nodes may determine the first limited power, and perform control packet transmission according to the first limited power. The receiving node and the sending node are located beyond the coverage of the first limited power of the first part of adjacent nodes.

Optionally, the determining module 1101 may be specifically configured to determine, in the following manner, that the adjacent node is located beyond the coverage of the updated power of the receiving node and the sending node:

if the adjacent node receives the RTS control packet, separately determining a first path loss between the adjacent node and the receiving node and a second path loss between the adjacent node and the sending node according to the initial transmit power, a receive power of the received CTS control packet, and a receive power of the received RTS control packet, and when a difference between the updated power and the first path loss and a difference between the updated power and the second path loss are both less than a receive power threshold of the adjacent node, or when a ratio of a difference between the updated power and the first path loss to a sum of current noise and interference and a ratio of a difference between the updated power and the second path loss to the sum of current noise and interference are both less than a signal-to-interference ratio threshold of the adjacent node, determining that the adjacent node is located beyond the coverage of the updated power of the receiving node and the sending node; or if the adjacent node does not receive the RTS control packet, determining a first path loss between the adjacent node and the receiving node according to the initial transmit power and a receive power of the received CTS control packet, and when a difference between the updated power and the first path loss is less than a receive power threshold of the adjacent node, or when a ratio of a difference between the updated power and the first path loss to a sum of current interference and noise is less than a signal-to-interference ratio threshold of the adjacent node, determining that the adjacent node is located beyond the coverage of the updated power of the receiving node and the sending node.

For example, assuming that the initial transmit power is $P_{t0}$, and that the receive power of the CTS control packet received by the first part of adjacent nodes is $P_{r(CTS)}$, the first part of adjacent nodes may determine that the path loss (the first path loss) PL1 between the first part of adjacent nodes and the receiving node is:

$$PL_1 = P_{t0} - P_{r(CTS)}.$$

Further, assuming that the updated power is $(1-x\%)P_{t0}$, the first part of adjacent nodes may determine a receive power $P_{rx}$ of the first part of adjacent nodes when the receiving node uses the updated power as a transmit power:

$$P_{rx} = (1-x\%)P_{t0} - PL_1, \text{ where}$$

when $P_{rx}$ is lower than or equal to the receive power threshold of the first part of adjacent nodes, the first part of adjacent nodes may determine that the first part of adjacent nodes are located beyond the coverage of the updated power of the receiving node.

Alternatively, assuming that the current interference is I, and that the current noise is N, the first part of adjacent nodes may determine a receive signal-to-interference ratio $SINR_{rx}$ of the first part of adjacent nodes when the receiving node uses the updated power as a transmit power:

$$SINR_{rx} = ((1-x\%)P_{t0} - PL_1)/(I+N), \text{ where}$$

when the $SINR_{rx}$ is less than or equal to the signal-to-interference ratio threshold of the first part of adjacent nodes, the first part of adjacent nodes may determine that the first part of adjacent nodes are located beyond the coverage of the updated power of the receiving node.

Optionally, the determining module 1101 may be specifically configured to determine the first limited power in the following manner:

if the adjacent node receives the RTS control packet, separately determining a first path loss between the adjacent node and the receiving node and a second path loss between the adjacent node and the sending node according to the initial transmit power, a receive power of the received CTS control packet, and a receive power of the received RTS control packet, and determining a power satisfying that a difference between the power and the first path loss is less than a receive power threshold of the receiving node and that a difference between the power and the second path loss is less than a receive power threshold of the sending node, as the first limited power, or determining a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the adjacent node according to the first limited power is determined according to an NAV duration carried in the RTS control packet and an NAV duration carried in the CTS control packet; or if the adjacent node does not receive the RTS control packet, determining a first path loss between the adjacent node and the receiving node according to the initial transmit power and a receive power of the received CTS control packet, and determining a power satisfying that a difference between the power and the first path loss is less than a receive power threshold of the receiving node, as the first limited power, or determining a power satisfying that a ratio of the power minus the first path loss to a sum of current interference and noise is less than a signal-to-interference ratio threshold of the receiving node, as the first limited power, where a duration of the control packet transmission performed by the adjacent node according to the first limited power is determined according to an NAV duration carried in the CTS control packet.

For example, assuming that the initial transmit power is $P_{t0}$, and that the receive power of the CTS control packet received by the first part of adjacent nodes is $P_{r(CTS)}$, the first part of adjacent nodes may determine the first path loss $PL_1$ according to the following formula:

$$PL_1 = P_{t0} - P_{r(CTS)}.$$

According to symmetry of the path loss, the first part of adjacent nodes may determine that a path loss from the first part of adjacent nodes to the receiving node is also $PL_1$.

Further, assuming that the receive power threshold of the receiving node is $P_{r\_threshold}$, the first part of adjacent nodes may determine the first limited power $P_{tx1}$ according to the following formula:

$$P_{tx1} - PL_1 \le P_{r\_threshold}.$$

That is, the first part of adjacent nodes may determine a power satisfying that a receive power of the receiving node is lower than or equal to the receive power threshold of the receiving node, as the first limited power.

Alternatively, assuming that the signal-to-interference ratio threshold of the receiving node is $SINR_{r\_threshold}$, and that the current interference is I, and that the current noise is N, the first part of adjacent nodes may determine the first limited power $P_{tx1}$ according to the following formula:

$$(P_{tx1} - PL_1)/(I+N) \le SINR_{r\_threshold}.$$

That is, the first part of adjacent nodes may determine a power satisfying that a receive signal-to-interference ratio of the receiving node is less than or equal to the signal-to-interference ratio threshold of the receiving node, as the first limited power.

It should be noted that, in this embodiment of the present invention, unless otherwise specified, the receive power threshold or signal-to-interference ratio threshold is a prescribed default receive power threshold or default signal-to-interference ratio threshold.

Optionally, the CTS control packet further carries receiver sensitivity of the receiving node, so that the adjacent node determines the receive power threshold or the signal-to-interference ratio threshold of the receiving node according to the receiver sensitivity of the receiving node.

Optionally, the transmission module 1102 may be specifically configured to:

send, by using the first limited power, another RTS control packet carrying the first limited power and an identifier of a target node;

when receiving another CTS control packet carrying another power update value and an identifier of the adjacent node, send, by using the first limited power, another RTS update control packet carrying the another power update value, so that other nodes different from the target node among nodes that receive the another RTS update control packet, after receiving the another RTS update control packet, if determining that the other nodes are located beyond coverage of an updated power of the adjacent node, determine a fourth limited power and perform control packet transmission according to the fourth limited power, where the another updated power is a power that is obtained by updating the first limited power by using the another power update value, the another updated power is lower than or equal to the first limited power, and the adjacent node is located beyond coverage of the fourth limited power of the other nodes different from the target node among the nodes that receive the another RTS update control packet; and send, by the adjacent node, a data packet by using the another updated power.

After the target node receives the another RTS control packet, if the target node is located beyond coverage of the initial transmit power of the sending node and the receiving node and is located beyond coverage of the initial transmit power of another sending node and another receiving node in another transmission pair that is performing data transmission, the target node sends, by using the initial transmit power, the another CTS control packet carrying the identifier of the adjacent node and the another power update value, so that other nodes different from the adjacent node among nodes that receive the another CTS control packet, after receiving the another CTS control packet, if determining that the other nodes are located beyond coverage of the another updated power of the adjacent node, determine a fifth limited power and perform control packet transmission according to the fifth limited power, where the target node is located beyond coverage of the fifth limited power of the other nodes different from the adjacent node among the nodes that receive the another CTS control packet, and the first limited power is higher than the another updated power.

After the target node receives the another RTS control packet, if the target node is located within coverage of the initial transmit power of the sending node and the receiving node and/or is located within coverage of the initial transmit power of another sending node and another receiving node in another transmission pair that is performing data transmission, the target node sends, by using a sixth limited power, the another CTS control packet carrying the identifier of the adjacent node and the another power update value, so that other nodes different from the adjacent node among nodes that receive the another CTS control packet, after receiving the another CTS control packet, if determining that the other nodes are located beyond coverage of the another updated power of the target node and the adjacent node, determine a seventh limited power and perform control packet transmission according to the seventh limited power, where the sending node, the receiving node, and the another sending node and the another receiving node in the another transmission pair that is performing data transmission are located beyond coverage of the sixth limited power of the target node, the target node is located beyond coverage of the seventh limited power of the other nodes different from the adjacent node among the nodes that receive the another CTS control packet, and the sixth limited power is higher than the another updated power.

In this embodiment of the present invention, the initial transmit power is a prescribed default transmit power, or an actually used transmit power carried in the RTS control packet or the CTS control packet.

Figure 12:
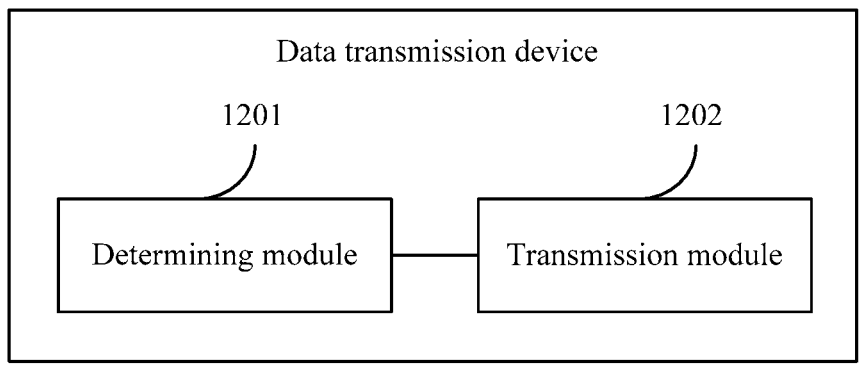
FIG. 12 is a schematic structural diagram of a data transmission device disclosed in an embodiment of the present invention.

Based on the network architecture shown in FIG. 1, an embodiment of the present invention further discloses a data transmission device. Referring to FIG. 12, FIG. 12 is a schematic structural diagram of a data transmission device disclosed in an embodiment of the present invention. The data transmission device may be applied to an adjacent node in a data transmission system. As shown in FIG. 12, the data transmission device may include:

a determining module 1201, configured to: when the adjacent node receives an RTS update control packet that carries a power update value and is sent by a sending node, but does not receive a CTS control packet sent by a receiving node, determine whether the adjacent node is located beyond coverage of the updated power of the sending node, where the CTS control packet is sent by the receiving node by using an initial transmit power after the receiving node receives an RTS control packet that carries an identifier of the receiving node and is sent by the sending node, and determines the power update value according to the initial transmit power of the RTS control packet; the power update value is used by the sending node to update the initial transmit power by using the power update value to obtain the updated power after the sending node receives the CTS control packet, so that a data packet is sent by using the updated power, the updated power is lower than the initial transmit power, and the updated power is further used by the receiving node to send an ACK signal by using the updated power after the receiving node completely receives the data packet sent by the sending node; and the RTS update control packet is sent by the sending node by using the initial transmit power after the CTS control packet is received and before the data packet is sent by using the updated power; and when determining that the adjacent node is located beyond the coverage of the updated power of the sending node, determine the second limited power, and enable a transmission module 1202 to perform control packet transmission according to the second limited power, where the sending node is located beyond coverage of the second limited power of the adjacent node; and the transmission module 1202, configured to perform control packet transmission according to the second limited power, where the sending node is located beyond the coverage of the second limited power of the adjacent node.

In this embodiment of the present invention, after receiving the CTS control packet sent by the receiving node, the sending node may update the initial transmit power by using the power update value carried in the CTS control packet, so as to obtain the updated power, and send the RTS update control packet (RTS-updated control packet) by using the initial transmit power, where the RTS update control packet carries the power update value.

For adjacent nodes that do not receive the CTS control packet but receive the RTS update control packet (a second part of adjacent nodes), the second part of adjacent nodes may determine, after receiving the RTS update control packet, the coverage of the updated power of the sending node according to the power update value carried in the RTS update control packet, and may further determine whether the second part of adjacent nodes are located within the coverage of the updated power of the sending node.

When the second part of adjacent nodes determine that the second part of adjacent nodes are located beyond the coverage of the updated power of the sending node, that is, no interference is caused to the second part of adjacent nodes when the sending node and the receiving node perform communication by using the updated power, the second part of adjacent nodes can perform transmission according to the limited power (the second limited power).

Optionally, the determining module 1201 may be specifically configured to determine the second limited power in the following manner:

determining a third path loss between the adjacent node and the sending node according to the initial transmit power and a receive power of the received RTS update control packet; and determining a power satisfying that a difference between the power and the third path loss is less than a receive power threshold of the sending node, as the second limited power, or determining a power satisfying that a ratio of the power minus the third path loss to a sum of current interference and noise is less than a signal-to-interference ratio threshold of the sending node, as the second limited power, where a duration of the control packet transmission performed by the adjacent node according to the second limited power is determined according to an NAV duration carried in the RTS update control packet.

For example, assuming that the initial transmit power is $P_{t0}$, and that the receive power of the RTS update control packet received by the second part of adjacent nodes is $P_{r(RTS\_updated)}$, the second part of adjacent nodes may determine the third path loss $PL_3$ according to the following formula:

$$PL_3 = P_{t0} - P_{r(RTS\_updated)}.$$

According to symmetry of the path loss, the second part of adjacent nodes may determine that a path loss from the second part of adjacent nodes to the sending node is also $PL_3$.

Further, assuming that the receive power threshold of the sending node is $P_{r\_threshold}$, the second part of adjacent nodes may determine the second limited power $P_{tx2}$ according to the following formula:

$$P_{tx2} - PL_3 < P_{r\_threshold}.$$

That is, the second part of adjacent nodes may determine a power satisfying that a receive power of the sending node is lower than the receive power threshold of the sending node, as the second limited power.

Alternatively, assuming that the signal-to-interference ratio threshold of the sending node is $SINR_{r\_threshold}$, and that the current interference is I, and that the current noise is N, the second part of adjacent nodes may determine the second limited power $P_{tx2}$ according to the following formula:

$$(P_{tx2}-PL_3)/(I+N)<SINR_{r\_threshold}.$$

That is, the second part of adjacent nodes may determine a power satisfying that a receive signal-to-interference ratio of the sending node is lower than the signal-to-interference ratio threshold of the sending node, as the second limited power.

It should be noted that, in this embodiment of the present invention, unless otherwise specified, the receive power threshold or signal-to-interference ratio threshold is a prescribed default receive power threshold or default signal-to-interference ratio threshold.

Optionally, the RTS update control packet further carries receiver sensitivity of the sending node, so that the adjacent node determines the receive power threshold or the signal-to-interference ratio threshold of the sending node according to the receiver sensitivity of the sending node.

Optionally, the transmission module 1202 may be specifically configured to:

if the adjacent node determines that a remaining duration of a data packet sending phase of the sending node is greater than a preset time threshold, send, by using the initial transmit power, still another RTS control packet carrying the second limited power and another target node;

when receiving still another CTS control packet carrying still another power update value and an identifier of the adjacent node, send, by using the initial transmit power, still another RTS update control packet carrying the still another power update value, so that other nodes different from the another target node among nodes that receive the still another RTS update control packet, after receiving the still another RTS update control packet, if determining that the other nodes are located beyond coverage of still another updated power of the adjacent node, determine an eighth limited power and perform control packet transmission according to the eighth limited power, where the still another updated power is a power that is obtained by updating the second limited power by using the still another power update value, the still another updated power is lower than or equal to the second limited power, and the adjacent node is located beyond coverage of the eighth limited power of the other nodes different from the another target node among the nodes that receive the still another RTS update control packet; and send a data packet by using the still another updated power.

After the another target node receives the still another RTS control packet, if the another target node is located beyond coverage of the initial transmit power of the sending node and the receiving node and is located beyond coverage of the initial transmit power of another sending node and another receiving node in another transmission pair that is performing data transmission, the target node sends, by using the initial transmit power, the another CTS control packet carrying the identifier of the adjacent node and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine a ninth limited power and perform control packet transmission according to the ninth limited power, where the another target node is located beyond coverage of the ninth limited power of the other nodes different from the adjacent node among the nodes that receive the still another CTS control packet, and the second limited power is higher than the still another updated power.

After the another target node receives the still another RTS control packet, if the another target node is located within coverage of the initial transmit power of the sending node and the receiving node and/or is located within coverage of the initial transmit power of another sending node and another receiving node in another transmission pair that is performing data transmission, the target node sends, by using a tenth limited power, the still another CTS control packet carrying the identifier of the adjacent node and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine an eleventh limited power and perform control packet transmission according to the eleventh limited power, where the sending node and the receiving node and/or the another sending node and the another receiving node in the another transmission pair that is performing data transmission are located beyond coverage of the tenth limited power of the another target node, the another target node is located beyond coverage of the eleventh limited power of the other nodes different from the adjacent node among the nodes that receive the still another CTS control packet, and the tenth limited power is higher than the still another updated power.

In this embodiment of the present invention, the initial transmit power is a prescribed default transmit power, or an actually used transmit power carried in the RTS control packet or the CTS control packet.

Figure 13:
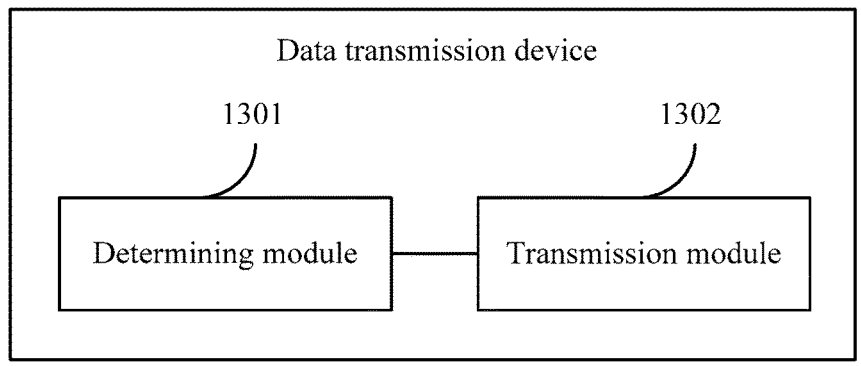
FIG. 13 is a schematic structural diagram of a data transmission device disclosed in an embodiment of the present invention.

Based on the network architecture shown in FIG. 1, an embodiment of the present invention further discloses a data transmission device. Referring to FIG. 13, FIG. 13 is a schematic structural diagram of a data transmission device disclosed in an embodiment of the present invention. The data transmission device may be applied to an adjacent node in a data transmission system. As shown in FIG. 13, the data transmission device may include:

a determining module 1301, configured to: when the adjacent node receives an RTS control packet sent by a sending node, but does not receive a CTS control packet sent by a receiving node and a data packet sent by the sending node, determine a third limited power, and enable a transmission module 1302 to perform control packet transmission according to the third limited power, where the CTS control packet is sent by the receiving node by using an initial transmit power after the receiving node receives the RTS control packet that carries an identifier of the receiving node and is sent by the sending node, and determines the power update value according to the initial transmit power of the RTS control packet; the power update value is used by the sending node to update the initial transmit power by using the power update value to obtain an updated power after the sending node receives the CTS control packet, so that the data packet is sent by using the updated power, the updated power is lower than the initial transmit power, and the updated power is further used by the receiving node to send an ACK signal by using the updated power after the receiving node completely receives the data packet sent by the sending node; and the sending node is located beyond coverage of the third limited power of the adjacent node; and the transmission module 1302, which may be configured to perform control packet transmission according to the third limited power.

For example, for adjacent nodes that receive the RTS control packet but do not receive the CTS control packet and the data packet (a third part of adjacent nodes), assuming that the initial transmit power is $P_{t0}$, and that a receive power of an RTS update control packet received by the third part of adjacent nodes is $P_{r(RTS)}$, the third part of adjacent nodes may determine a fourth path loss $PL_4$ according to the following formula:

$$PL_4 = P_{t0} - P_{r(RTS)}.$$

According to symmetry of the path loss, the third part of adjacent nodes may determine that a path loss from the third part of adjacent nodes to the sending node is also $PL_4$.

Further, assuming that a receive power threshold of the sending node is $P_{r\_threshold}$, the third part of adjacent nodes may determine the third limited power $P_{tx3}$ according to the following formula:

$$P_{tx3} - PL_4 < P_{r\_threshold}.$$

That is, the third part of adjacent nodes may determine a power satisfying that a receive power of the sending node is lower than the receive power threshold of the sending node, as the third limited power.

Alternatively, assuming that a signal-to-interference ratio threshold of the sending node is $SINR_{r\_threshold}$, and that current interference is I, and that current noise is N, the third part of adjacent nodes may determine the third limited power $P_{tx3}$ according to the following formula:

$$(P_{tx3} - PL_4)/(I+N) < SINR_{r\_threshold}.$$

That is, the third part of adjacent nodes may determine a power satisfying that a receive signal-to-interference ratio of the sending node is lower than the signal-to-interference ratio threshold of the sending node, as the third limited power.

It should be noted that, in this embodiment of the present invention, unless otherwise specified, the receive power threshold or signal-to-interference ratio threshold is a prescribed default receive power threshold or default signal-to-interference ratio threshold.

In this embodiment of the present invention, the initial transmit power is a prescribed default transmit power, or an actually used transmit power carried in the RTS control packet or the CTS control packet.

It should be noted that, the foregoing data transmission devices described in FIG. 11, FIG. 12, and FIG. 13 have structures and functions when the nodes to which the data transmission devices are applied are respectively used as the first part of adjacent nodes, the second part of adjacent nodes, and the third part of adjacent nodes described in the foregoing method embodiments. In a specific scenario, the nodes to which the data transmission devices are applied may play only a role of one node in the first part of adjacent nodes, the second part of adjacent nodes, and the third part of adjacent nodes described in the foregoing method embodiments. In different application scenarios, the nodes to which the data transmission devices are applied may play different roles. It should be noted that, the node to which the foregoing data transmission device described in FIG. 11 is applied is not limited to being used as the first part of adjacent nodes (its application scenario may be when the adjacent node receives the clear to send CTS control packet that carries the identifier of the sending node and the power update value and is sent by the receiving node); in other application scenarios, the node may also be used as the second part of adjacent nodes (its application scenario may be when the adjacent node receives the RTS update control packet that carries the power update value and is sent by the sending node, but does not receive the CTS control packet) or the third part of adjacent nodes (its application scenario may be when the adjacent node receives the RTS control packet but does not receive the CTS control packet and the data packet). Correspondingly, when the node to which the data transmission device described in FIG. 11 is applied is used as the second part of adjacent nodes, the node may also include a functional module included in the data transmission device described in FIG. 12, or the determining module 1101 described in FIG. 11 may have a function of the determining module 1201, and the transmission module 1102 may have a function of the transmission module 1202. The same may be derived when the node to which the data transmission device described in FIG. 11 is applied is used as the third part of adjacent nodes, the node to which the data transmission device described in FIG. 12 is applied is used as the first part of adjacent nodes or the third part of adjacent nodes, or the node to which the data transmission device described in FIG. 13 is applied is used as the first part of adjacent nodes or the second part of adjacent nodes. Details are not described again herein in this embodiment of the present invention.

Further, in this embodiment of the present invention, when the node to which the data transmission device is applied is used as an adjacent node that is a newly woken node, the transmission module in the data transmission device stops transmission within a preset silent duration, or performs transmission by using a preset transmit power.

Figure 14:
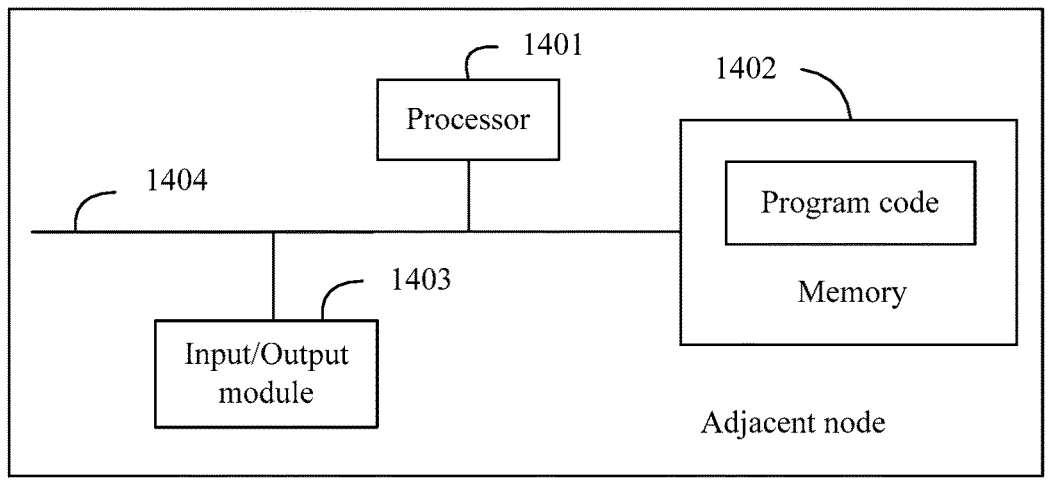
FIG. 14 is a schematic structural diagram of an adjacent node disclosed in an embodiment of the present invention.

Referring to FIG. 14, FIG. 14 is a schematic structural diagram of an adjacent node according to an embodiment of the present invention. The adjacent node shown in FIG. 14 may include a bus 1404, and a processor 1401, a memory 1402, and an input/output module 1403 that are interconnected by the bus. The memory 1402 stores program code, and the processor 1401 is configured to invoke the program code stored in the memory 1402 to perform the following operations:

when the adjacent node receives, by using input/output module 1403, a clear to send CTS control packet that carries an identifier of a sending node and a power update value and is sent by a receiving node, determining whether the adjacent node is located beyond coverage of an updated power of the receiving node and the sending node, where the CTS control packet is sent by the receiving node by using an initial transmit power after the receiving node receives a request to send RTS control packet that carries an identifier of the receiving node and is sent by the sending node, and determines the power update value according to the initial transmit power of the RTS control packet; and the power update value is used by the sending node to update the initial transmit power by using the power update value to obtain the updated power after the sending node receives the CTS control packet, so that a data packet is sent by using the updated power, the updated power is lower than the initial transmit power, and the updated power is further used by the receiving node to send an ACK signal by using the updated power after the receiving node completely receives the data packet sent by the sending node; and if determining that the adjacent node is located beyond the coverage of the updated power of the receiving node and the sending node, determining a first limited power, and performing control packet transmission according to the first limited power by using the input/output module 1403, where the receiving node and the sending node are located beyond coverage of the first limited power of the adjacent node.

In an optional embodiment, the processor 1401 is configured to invoke the program code stored in the memory 1402 to further perform the following operations:

when the adjacent node receives, by using the input/output module 1403, an RTS update control packet that carries the updated power and is sent by the sending node, but does not receive the CTS control packet, determining whether the adjacent node is located beyond the coverage of the updated power of the sending node, where the RTS update control packet is sent by the sending node by using the initial transmit power after the CTS control packet is received and before the data packet is sent by using the updated power; and if the adjacent node is located beyond the coverage of the updated power of the sending node, determining a second limited power, and performing control packet transmission according to the second limited power by using the input/output module 1403, where the sending node is located beyond coverage of the second limited power of the adjacent node.

In an optional embodiment, the processor 1401 is configured to invoke the program code stored in the memory 1402 to further perform the following operations:

when the RTS control packet is received by using the input/output module 1403, but the CTS control packet and the data packet are not received, determining a third limited power, and performing control packet transmission according to the third limited power, where the sending node is located beyond coverage of the third limited power of the adjacent node.

In an optional embodiment, that the processor 1401 is configured to invoke the program code stored in the memory 1402 to determine that the adjacent node is located beyond the coverage of the updated power of the receiving node and the sending node may specifically include:

if the RTS control packet is received by using the input/output module 1403, separately determining a first path loss between the adjacent node and the receiving node and a second path loss between the adjacent node and the sending node according to the initial transmit power, a receive power of the received CTS control packet, and a receive power of the received RTS control packet, and when a difference between the updated power and the first path loss and a difference between the updated power and the second path loss are both less than a receive power threshold of the adjacent node, or when a ratio of a difference between the updated power and the first path loss to a sum of current noise and interference and a ratio of a difference between the updated power and the second path loss to the sum of current noise and interference are both less than a signal-to-interference ratio threshold of the adjacent node, determining that the adjacent node is located beyond the coverage of the updated power of the receiving node and the sending node; or if the RTS control packet is not received by using the input/output module 1403, determining a first path loss between the adjacent node and the receiving node according to the initial transmit power and a receive power of the received CTS control packet, and when a difference between the updated power and the first path loss is less than a receive power threshold of the adjacent node, or when a ratio of a difference between the updated power and the first path loss to a sum of current interference and noise is less than a signal-to-interference ratio threshold of the adjacent node, determining that the adjacent node is located beyond the coverage of the updated power of the receiving node and the sending node.

In an optional embodiment, that the processor 1401 is configured to invoke the program code stored in the memory 1402 to determine a first limited power may specifically include:

if the RTS control packet is received by using the input/output module 1403, separately determining a first path loss between the adjacent node and the receiving node and a second path loss between the adjacent node and the sending node according to the initial transmit power, a receive power of the received CTS control packet, and a receive power of the received RTS control packet, and determining a power satisfying that a difference between the power and the first path loss is less than a receive power threshold of the receiving node and that a difference between the power and the second path loss is less than a receive power threshold of the sending node, as the first limited power, or determining a power satisfying that a ratio of the power minus the first path loss to a sum of current interference and noise is less than a signal-to-interference ratio threshold of the receiving node and that a ratio of the power minus the second path loss to the sum of current interference and noise is less than a signal-to-interference ratio threshold of the sending node, as the first limited power, where a duration of the control packet transmission performed by the adjacent node according to the first limited power is determined according to an NAV duration carried in the RTS control packet and an NAV duration carried in the CTS control packet; or if the RTS control packet is not received by using the input/output module 1403, determining a first path loss between the adjacent node and the receiving node according to the initial transmit power and a receive power of the received CTS control packet, and determining a power satisfying that a difference between the power and the first path loss is less than a receive power threshold of the receiving node, as the first limited power, or determining a power satisfying that a ratio of the power minus the first path loss to a sum of current interference and noise is less than a signal-to-interference ratio threshold of the receiving node, as the first limited power, where a duration of the control packet transmission performed by the adjacent node according to the first limited power is determined according to an NAV duration carried in the CTS control packet.

In an optional embodiment, the CTS control packet further carries receiver sensitivity of the receiving node, so that the adjacent node determines the receive power threshold or the signal-to-interference ratio threshold of the receiving node according to the receiver sensitivity of the receiving node.

In an optional embodiment, that the processor 1401 is configured to invoke the program code stored in the memory 1402 to determine a second limited power may specifically include:

determining a third path loss between the adjacent node and the sending node according to the initial transmit power and a receive power of the received RTS update control packet; and determining a power satisfying that a difference between the power and the third path loss is less than a receive power threshold of the sending node, as the second limited power, or determining a power satisfying that a ratio of the power minus the third path loss to a sum of current interference and noise is less than a signal-to-interference ratio threshold of the sending node, as the second limited power, where a duration of the control packet transmission performed by the adjacent node according to the second limited power is determined according to an NAV duration carried in the RTS update control packet.

The RTS update control packet further carries receiver sensitivity of the sending node, so that the adjacent node determines the receive power threshold or the signal-to-interference ratio threshold of the sending node according to the receiver sensitivity of the sending node.

In an optional embodiment, that the processor 1401 is configured to invoke the program code stored in the memory 1402 to perform control packet transmission according to the first limited power by using the input/output module 1403 may specifically include:

sending, by using the input/output module 1403 and the first limited power, another RTS control packet carrying the first limited power and an identifier of a target node;

when another CTS control packet carrying another power update value and an identifier of the adjacent node is received, sending, by using the input/output module 1403 and the first limited power, another RTS update control packet carrying the another power update value, so that other nodes different from the target node among nodes that receive the another RTS update control packet, after receiving the another RTS update control packet, if determining that the other nodes are located beyond coverage of an updated power of the adjacent node, determining a fourth limited power and perform control packet transmission according to the fourth limited power, where the another updated power is a power that is obtained by updating the first limited power by using the another power update value, the another updated power is lower than or equal to the first limited power, and the adjacent node is located beyond coverage of the fourth limited power of the other nodes different from the target node among the nodes that receive the another RTS update control packet; and sending a data packet by using the input/output module 1403 and the another updated power.

In an optional embodiment, after the target node receives the another RTS control packet, if the target node is located beyond coverage of the initial transmit power of the sending node and the receiving node and is located beyond coverage of the initial transmit power of another sending node and another receiving node in another transmission pair that is performing data transmission, the target node sends, by using the initial transmit power, the another CTS control packet carrying the identifier of the adjacent node and the another power update value, so that other nodes different from the adjacent node among nodes that receive the another CTS control packet, after receiving the another CTS control packet, if determining that the other nodes are located beyond coverage of the another updated power of the adjacent node, determine a fifth limited power and perform control packet transmission according to the fifth limited power, where the target node is located beyond coverage of the fifth limited power of the other nodes different from the adjacent node among the nodes that receive the another CTS control packet.

In an optional embodiment, after the target node receives the another RTS control packet, if the target node is located within coverage of the initial transmit power of the sending node and the receiving node and/or is located within coverage of the initial transmit power of another sending node and another receiving node in another transmission pair that is performing data transmission, the target node sends, by using a sixth limited power, the another CTS control packet carrying the identifier of the adjacent node and the another power update value, so that other nodes different from the adjacent node among nodes that receive the another CTS control packet, after receiving the another CTS control packet, if determining that the other nodes are located beyond coverage of the another updated power of the target node and the adjacent node, determine a seventh limited power and perform control packet transmission according to the seventh limited power, where the sending node, the receiving node, and the another sending node and the another receiving node in the another transmission pair that is performing data transmission are located beyond coverage of the sixth limited power of the target node, the target node is located beyond coverage of the seventh limited power of the other nodes different from the adjacent node among the nodes that receive the another CTS control packet, and the sixth limited power is higher than the another updated power.

In an optional embodiment, that the processor 1401 is configured to invoke the program code stored in the memory 1402 to perform control packet transmission according to the second limited power by using the input/output module 1403 may specifically include:

if the adjacent node determines that a remaining duration of a data packet sending phase of the sending node is greater than a preset time threshold, sending, by using the input/output module 1403 and the initial transmit power, still another RTS control packet carrying the second limited power and an identifier of another target node;

when still another CTS control packet carrying still another power update value and an identifier of the adjacent node is received, sending, by using the input/output module 1403 and the initial transmit power, still another RTS update control packet carrying the still another power update value, so that other nodes different from the another target node among nodes that receive the still another RTS update control packet, after receiving the still another RTS update control packet, if determining that the other nodes are located beyond coverage of an updated power of the adjacent node, determining an eighth limited power and perform control packet transmission according to the eighth limited power, where the still another updated power is a power that is obtained by updating the second limited power by using the still another power update value, the still another updated power is lower than or equal to the second limited power, and the adjacent node is located beyond coverage of the eighth limited power of the other nodes different from the another target node among the nodes that receive the still another RTS update control packet; and sending a data packet by using the input/output module 1403 and the still another updated power.

In an optional embodiment, after the another target node receives the still another RTS control packet, if the another target node is located beyond coverage of the initial transmit power of the sending node and the receiving node and is located beyond coverage of the initial transmit power of another sending node and another receiving node in another transmission pair that is performing data transmission, the target node sends, by using the initial transmit power, the another CTS control packet carrying the identifier of the adjacent node and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine a ninth limited power and perform control packet transmission according to the ninth limited power, where the another target node is located beyond coverage of the ninth limited power of the other nodes different from the adjacent node among the nodes that receive the still another CTS control packet.

In an optional embodiment, after the another target node receives the still another RTS control packet, if the another target node is located within coverage of the initial transmit power of the sending node and the receiving node and/or is located within coverage of the initial transmit power of another sending node and another receiving node in another transmission pair that is performing data transmission, the target node sends, by using a tenth limited power, the still another CTS control packet carrying the identifier of the adjacent node and the still another power update value, so that other nodes different from the adjacent node among nodes that receive the still another CTS control packet, after receiving the still another CTS control packet, if determining that the other nodes are located beyond coverage of the still another updated power of the another target node and the adjacent node, determine an eleventh limited power and perform control packet transmission according to the eleventh limited power, where the sending node and the receiving node and/or the another sending node and the another receiving node in the another transmission pair that is performing data transmission are located beyond coverage of the tenth limited power of the another target node, the another target node is located beyond coverage of the eleventh limited power of the other nodes different from the adjacent node among the nodes that receive the still another CTS control packet, and the tenth limited power is higher than the still another updated power.

In an optional embodiment, the processor 1401 is configured to invoke the program code stored in the memory 1402 to further perform the following operation:

when the adjacent node is a newly woken node, the adjacent station stops transmission within a preset silent duration, or performs transmission by using a preset transmit power.

In an optional embodiment, the initial transmit power is a prescribed default transmit power, or an actually used transmit power carried in the RTS control packet or the CTS control packet.

Figure 15:
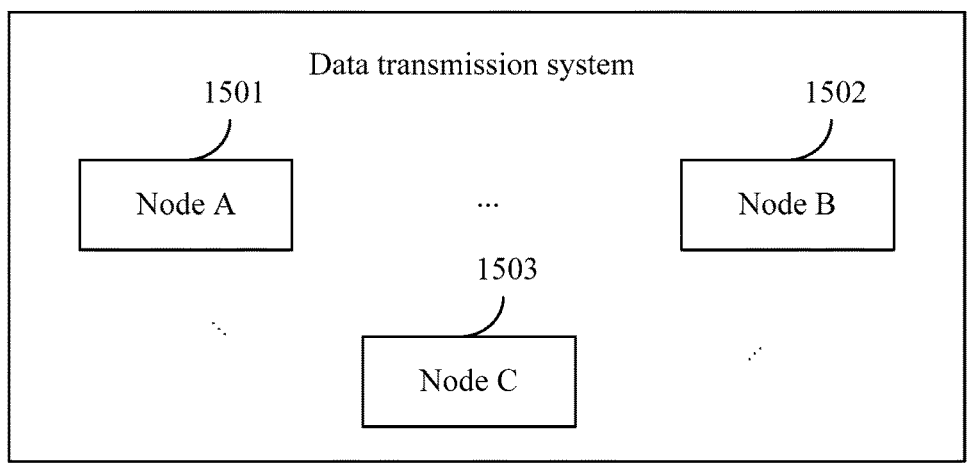
FIG. 15 is a schematic structural diagram of a data transmission system disclosed in an embodiment of the present invention.

Referring to FIG. 15, FIG. 15 is a schematic structural diagram of a data transmission system according to an embodiment of the present invention. As shown in FIG. 15, the data transmission system may include a node A1501, a node B1502, and a node C1503. In this embodiment, when the node A1501 needs to send data to the node B1502, the node A1501 is a sending node, the node B is a receiving node, and the node C may be an adjacent node.

The node A1501 is configured to send a request to send RTS control packet carrying an identifier of the receiving node.

The node B1502 is configured to determine a power update value according to an initial transmit power of the RTS control packet, and send a CTS control packet by using the initial transmit power, where the CTS control packet carries an identifier of the sending node and the power update value.

The node C1503 is configured to: after receiving the CTS control packet, if determining that the node C1503 is located beyond coverage of an updated power of the receiving node and the sending node, determine a first limited power, and perform control packet transmission according to the first limited power, where the updated power is a power that is obtained by updating the initial transmit power by using the power update value, the updated power is lower than the initial transmit power, and the receiving node and the sending node are located beyond coverage of the first limited power of the adjacent node.

The node A1501 is further configured to receive the CTS control packet, and send a data packet by using the updated power.

The node B1502 is further configured to send an ACK signal by using the updated power after completely receiving the data packet sent by the sending node.

Optionally, the node A1501 may include the data transmission devices shown in FIG. 7 and FIG. 8.

Optionally, the node B1502 may include the data transmission devices shown in FIG. 9 and FIG. 10.

Optionally, the node C1503 may include the data transmission devices shown in FIG. 11 to FIG. 14.

It should be understood that, the node A1501 used as a sending node, the node B1502 used as a receiving node, and the node C1503 used as an adjacent node are only a specific example in an application scenario of this embodiment of the present invention and shall not be construed as a limitation to the protection scope of the present invention. In other application scenarios, the node A1501 may also be used as a receiving node or an adjacent node; correspondingly, the node B1502 may also be used as a sending node or an adjacent node, and the node C1503 may also be used as a sending node or a receiving node. For example, when the node B1502 needs to send data to the node C1503, the node B1502 is used as a sending node, node C1503 is used as a receiving node, and the node A1501 may be used as an adjacent node. A specific implementation thereof is not described herein.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit. Specifically, the integrated unit may be implemented by software in addition to necessary universal hardware. The universal hardware includes a universal integrated circuit, a general purpose CPU, a universal memory, a universal component, and the like. Certainly, the integrated unit may also be implemented by dedicated hardware, including a dedicated integrated circuit, a dedicated CPU, a dedicated memory, a dedicated component, and the like.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The data transmission method, device, and system disclosed in the embodiments of the present invention are described in detail above. The principle and implementation of the present invention are described herein by using specific examples. The description of the embodiments is merely provided to help understand the method and core ideas of the present invention. In addition, a person of ordinary skill in the art can make variations and modifications to the present invention in terms of specific implementations and application scopes according to the ideas of the present invention. Therefore, content of the specification shall not be construed as a limitation to the present invention.

What is claimed is:

1. A data transmission method, comprising:
sending, by a sending node, a request to send (RTS) control packet carrying an identifier of a receiving node, so that after the receiving node receives the RTS control packet, the receiving node determines a power update value according to an initial transmit power of the RTS control packet and sends a clear to send (CTS) control packet by using the initial transmit power, wherein the CTS control packet carries an identifier of the sending node and the power update value;
wherein an adjacent node, of a first part of adjacent nodes other than the sending node among nodes that receive the CTS control packet, that is determined to be located beyond coverage of an updated power of the receiving node and the sending node, determines a first limited power and performs a control packet transmission according to the first limited power; and
wherein the updated power is obtained by updating the initial transmit power using the power update value, wherein the updated power is lower than the initial transmit power, and
wherein the receiving node and the sending node are located beyond coverage of the control packet transmission at the first limited power by the adjacent node, of the first part of adjacent nodes;
receiving, by the sending node, the CTS control packet transmitted by the receiving node; and,
sending, by the sending node to the receiving node, a data packet by using the updated power to transmit the data packet to the receiving node,
wherein the updated power is further used by the receiving node to send an acknowledgement (ACK) signal to the sending node after the receiving node completely receives the data packet sent by the sending node.

2. The method according to claim 1, wherein after the receiving, by the sending node, the CTS control packet, and before the sending the data packet by using the updated power, the method further comprises:
sending, by the sending node, an RTS update control packet by using the initial transmit power, wherein the RTS update control packet carries the power update value; when determining that a second part of adjacent nodes are located beyond the coverage of the updated power of the sending node, the second part of adjacent nodes that receive the RTS update control packet but do not receive the CTS control packet determine second limited power and perform control packet transmission according to the second limited power; and the sending node is located beyond coverage of the second limited power of the second part of adjacent nodes.

3. The method according to claim 2, wherein the second part of adjacent nodes determine the second limited power in the following manner:
the second part of adjacent nodes determine a third path loss between the second part of adjacent nodes and the sending node according to the initial transmit power and receive power of the received RTS update control packet; and
the second part of adjacent nodes determine power satisfying that a difference between the power and the third path loss is less than a receive power threshold of the sending node, as the second limited power, or determine power satisfying that a ratio of the power minus the third path loss to a sum of current interference and noise is less than a signal to interference plus noise ratio (SINR) threshold of the sending node, as the second limited power, wherein a duration of the control packet transmission performed by the second part of adjacent nodes according to the second limited power is determined according to a network allocation vector (NAV) duration carried in the RTS update control packet.

4. The method according to claim 1, wherein a third part of adjacent nodes that receive the RTS control packet but do not receive the CTS control packet and the data packet, determine third limited power and perform control packet transmission according to the third limited power; and the sending node is located beyond coverage of the third limited power of the third part of adjacent nodes.

5. The method according to claim 1, wherein that the first part of adjacent nodes determine that the first part of adjacent nodes are located beyond coverage of the updated power of the receiving node and the sending node is implemented in the following manner:
when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, the receive power of the received CTS control packet, and the receive power of the received RTS control packet, and when a difference between the updated power and the first path loss and a difference between the updated power and the second path loss are both less than a receive power threshold of the first part of adjacent nodes, or when a ratio of a difference between the updated power and the first path loss to a sum of current noise and interference and a ratio of a difference between the updated power and the second path loss to the sum of current noise and interference are both less than a signal to interference plus noise ratio (SINR) threshold of the first part of adjacent nodes, the first part of adjacent nodes determine that the first part of adjacent nodes are located beyond the coverage of the updated power of the receiving node and the sending node; or when the first part of adjacent nodes do not receive the RTS control packet, the first part of adjacent nodes determine a first path loss between the first part of adjacent nodes and the receiving node according to the initial transmit power and receive power of the received CTS control packet, and when a difference between the updated power and the first path loss is less than a receive power threshold of the first part of adjacent nodes, or when a ratio of a difference between the updated power and the first path loss to a sum of current interference and noise is less than a SINR threshold of the first part of adjacent nodes, the first part of adjacent nodes determine that the first part of adjacent nodes are located beyond the coverage of the updated power of the receiving node and the sending node.

6. The method according to claim 1, wherein the first part of adjacent nodes determine the first limited power in the following manner:

when the first part of adjacent nodes receive the RTS control packet, the first part of adjacent nodes separately determine a first path loss between the first part of adjacent nodes and the receiving node and a second path loss between the first part of adjacent nodes and the sending node according to the initial transmit power, receive power of the received CTS control packet, and receive power of the received RTS control packet, and determine a power satisfying that a difference between the power and the first path loss is less than a receive power threshold of the receiving node and that a difference between the power and the second path loss is less than a receive power threshold of the sending node, as the first limited power, or determine a power satisfying that a ratio of the power minus the first path loss to a sum of current interference and noise is less than a signal to interference plus noise ratio (SINR) threshold of the receiving node and that a ratio of the power minus the second path loss to the sum of current interference and noise is less than an SINR threshold of the sending node, as the first limited power, wherein a duration of the control packet transmission performed by the first part of adjacent nodes according to the first limited power is determined according to a network allocation vector (NAV) duration carried in the RTS control packet and an NAV duration carried in the CTS control packet; or when the first part of adjacent nodes do not receive the RTS control packet, the first part of adjacent nodes determine a first path loss between the first part of adjacent nodes and the receiving node according to the initial transmit power and receive power of the received CTS control packet, and determine power satisfying that a difference between the power and the first path loss is less than a receive power threshold of the receiving node, as the first limited power, or determine power satisfying that a ratio of the power minus the first path loss to a sum of current interference and noise is less than a SINR threshold of the receiving node, as the first limited power, wherein a duration of the control packet transmission performed by the first part of adjacent nodes according to the first limited power is determined according to an NAV duration carried in the CTS control packet.

7. The method according to claim 1, wherein the initial transmit power is prescribed default transmit power, or an actually used transmit power carried in the RTS control packet or the CTS control packet.

8. A data transmission method, comprising:

receiving, by a receiving node, a request to send (RTS) control packet that carries an identifier of the receiving node and is sent by a sending node, and determining a power update value according to an initial transmit power of the RTS control packet; and sending, by the receiving node, a clear to send (CTS) control packet by using the initial transmit power, wherein the CTS control packet carries an identifier of the sending node and the power update value;

wherein when receiving the CTS control packet, the sending node determines an updated power according to the power update value and sends a data packet by using the updated power;

wherein an adjacent node, of a first part of adjacent nodes other than the sending node among nodes that receive the CTS control packet, that is determined to be located beyond coverage of the updated power of the receiving node and the sending node, determines a first limited power and performs a control packet transmission according to the first limited power; and wherein the updated power is obtained by updating the initial transmit power using the power update value, wherein the updated power is lower than the initial transmit power, wherein the updated power is further used by the receiving node to send an acknowledgement (ACK) signal to the sending node after the receiving node completely receives the data packet sent by the sending node, and wherein the receiving node and the sending node are located beyond coverage of the first limited power of the adjacent node of the first part of adjacent nodes.

9. The method according to claim 8, wherein the RTS control packet further carries a modulation and coding scheme (MCS) level and a quality of service (QoS) level that are expected by the sending node; and wherein the determining, by the receiving node, the power update value according to the initial transmit power of the RTS control packet comprises:

determining, by the receiving node according to the initial transmit power, the MCS level, and the QoS level, a power ratio allowed to be reduced, wherein the power ratio allowed to be reduced is inversely proportional to the MCS level and the QoS level respectively.

10. The method according to claim 8, wherein the determining, by the receiving node, the power update value according to the initial transmit power of the RTS control packet comprises:

determining, by the receiving node according to the initial transmit power, a modulation and coding scheme (MCS) level expected by the receiving node, and receiver sensitivity, a power ratio allowed to be reduced, wherein the power ratio allowed to be reduced is inversely proportional to the MCS level and directly proportional to the receiver sensitivity; wherein the CTS control packet further carries the MCS level, so that the sending node sends the data packet by using the MCS level.

11. The method according to claim 8, wherein the determining, by the receiving node, the power update value according to the initial transmit power of the RTS control packet comprises:

performing, by the receiving node, a calculus operation using a distance as a variable on a product of a size of a non-overlapping area of the coverage of the updated power and coverage of the initial transmit power, a node density of the non-overlapping area, and a service arrival rate of the non-overlapping area by using a radius of the coverage of the updated power as a lower limit and a radius of the coverage of the initial transmit power as an upper limit respectively, to obtain potential interference;

determining, by the receiving node, a path loss between the receiving node and the sending node according to the initial transmit power and receive power of the received RTS control packet; and determining, by the receiving node, the power update value according to a condition that a difference between the updated power and the path loss, divided by a sum of the potential interference, current interference, and current noise, is greater than or equal to a signal to interference plus noise ratio (SINR) threshold of the receiving node.

12. A data transmission method, comprising:

receiving, by an adjacent node, a clear to send (CTS) control packet carrying an identifier of a sending node and a power update value, and sent by a receiving node;

determining, by the adjacent node after the receiving, whether the adjacent node is located beyond a coverage of an updated power of the receiving node and the sending node, wherein the CTS control packet is sent by the receiving node by using an initial transmit power after the receiving node:

receives a request to send (RTS) control packet carrying an identifier of the receiving node and sent by the sending node, and determines the power update value according to the initial transmit power of the RTS control packet; and wherein the power update value is used by the sending node to update the initial transmit power to obtain the updated power after the sending node receives the CTS control packet, so that a data packet is sent by using the updated power to transmit the data packet to the receiving node, wherein the updated power is lower than the initial transmit power, and wherein the updated power is further used by the receiving node to send an acknowledgement (ACK) signal to the sending node after the receiving node completely receives the data packet sent by the sending node;

determining, by the adjacent node, when the adjacent node determines that the adjacent node is located beyond the coverage of the updated power of the receiving node and the sending node, a first limited power; and performing, by the adjacent node after the determining, a control packet transmission according to the first limited power, wherein the receiving node and the sending node are located beyond a coverage of the first limited power of the adjacent node.

13. The method according to claim 12, wherein the method further comprises:

when the adjacent node receives an RTS update control packet that carries the power update value and is sent by the sending node, but does not receive the CTS control packet, determining, by the adjacent node, whether the adjacent node is located beyond the coverage of the updated power of the sending node, and when the adjacent node is located beyond the coverage of the updated power of the sending node, determining, by the adjacent node, second limited power, and performing control packet transmission according to the second limited power, wherein the RTS update control packet is sent by the sending node by using the initial transmit power after the CTS control packet is received and before the data packet is sent using the updated power, and the sending node is located beyond coverage of the second limited power of the adjacent node.

14. The method according to claim 13, wherein the determining, by the adjacent node, second limited power comprises:

determining, by the adjacent node, a third path loss between the adjacent node and the sending node according to the initial transmit power and receive power of the received RTS update control packet; and determining, by the adjacent node, power satisfying that a difference between the power and the third path loss is less than a receive power threshold of the sending node, as the second limited power, or determining power satisfying that a ratio of the power minus the third path loss to a sum of current interference and noise is less than a SINR threshold of the sending node, as the second limited power, wherein a duration of the control packet transmission performed by the adjacent node according to the second limited power is determined according to an NAV duration carried in the RTS update control packet.

15. The method according to claim 12, further comprising:

when the adjacent node receives the RTS control packet, but does not receive the CTS control packet and the data packet, determining third limited power, and performing control packet transmission according to the third limited power, wherein the sending node is located beyond coverage of the third limited power of the adjacent node.

16. The method according to claim 12, wherein that the adjacent node determines that the adjacent node is located beyond the coverage of the updated power of the receiving node and the sending node comprises:

when the adjacent node receives the RTS control packet, the adjacent node separately determines a first path loss between the adjacent node and the receiving node and a second path loss between the adjacent node and the sending node according to the initial transmit power, receive power of the received CTS control packet, and a receive power of the received RTS control packet, and when a difference between the updated power and the first path loss and a difference between the updated power and the second path loss are both less than a receive power threshold of the adjacent node, or when a ratio of a difference between the updated power and the first path loss to a sum of current noise and interference and a ratio of a difference between the updated power and the second path loss to the sum of current noise and interference are both less than a signal to interference plus noise ratio (SINR) threshold of the adjacent node, the adjacent node determines that the adjacent node is located beyond the coverage of the updated power of the receiving node and the sending node; or when the adjacent node does not receive the RTS control packet, the adjacent node determines a first path loss between the adjacent node and the receiving node according to the initial transmit power and receive power of the received CTS control packet, and when a difference between the updated power and the first path loss is less than a receive power threshold of the adjacent node, or when a ratio of a difference between the updated power and the first path loss to a sum of current interference and noise is less than a SINR threshold of the adjacent node, the adjacent node determines that the adjacent node is located beyond the coverage of the updated power of the receiving node and the sending node.

17. The method according to claim 12, wherein the determining, by the adjacent node, the first limited power comprises:

when the adjacent node receives the RTS control packet, separately determining, by the adjacent node, a first path loss between the adjacent node and the receiving node and a second path loss between the adjacent node and the sending node according to the initial transmit power, receive power of the received CTS control packet, and receive power of the received RTS control packet, and determining power satisfying that a difference between the power and the first path loss is less than a receive power threshold of the receiving node and that a difference between the power and the second path loss is less than a receive power threshold of the sending node, as the first limited power, or determining power satisfying that a ratio of the power minus the first path loss to a sum of current interference and noise is less than a signal to interference plus noise ratio (SINR) threshold of the receiving node and that a ratio of the power minus the second path loss to the sum of current interference and noise is less than a SINR threshold of the sending node, as the first limited power, wherein a duration of the control packet transmission performed by the adjacent node according to the first limited power is determined according to a network allocation vector (NAV) duration carried in the RTS control packet and an NAV duration carried in the CTS control packet; or when the adjacent node does not receive the RTS control packet, determining, by the adjacent node, a first path loss between the adjacent node and the receiving node according to the initial transmit power and receive power of the received CTS control packet, and determining power satisfying that a difference between the power and the first path loss is less than a receive power threshold of the receiving node, as the first limited power, or determining power satisfying that a ratio of the power minus the first path loss to a sum of current interference and noise is less than a SINR threshold of the receiving node, as the first limited power, wherein a duration of the control packet transmission performed by the adjacent node according to the first limited power is determined according to an NAV duration carried in the CTS control packet.

* * * * *